United States Patent
Harris et al.

(10) Patent No.: US 11,263,220 B2
(45) Date of Patent: **\*Mar. 1, 2022**

(54) ON-DEMAND EXECUTION OF OBJECT TRANSFORMATION CODE IN OUTPUT PATH OF OBJECT STORAGE SERVICE

(71) Applicant: Amazon Technologies, Inc., Seattle, WA (US)

(72) Inventors: Timothy Lawrence Harris, Cambridge (GB); Kevin C. Miller, Bainbridge Island, WA (US); Ramyanshu Datta, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 17 days.

This patent is subject to a terminal disclaimer.

(21) Appl. No.: 16/586,562

(22) Filed: Sep. 27, 2019

(65) Prior Publication Data

US 2021/0097083 A1    Apr. 1, 2021

(51) Int. Cl.
*G06F 7/00* (2006.01)
*G06F 16/2457* (2019.01)
(Continued)

(52) U.S. Cl.
CPC .... *G06F 16/24575* (2019.01); *G06F 16/2329* (2019.01); *G06F 16/24524* (2019.01); *G06F 16/24552* (2019.01); *G06F 16/9035* (2019.01)

(58) Field of Classification Search
CPC ......... G06F 16/24575; G06F 16/24552; G06F 16/24524; G06F 16/2329; G06F 16/9035;
(Continued)

(56) References Cited

U.S. PATENT DOCUMENTS 3,891,974 A    6/1975  Coulter et al.
4,084,224 A    4/1978  Appell et al.
(Continued)

FOREIGN PATENT DOCUMENTS

EP    2663052 A1    11/2013
JP    2002287974 A    10/2002
(Continued)

OTHER PUBLICATIONS

Anonymous: "Docker run reference", Dec. 7, 2015, XP055350246, Retrieved from the Internet: URL:https://web.archive.org/web/20151207111702/https://docs.docker.com/engine/reference/run/ [retrieved on Feb. 28, 2017].
(Continued)

*Primary Examiner* — Mohammed R Uddin
(74) *Attorney, Agent, or Firm* — Knobbe, Martens, Olson & Bear, LLP

(57) ABSTRACT

Systems and methods are described for modifying input and output (I/O) to an object storage service by implementing one or more owner-specified functions to I/O requests. A function can implement a data manipulation, such as filtering out sensitive data before reading or writing the data. The functions can be applied prior to implementing a request method (e.g., GET or PUT) specified within the I/O request, such that the data to which the method is applied my not match the object specified within the request. For example, a user may request to obtain (e.g., GET) a data set. The data set may be passed to a function that filters sensitive data to the data set, and the GET request method may then be applied to the output of the function. In this manner, owners of objects on an object storage service are provided with greater control of objects stored or retrieved from the service.

18 Claims, 16 Drawing Sheets

(51) Int. Cl.
*G06F 16/2455* (2019.01)
*G06F 16/9035* (2019.01)
*G06F 16/2452* (2019.01)
*G06F 16/23* (2019.01)

(58) Field of Classification Search
CPC ........... G06F 16/2455; G06F 16/24557; G06F 16/334; G06F 16/8373; G06F 16/838; G06F 16/9577; G06F 21/53; G06F 21/6218; G06F 16/188
See application file for complete search history.

(56) References Cited

U.S. PATENT DOCUMENTS

| | | | |
|---|---|---|---|
| 4,084,228 A | 4/1978 | Dufond et al. |
| 4,949,254 A | 8/1990 | Shorter |
| 5,283,888 A | 2/1994 | Dao et al. |
| 5,970,488 A | 10/1999 | Crowe et al. |
| 6,385,636 B1 | 5/2002 | Suzuki |
| 6,463,509 B1 | 10/2002 | Teoman et al. |
| 6,501,736 B1 | 12/2002 | Smolik et al. |
| 6,523,035 B1 | 2/2003 | Fleming et al. |
| 6,687,857 B1* | 2/2004 | Iwata ................ G06F 11/3648 |
| | | | 714/30 |
| 6,708,276 B1 | 3/2004 | Yarsa et al. |
| 7,036,121 B1 | 4/2006 | Casabona et al. |
| 7,590,806 B2 | 9/2009 | Harris et al. |
| 7,665,090 B1 | 2/2010 | Tormasov et al. |
| 7,707,579 B2 | 4/2010 | Rodriguez |
| 7,730,464 B2 | 6/2010 | Trowbridge |
| 7,774,191 B2 | 8/2010 | Berkowitz et al. |
| 7,823,186 B2 | 10/2010 | Pouliot |
| 7,886,021 B2 | 2/2011 | Scheifler et al. |
| 7,996,671 B2* | 8/2011 | Chheda ............... G06F 9/30156 |
| | | | 713/164 |
| 8,010,990 B2 | 8/2011 | Ferguson et al. |
| 8,024,564 B2 | 9/2011 | Bassani et al. |
| 8,046,765 B2 | 10/2011 | Cherkasova et al. |
| 8,051,180 B2 | 11/2011 | Mazzaferri et al. |
| 8,051,266 B2 | 11/2011 | DeVal et al. |
| 8,065,676 B1 | 11/2011 | Sahai et al. |
| 8,065,682 B2 | 11/2011 | Baryshnikov et al. |
| 8,095,931 B1 | 1/2012 | Chen et al. |
| 8,127,284 B2 | 2/2012 | Meijer et al. |
| 8,146,073 B2 | 3/2012 | Sinha |
| 8,166,304 B2 | 4/2012 | Murase et al. |
| 8,171,473 B2 | 5/2012 | Lavin |
| 8,209,695 B1 | 6/2012 | Pruyne et al. |
| 8,219,987 B1 | 7/2012 | Vlaovic et al. |
| 8,321,554 B2 | 11/2012 | Dickinson |
| 8,321,558 B1 | 11/2012 | Sirota et al. |
| 8,336,079 B2 | 12/2012 | Budko et al. |
| 8,352,608 B1 | 1/2013 | Keagy et al. |
| 8,387,075 B1 | 2/2013 | McCann et al. |
| 8,429,282 B1 | 4/2013 | Ahuja |
| 8,448,165 B1 | 5/2013 | Conover |
| 8,490,088 B2 | 7/2013 | Tang |
| 8,543,567 B1* | 9/2013 | Collins ................... G06F 16/21 |
| | | | 707/714 |
| 8,555,281 B1 | 10/2013 | Van Dijk et al. |
| 8,566,835 B2 | 10/2013 | Wang et al. |
| 8,613,070 B1 | 12/2013 | Borzycki et al. |
| 8,631,130 B2 | 1/2014 | Jackson |
| 8,677,359 B1 | 3/2014 | Cavage et al. |
| 8,694,996 B2 | 4/2014 | Cawlfield et al. |
| 8,700,768 B2 | 4/2014 | Benari |
| 8,719,415 B1 | 5/2014 | Sirota et al. |
| 8,725,702 B1 | 5/2014 | Raman et al. |
| 8,756,696 B1 | 6/2014 | Miller |
| 8,769,519 B2 | 7/2014 | Leitman et al. |
| 8,799,236 B1 | 8/2014 | Azari et al. |
| 8,799,879 B2 | 8/2014 | Wright et al. |
| 8,806,468 B2 | 8/2014 | Meijer et al. |
| 8,819,679 B2 | 8/2014 | Agarwal et al. |
| 8,825,863 B2 | 9/2014 | Hansson et al. |
| 8,825,964 B1 | 9/2014 | Sopka et al. |
| 8,839,035 B1 | 9/2014 | Dimitrovich et al. |
| 8,850,432 B2 | 9/2014 | Mcgrath et al. |
| 8,874,952 B2 | 10/2014 | Tameshige et al. |
| 8,904,008 B2 | 12/2014 | Calder et al. |
| 8,910,124 B1* | 12/2014 | Bhansali ............. G06F 11/3612 |
| | | | 717/128 |
| 8,918,901 B2 | 12/2014 | Mandava et al. |
| 8,997,093 B2 | 3/2015 | Dimitrov |
| 9,027,087 B2 | 5/2015 | Ishaya et al. |
| 9,038,068 B2 | 5/2015 | Engle et al. |
| 9,052,935 B1 | 6/2015 | Rajaa |
| 9,086,897 B2 | 7/2015 | Oh et al. |
| 9,092,837 B2 | 7/2015 | Bala et al. |
| 9,098,528 B2 | 8/2015 | Wang |
| 9,110,732 B1 | 8/2015 | Forschmiedt et al. |
| 9,110,770 B1 | 8/2015 | Raju et al. |
| 9,111,037 B1 | 8/2015 | Nalis et al. |
| 9,112,813 B2 | 8/2015 | Jackson |
| 9,141,410 B2 | 9/2015 | Leafe et al. |
| 9,146,764 B1 | 9/2015 | Wagner |
| 9,152,406 B2 | 10/2015 | De et al. |
| 9,164,754 B1 | 10/2015 | Pohlack |
| 9,165,136 B1 | 10/2015 | VanLund |
| 9,183,019 B2 | 11/2015 | Kruglick |
| 9,208,007 B2 | 12/2015 | Harper et al. |
| 9,218,190 B2 | 12/2015 | Anand et al. |
| 9,223,561 B2 | 12/2015 | Orveillon et al. |
| 9,223,966 B1 | 12/2015 | Satish et al. |
| 9,250,893 B2 | 2/2016 | Blahaerath et al. |
| 9,268,586 B2 | 2/2016 | Voccio et al. |
| 9,298,633 B1 | 3/2016 | Zhao et al. |
| 9,317,689 B2 | 4/2016 | Aissi |
| 9,323,556 B2 | 4/2016 | Wagner |
| 9,361,145 B1 | 6/2016 | Wilson et al. |
| 9,413,626 B2 | 8/2016 | Reque et al. |
| 9,436,555 B2 | 9/2016 | Dornemann et al. |
| 9,461,996 B2 | 10/2016 | Hayton et al. |
| 9,465,821 B1 | 10/2016 | Patiejunas et al. |
| 9,471,546 B2* | 10/2016 | Speek ..................... G06F 40/00 |
| 9,471,775 B1 | 10/2016 | Wagner et al. |
| 9,483,335 B1 | 11/2016 | Wagner et al. |
| 9,489,227 B2 | 11/2016 | Oh et al. |
| 9,489,526 B1* | 11/2016 | Call ...................... G06F 21/552 |
| 9,497,136 B1 | 11/2016 | Ramarao et al. |
| 9,501,345 B1 | 11/2016 | Lietz et al. |
| 9,514,037 B1 | 12/2016 | Dow et al. |
| 9,537,788 B2 | 1/2017 | Reque et al. |
| 9,563,681 B1 | 2/2017 | Patiejunas et al. |
| 9,575,798 B2 | 2/2017 | Terayama et al. |
| 9,584,517 B1 | 2/2017 | Roth et al. |
| 9,588,790 B1 | 3/2017 | Wagner et al. |
| 9,594,590 B2 | 3/2017 | Hsu |
| 9,596,350 B1 | 3/2017 | Dymshyts et al. |
| 9,600,312 B2 | 3/2017 | Wagner et al. |
| 9,628,332 B2 | 4/2017 | Bruno, Jr. et al. |
| 9,635,132 B1 | 4/2017 | Lin et al. |
| 9,652,306 B1 | 5/2017 | Wagner et al. |
| 9,652,617 B1 | 5/2017 | Evans et al. |
| 9,654,508 B2 | 5/2017 | Barton et al. |
| 9,661,011 B1 | 5/2017 | Van Horenbeeck et al. |
| 9,678,773 B1 | 6/2017 | Wagner et al. |
| 9,678,778 B1 | 6/2017 | Youseff |
| 9,703,681 B2 | 7/2017 | Taylor et al. |
| 9,715,402 B2 | 7/2017 | Wagner et al. |
| 9,727,725 B2 | 8/2017 | Wagner et al. |
| 9,733,967 B2 | 8/2017 | Wagner et al. |
| 9,760,387 B2 | 9/2017 | Wagner et al. |
| 9,767,098 B2 | 9/2017 | Patiejunas et al. |
| 9,767,271 B2 | 9/2017 | Ghose |
| 9,785,476 B2 | 10/2017 | Wagner et al. |
| 9,787,779 B2 | 10/2017 | Frank et al. |
| 9,811,363 B1* | 11/2017 | Wagner ............... G06F 9/44521 |
| 9,811,434 B1 | 11/2017 | Wagner |
| 9,830,175 B1 | 11/2017 | Wagner |
| 9,830,193 B1 | 11/2017 | Wagner et al. |
| 9,830,449 B1 | 11/2017 | Wagner |
| 9,864,636 B1 | 1/2018 | Patel et al. |

(56) References Cited

U.S. PATENT DOCUMENTS

| | | | |
|---|---|---|---|
| 9,910,713 B2 | 3/2018 | Wisniewski et al. | |
| 9,921,864 B2 | 3/2018 | Singaravelu et al. | |
| 9,928,108 B1 | 3/2018 | Wagner et al. | |
| 9,929,916 B1 | 3/2018 | Subramanian et al. | |
| 9,930,103 B2 | 3/2018 | Thompson | |
| 9,930,133 B2 | 3/2018 | Susarla et al. | |
| 9,952,896 B2 | 4/2018 | Wagner et al. | |
| 9,977,691 B2 | 5/2018 | Marriner et al. | |
| 9,979,817 B2 | 5/2018 | Huang et al. | |
| 10,002,026 B1 | 6/2018 | Wagner | |
| 10,013,267 B1 | 7/2018 | Wagner et al. | |
| 10,042,660 B2 | 8/2018 | Wagner et al. | |
| 10,048,974 B1 | 8/2018 | Wagner et al. | |
| 10,061,613 B1* | 8/2018 | Brooker | G06F 9/5005 |
| 10,067,801 B1 | 9/2018 | Wagner | |
| 10,102,040 B2 | 10/2018 | Marriner et al. | |
| 10,108,443 B2 | 10/2018 | Wagner et al. | |
| 10,120,579 B1 | 11/2018 | Patiejunas et al. | |
| 10,139,876 B2 | 11/2018 | Lu et al. | |
| 10,140,137 B2 | 11/2018 | Wagner | |
| 10,162,672 B2 | 12/2018 | Wagner et al. | |
| 10,162,688 B2 | 12/2018 | Wagner | |
| 10,203,990 B2 | 2/2019 | Wagner et al. | |
| 10,248,467 B2 | 4/2019 | Wisniewski et al. | |
| 10,277,708 B2 | 4/2019 | Wagner et al. | |
| 10,303,492 B1 | 5/2019 | Wagner et al. | |
| 10,339,837 B1* | 7/2019 | Gounares | G09C 1/00 |
| 10,353,678 B1 | 7/2019 | Wagner | |
| 10,353,746 B2 | 7/2019 | Reque et al. | |
| 10,365,985 B2 | 7/2019 | Wagner | |
| 10,387,177 B2 | 8/2019 | Wagner et al. | |
| 10,402,231 B2 | 9/2019 | Marriner et al. | |
| 10,417,043 B1* | 9/2019 | Braverman | G06F 9/5044 |
| 10,437,629 B2 | 10/2019 | Wagner et al. | |
| 10,445,140 B1 | 10/2019 | Sagar et al. | |
| 10,528,390 B2 | 1/2020 | Brooker et al. | |
| 10,534,629 B1 | 1/2020 | St. Pierre et al. | |
| 10,552,193 B2 | 2/2020 | Wagner et al. | |
| 10,564,946 B1 | 2/2020 | Wagner et al. | |
| 10,572,375 B1 | 2/2020 | Wagner | |
| 10,592,269 B2 | 3/2020 | Wagner et al. | |
| 10,754,701 B1 | 8/2020 | Wagner | |
| 10,884,787 B1 | 1/2021 | Wagner et al. | |
| 10,908,927 B1* | 2/2021 | Harris | G06F 13/1668 |
| 2001/0044817 A1 | 11/2001 | Asano et al. | |
| 2002/0083178 A1 | 6/2002 | Brothers | |
| 2002/0120685 A1 | 8/2002 | Srivastava et al. | |
| 2002/0172273 A1 | 11/2002 | Baker et al. | |
| 2003/0071842 A1 | 4/2003 | King et al. | |
| 2003/0084434 A1 | 5/2003 | Ren | |
| 2003/0229794 A1 | 12/2003 | James, II et al. | |
| 2004/0003087 A1 | 1/2004 | Chambliss et al. | |
| 2004/0049768 A1 | 3/2004 | Matsuyama et al. | |
| 2004/0098154 A1 | 5/2004 | McCarthy | |
| 2004/0158551 A1 | 8/2004 | Santosuosso | |
| 2004/0205493 A1 | 10/2004 | Simpson et al. | |
| 2004/0249947 A1 | 12/2004 | Novaes et al. | |
| 2004/0268358 A1 | 12/2004 | Darling et al. | |
| 2005/0027611 A1 | 2/2005 | Wharton | |
| 2005/0044301 A1 | 2/2005 | Vasilevsky et al. | |
| 2005/0114672 A1 | 5/2005 | Duncan et al. | |
| 2005/0120160 A1 | 6/2005 | Plouffe et al. | |
| 2005/0132167 A1 | 6/2005 | Longobardi | |
| 2005/0132368 A1 | 6/2005 | Sexton et al. | |
| 2005/0149535 A1 | 7/2005 | Frey et al. | |
| 2005/0193113 A1 | 9/2005 | Kokusho et al. | |
| 2005/0193283 A1 | 9/2005 | Reinhardt et al. | |
| 2005/0237948 A1 | 10/2005 | Wan et al. | |
| 2005/0240943 A1 | 10/2005 | Smith et al. | |
| 2005/0257051 A1 | 11/2005 | Richard | |
| 2006/0123066 A1 | 6/2006 | Jacobs et al. | |
| 2006/0129684 A1 | 6/2006 | Datta | |
| 2006/0184669 A1 | 8/2006 | Vaidyanathan et al. | |
| 2006/0200668 A1 | 9/2006 | Hybre et al. | |
| 2006/0212332 A1 | 9/2006 | Jackson | |
| 2006/0235714 A1* | 10/2006 | Adinolfi | G06Q 40/06 705/1.1 |
| 2006/0242647 A1 | 10/2006 | Kimbrel et al. | |
| 2006/0248195 A1 | 11/2006 | Toumura et al. | |
| 2007/0094396 A1 | 4/2007 | Takano et al. | |
| 2007/0130341 A1 | 6/2007 | Ma | |
| 2007/0174419 A1 | 7/2007 | O'Connell et al. | |
| 2007/0192082 A1 | 8/2007 | Gaos et al. | |
| 2007/0199000 A1 | 8/2007 | Shekhel et al. | |
| 2007/0220009 A1 | 9/2007 | Morris et al. | |
| 2007/0240160 A1 | 10/2007 | Paterson-Jones | |
| 2007/0255604 A1 | 11/2007 | Seelig | |
| 2008/0028409 A1 | 1/2008 | Cherkasova et al. | |
| 2008/0052401 A1 | 2/2008 | Bugenhagen et al. | |
| 2008/0052725 A1 | 2/2008 | Stoodley et al. | |
| 2008/0082977 A1 | 4/2008 | Araujo et al. | |
| 2008/0104247 A1 | 5/2008 | Venkatakrishnan et al. | |
| 2008/0104608 A1 | 5/2008 | Hyser et al. | |
| 2008/0126110 A1 | 5/2008 | Haeberle et al. | |
| 2008/0126486 A1 | 5/2008 | Heist | |
| 2008/0127125 A1 | 5/2008 | Anckaert et al. | |
| 2008/0147893 A1 | 6/2008 | Marripudi et al. | |
| 2008/0189468 A1 | 8/2008 | Schmidt et al. | |
| 2008/0195369 A1 | 8/2008 | Duyanovich et al. | |
| 2008/0201568 A1 | 8/2008 | Quinn et al. | |
| 2008/0201711 A1 | 8/2008 | Amir Husain | |
| 2008/0209423 A1 | 8/2008 | Hirai | |
| 2009/0006897 A1 | 1/2009 | Sarsfield | |
| 2009/0013153 A1 | 1/2009 | Hilton | |
| 2009/0025009 A1 | 1/2009 | Brunswig et al. | |
| 2009/0055581 A1 | 2/2009 | Kondur | |
| 2009/0055829 A1 | 2/2009 | Gibson | |
| 2009/0070355 A1 | 3/2009 | Cadarette et al. | |
| 2009/0077569 A1 | 3/2009 | Appleton et al. | |
| 2009/0125902 A1 | 5/2009 | Ghosh et al. | |
| 2009/0158275 A1 | 6/2009 | Wang et al. | |
| 2009/0177860 A1 | 7/2009 | Zhu et al. | |
| 2009/0193410 A1 | 7/2009 | Arthursson et al. | |
| 2009/0198769 A1 | 8/2009 | Keller et al. | |
| 2009/0204960 A1 | 8/2009 | Ben-yehuda et al. | |
| 2009/0204964 A1 | 8/2009 | Foley et al. | |
| 2009/0222922 A1 | 9/2009 | Sidiroglou et al. | |
| 2009/0271472 A1 | 10/2009 | Scheitler et al. | |
| 2009/0288084 A1 | 11/2009 | Astete et al. | |
| 2009/0300599 A1 | 12/2009 | Piotrowski | |
| 2010/0023940 A1 | 1/2010 | Iwamatsu et al. | |
| 2010/0031274 A1 | 2/2010 | Sim-Tang | |
| 2010/0031325 A1 | 2/2010 | Maigne et al. | |
| 2010/0036925 A1 | 2/2010 | Haffner | |
| 2010/0058342 A1 | 3/2010 | Machida | |
| 2010/0058351 A1 | 3/2010 | Yahagi | |
| 2010/0064299 A1 | 3/2010 | Kacin et al. | |
| 2010/0070678 A1 | 3/2010 | Zhang et al. | |
| 2010/0070725 A1 | 3/2010 | Prahlad et al. | |
| 2010/0106926 A1 | 4/2010 | Kandasamy et al. | |
| 2010/0114825 A1 | 5/2010 | Siddegowda | |
| 2010/0115098 A1 | 5/2010 | De Baer et al. | |
| 2010/0122343 A1 | 5/2010 | Ghosh | |
| 2010/0131936 A1 | 5/2010 | Cheriton | |
| 2010/0131959 A1 | 5/2010 | Spiers et al. | |
| 2010/0186011 A1 | 7/2010 | Magenheimer | |
| 2010/0198972 A1 | 8/2010 | Umbehocker | |
| 2010/0199285 A1 | 8/2010 | Medovich | |
| 2010/0257116 A1 | 10/2010 | Mehta et al. | |
| 2010/0269109 A1 | 10/2010 | Cartales | |
| 2010/0312871 A1 | 12/2010 | Desantis et al. | |
| 2010/0325727 A1 | 12/2010 | Neystadt et al. | |
| 2011/0010722 A1 | 1/2011 | Matsuyama | |
| 2011/0029970 A1 | 2/2011 | Arasaratnam | |
| 2011/0040812 A1 | 2/2011 | Phillips | |
| 2011/0055378 A1 | 3/2011 | Ferris et al. | |
| 2011/0055396 A1 | 3/2011 | DeHaan | |
| 2011/0055683 A1 | 3/2011 | Jiang | |
| 2011/0078679 A1 | 3/2011 | Bozek et al. | |
| 2011/0099204 A1 | 4/2011 | Thaler | |
| 2011/0099551 A1 | 4/2011 | Fahrig et al. | |
| 2011/0131572 A1 | 6/2011 | Elyashev et al. | |
| 2011/0134761 A1 | 6/2011 | Smith | |
| 2011/0141124 A1 | 6/2011 | Halls et al. | |

(56) References Cited

U.S. PATENT DOCUMENTS

| | | |
|---|---|---|
| 2011/0153727 A1 | 6/2011 | Li |
| 2011/0153838 A1 | 6/2011 | Belkine et al. |
| 2011/0154353 A1 | 6/2011 | Theroux et al. |
| 2011/0179162 A1 | 7/2011 | Mayo et al. |
| 2011/0184993 A1 | 7/2011 | Chawla et al. |
| 2011/0225277 A1 | 9/2011 | Freimuth et al. |
| 2011/0231680 A1 | 9/2011 | Padmanabhan et al. |
| 2011/0247005 A1 | 10/2011 | Benedetti et al. |
| 2011/0265164 A1 | 10/2011 | Lucovsky |
| 2011/0271276 A1 | 11/2011 | Ashok et al. |
| 2011/0276945 A1 | 11/2011 | Chasman et al. |
| 2011/0314465 A1 | 12/2011 | Smith et al. |
| 2011/0321033 A1 | 12/2011 | Kelkar et al. |
| 2012/0011496 A1 | 1/2012 | Shimamura |
| 2012/0011511 A1 | 1/2012 | Horvitz et al. |
| 2012/0016721 A1 | 1/2012 | Weinman |
| 2012/0041970 A1 | 2/2012 | Ghosh et al. |
| 2012/0054744 A1 | 3/2012 | Singh et al. |
| 2012/0072762 A1 | 3/2012 | Atchison et al. |
| 2012/0072914 A1 | 3/2012 | Ota |
| 2012/0079004 A1 | 3/2012 | Herman |
| 2012/0096271 A1 | 4/2012 | Ramarathinam et al. |
| 2012/0096468 A1 | 4/2012 | Chakravorty et al. |
| 2012/0102307 A1 | 4/2012 | Wong |
| 2012/0102333 A1 | 4/2012 | Wong |
| 2012/0102481 A1 | 4/2012 | Mani et al. |
| 2012/0110155 A1 | 5/2012 | Adlung et al. |
| 2012/0110164 A1 | 5/2012 | Frey et al. |
| 2012/0110570 A1 | 5/2012 | Jacobson et al. |
| 2012/0110588 A1 | 5/2012 | Bieswanger et al. |
| 2012/0131379 A1 | 5/2012 | Tameshige et al. |
| 2012/0144290 A1 | 6/2012 | Goldman et al. |
| 2012/0166624 A1 | 6/2012 | Suit et al. |
| 2012/0192184 A1 | 7/2012 | Burckart et al. |
| 2012/0197795 A1 | 8/2012 | Campbell et al. |
| 2012/0197919 A1* | 8/2012 | Chen .............. G06F 16/00 707/757 |
| 2012/0197958 A1 | 8/2012 | Nightingale et al. |
| 2012/0198442 A1 | 8/2012 | Kashyap et al. |
| 2012/0222038 A1 | 8/2012 | Katragadda et al. |
| 2012/0233464 A1 | 9/2012 | Miller et al. |
| 2012/0278621 A1 | 11/2012 | Woloszyn |
| 2012/0317096 A1* | 12/2012 | Kaufmann ........ G06F 16/24534 707/718 |
| 2012/0331113 A1 | 12/2012 | Jain et al. |
| 2013/0014101 A1 | 1/2013 | Ballani et al. |
| 2013/0042234 A1 | 2/2013 | DeLuca et al. |
| 2013/0054804 A1 | 2/2013 | Jana et al. |
| 2013/0054927 A1 | 2/2013 | Raj et al. |
| 2013/0055262 A1 | 2/2013 | Lubsey et al. |
| 2013/0061208 A1 | 3/2013 | Tsao et al. |
| 2013/0067494 A1 | 3/2013 | Srour et al. |
| 2013/0080641 A1 | 3/2013 | Lui et al. |
| 2013/0086088 A1* | 4/2013 | Alton .............. G06F 16/2455 707/754 |
| 2013/0097431 A1* | 4/2013 | Hriljac ............ G06F 8/52 713/189 |
| 2013/0097601 A1 | 4/2013 | Podvratnik et al. |
| 2013/0111032 A1 | 5/2013 | Alapati et al. |
| 2013/0111469 A1 | 5/2013 | B et al. |
| 2013/0124466 A1 | 5/2013 | Naidu et al. |
| 2013/0124807 A1 | 5/2013 | Nielsen et al. |
| 2013/0132942 A1 | 5/2013 | Wang |
| 2013/0139152 A1 | 5/2013 | Chang et al. |
| 2013/0139166 A1 | 5/2013 | Zhang et al. |
| 2013/0151648 A1 | 6/2013 | Luna |
| 2013/0152047 A1 | 6/2013 | Moorthi et al. |
| 2013/0179574 A1 | 7/2013 | Calder et al. |
| 2013/0179881 A1 | 7/2013 | Calder et al. |
| 2013/0179894 A1 | 7/2013 | Calder et al. |
| 2013/0179895 A1 | 7/2013 | Calder et al. |
| 2013/0185719 A1 | 7/2013 | Kar et al. |
| 2013/0185729 A1 | 7/2013 | Vasic et al. |
| 2013/0191924 A1 | 7/2013 | Tedesco |
| 2013/0198319 A1 | 8/2013 | Shen et al. |
| 2013/0198743 A1 | 8/2013 | Kruglick |
| 2013/0198748 A1 | 8/2013 | Sharp et al. |
| 2013/0198763 A1 | 8/2013 | Kunze et al. |
| 2013/0205092 A1 | 8/2013 | Roy et al. |
| 2013/0219390 A1 | 8/2013 | Lee et al. |
| 2013/0227097 A1 | 8/2013 | Yasuda et al. |
| 2013/0227534 A1 | 8/2013 | Ike et al. |
| 2013/0227563 A1 | 8/2013 | McGrath |
| 2013/0227641 A1 | 8/2013 | White et al. |
| 2013/0227710 A1 | 8/2013 | Barak et al. |
| 2013/0232480 A1 | 9/2013 | Winterfeldt et al. |
| 2013/0239125 A1 | 9/2013 | Iorio |
| 2013/0246944 A1 | 9/2013 | Pandiyan et al. |
| 2013/0262556 A1 | 10/2013 | Xu et al. |
| 2013/0263117 A1 | 10/2013 | Konik et al. |
| 2013/0275376 A1 | 10/2013 | Hudlow et al. |
| 2013/0275958 A1 | 10/2013 | Ivanov et al. |
| 2013/0275969 A1 | 10/2013 | Dimitrov |
| 2013/0275975 A1 | 10/2013 | Masuda et al. |
| 2013/0283176 A1 | 10/2013 | Hoole et al. |
| 2013/0290538 A1 | 10/2013 | Gmach et al. |
| 2013/0291087 A1 | 10/2013 | Kailash et al. |
| 2013/0297964 A1 | 11/2013 | Hegdal et al. |
| 2013/0311650 A1 | 11/2013 | Brandwine et al. |
| 2013/0339950 A1 | 12/2013 | Ramarathinam et al. |
| 2013/0346946 A1 | 12/2013 | Pinnix |
| 2013/0346964 A1 | 12/2013 | Nobuoka et al. |
| 2013/0346987 A1 | 12/2013 | Raney et al. |
| 2013/0346994 A1 | 12/2013 | Chen et al. |
| 2013/0347095 A1 | 12/2013 | Barjatiya et al. |
| 2014/0007097 A1 | 1/2014 | Chin et al. |
| 2014/0019523 A1 | 1/2014 | Heymann et al. |
| 2014/0019735 A1 | 1/2014 | Menon et al. |
| 2014/0019965 A1 | 1/2014 | Neuse et al. |
| 2014/0019966 A1 | 1/2014 | Neuse et al. |
| 2014/0040343 A1 | 2/2014 | Nickolov et al. |
| 2014/0040857 A1 | 2/2014 | Trinchini et al. |
| 2014/0040880 A1 | 2/2014 | Brownlow et al. |
| 2014/0047261 A1 | 2/2014 | Patiejunas et al. |
| 2014/0059209 A1 | 2/2014 | Alnoor |
| 2014/0059226 A1 | 2/2014 | Messerli et al. |
| 2014/0059552 A1 | 2/2014 | Cunningham et al. |
| 2014/0068235 A1 | 3/2014 | Nightingale et al. |
| 2014/0068568 A1 | 3/2014 | Wisnovsky |
| 2014/0068611 A1 | 3/2014 | McGrath et al. |
| 2014/0081984 A1 | 3/2014 | Sitsky et al. |
| 2014/0082165 A1 | 3/2014 | Marr et al. |
| 2014/0082201 A1 | 3/2014 | Shankari et al. |
| 2014/0101649 A1 | 4/2014 | Kamble et al. |
| 2014/0108722 A1 | 4/2014 | Lipchuk et al. |
| 2014/0109087 A1 | 4/2014 | Jujare et al. |
| 2014/0109088 A1 | 4/2014 | Dournov et al. |
| 2014/0129667 A1 | 5/2014 | Ozawa |
| 2014/0130040 A1 | 5/2014 | Lemanski |
| 2014/0137110 A1 | 5/2014 | Engle et al. |
| 2014/0173614 A1 | 6/2014 | Konik et al. |
| 2014/0173616 A1 | 6/2014 | Bird et al. |
| 2014/0180862 A1 | 6/2014 | Certain et al. |
| 2014/0189677 A1 | 7/2014 | Curzi et al. |
| 2014/0201735 A1 | 7/2014 | Kannan et al. |
| 2014/0207912 A1 | 7/2014 | Thibeault |
| 2014/0215073 A1 | 7/2014 | Dow et al. |
| 2014/0215574 A1 | 7/2014 | Erb et al. |
| 2014/0222866 A1 | 8/2014 | Joneja |
| 2014/0229221 A1 | 8/2014 | Shih et al. |
| 2014/0245297 A1 | 8/2014 | Hackett |
| 2014/0279581 A1 | 9/2014 | Devereaux |
| 2014/0280325 A1 | 9/2014 | Krishnamurthy et al. |
| 2014/0282615 A1 | 9/2014 | Cavage et al. |
| 2014/0282629 A1 | 9/2014 | Gupta et al. |
| 2014/0283045 A1 | 9/2014 | Brandwine et al. |
| 2014/0289286 A1 | 9/2014 | Gusak |
| 2014/0298295 A1 | 10/2014 | Overbeck |
| 2014/0304698 A1 | 10/2014 | Chigurapati et al. |
| 2014/0304815 A1 | 10/2014 | Maeda |
| 2014/0317617 A1 | 10/2014 | O'Donnell |
| 2014/0344457 A1 | 11/2014 | Bruno, Jr. et al. |
| 2014/0344736 A1 | 11/2014 | Ryman et al. |

(56) References Cited

U.S. PATENT DOCUMENTS

| | | | |
|---|---|---|---|
| 2014/0351943 A1* | 11/2014 | Gianniotis | H04L 63/0407 726/26 |
| 2014/0380085 A1 | 12/2014 | Rash et al. | |
| 2015/0033241 A1 | 1/2015 | Jackson et al. | |
| 2015/0039891 A1 | 2/2015 | Ignatchenko et al. | |
| 2015/0040229 A1 | 2/2015 | Chan et al. | |
| 2015/0046926 A1 | 2/2015 | Kenchammana-Hosekote et al. | |
| 2015/0052258 A1 | 2/2015 | Johnson et al. | |
| 2015/0058914 A1 | 2/2015 | Yadav | |
| 2015/0067830 A1 | 3/2015 | Johansson et al. | |
| 2015/0074659 A1 | 3/2015 | Madsen et al. | |
| 2015/0081885 A1 | 3/2015 | Thomas et al. | |
| 2015/0106805 A1 | 4/2015 | Melander et al. | |
| 2015/0120928 A1 | 4/2015 | Gummaraju et al. | |
| 2015/0134626 A1 | 5/2015 | Theimer et al. | |
| 2015/0135287 A1 | 5/2015 | Medeiros et al. | |
| 2015/0142952 A1 | 5/2015 | Bragstad et al. | |
| 2015/0143381 A1 | 5/2015 | Chin et al. | |
| 2015/0178110 A1 | 6/2015 | Li et al. | |
| 2015/0186129 A1 | 7/2015 | Apte et al. | |
| 2015/0188775 A1 | 7/2015 | Van Der Walt et al. | |
| 2015/0199218 A1 | 7/2015 | Wilson et al. | |
| 2015/0205596 A1 | 7/2015 | Hiltegen et al. | |
| 2015/0227598 A1 | 8/2015 | Hahn et al. | |
| 2015/0235144 A1 | 8/2015 | Gusev et al. | |
| 2015/0242225 A1 | 8/2015 | Muller et al. | |
| 2015/0254248 A1 | 9/2015 | Burns et al. | |
| 2015/0256621 A1 | 9/2015 | Noda et al. | |
| 2015/0261578 A1 | 9/2015 | Greden et al. | |
| 2015/0289220 A1 | 10/2015 | Kim et al. | |
| 2015/0309923 A1 | 10/2015 | Iwata et al. | |
| 2015/0319160 A1 | 11/2015 | Ferguson et al. | |
| 2015/0332048 A1 | 11/2015 | Mooring et al. | |
| 2015/0339479 A1* | 11/2015 | Wang | G06F 21/6263 726/22 |
| 2015/0350701 A1 | 12/2015 | Lemus et al. | |
| 2015/0356294 A1 | 12/2015 | Tan et al. | |
| 2015/0363181 A1 | 12/2015 | Alberti et al. | |
| 2015/0370560 A1 | 12/2015 | Tan et al. | |
| 2015/0371244 A1 | 12/2015 | Neuse et al. | |
| 2015/0372807 A1 | 12/2015 | Khoyi et al. | |
| 2015/0378762 A1 | 12/2015 | Saladi et al. | |
| 2015/0378764 A1 | 12/2015 | Sivasubramanian et al. | |
| 2015/0378765 A1 | 12/2015 | Singh et al. | |
| 2015/0379167 A1 | 12/2015 | Griffith et al. | |
| 2016/0012099 A1 | 1/2016 | Tuatini et al. | |
| 2016/0019536 A1 | 1/2016 | Ortiz et al. | |
| 2016/0026486 A1 | 1/2016 | Abdallah | |
| 2016/0048606 A1 | 2/2016 | Rubinstein et al. | |
| 2016/0072727 A1 | 3/2016 | Leafe et al. | |
| 2016/0077901 A1 | 3/2016 | Roth et al. | |
| 2016/0092251 A1 | 3/2016 | Wagner | |
| 2016/0098285 A1 | 4/2016 | Davis et al. | |
| 2016/0100036 A1 | 4/2016 | Lo et al. | |
| 2016/0117254 A1 | 4/2016 | Susarla et al. | |
| 2016/0124665 A1 | 5/2016 | Jain et al. | |
| 2016/0140180 A1 | 5/2016 | Park et al. | |
| 2016/0162478 A1* | 6/2016 | Blassin | G06Q 10/06311 706/12 |
| 2016/0191420 A1 | 6/2016 | Nagarajan et al. | |
| 2016/0285906 A1 | 9/2016 | Fine et al. | |
| 2016/0292016 A1 | 10/2016 | Bussard et al. | |
| 2016/0294614 A1 | 10/2016 | Searle et al. | |
| 2016/0306613 A1 | 10/2016 | Busi et al. | |
| 2016/0350099 A1 | 12/2016 | Suparna et al. | |
| 2016/0357536 A1 | 12/2016 | Firlik et al. | |
| 2016/0364265 A1 | 12/2016 | Cao et al. | |
| 2016/0371127 A1 | 12/2016 | Antony et al. | |
| 2016/0371156 A1 | 12/2016 | Merriman | |
| 2016/0378449 A1 | 12/2016 | Khazanchi et al. | |
| 2016/0378554 A1 | 12/2016 | Gummaraju et al. | |
| 2017/0041309 A1 | 2/2017 | Ekambaram et al. | |
| 2017/0060621 A1 | 3/2017 | Whipple et al. | |
| 2017/0068574 A1 | 3/2017 | Cherkasova et al. | |
| 2017/0075749 A1 | 3/2017 | Ambichl et al. | |
| 2017/0083381 A1 | 3/2017 | Cong et al. | |
| 2017/0085447 A1 | 3/2017 | Chen et al. | |
| 2017/0085591 A1 | 3/2017 | Ganda et al. | |
| 2017/0093684 A1 | 3/2017 | Jayaraman et al. | |
| 2017/0093920 A1 | 3/2017 | Ducatel et al. | |
| 2017/0139996 A1 | 5/2017 | Marquardt et al. | |
| 2017/0230499 A1 | 8/2017 | Mumick et al. | |
| 2017/0272462 A1 | 9/2017 | Kraemer et al. | |
| 2017/0286143 A1* | 10/2017 | Wagner | G06F 12/0875 |
| 2017/0357940 A1 | 12/2017 | Radhakrishnan | |
| 2017/0371724 A1 | 12/2017 | Wagner et al. | |
| 2018/0004572 A1* | 1/2018 | Wagner | H04L 67/303 |
| 2018/0046453 A1 | 2/2018 | Nair et al. | |
| 2018/0046482 A1 | 2/2018 | Karve et al. | |
| 2018/0060221 A1 | 3/2018 | Yim et al. | |
| 2018/0067841 A1 | 3/2018 | Mahimkar | |
| 2018/0121245 A1 | 5/2018 | Wagner et al. | |
| 2018/0143865 A1 | 5/2018 | Wagner et al. | |
| 2018/0189457 A1 | 7/2018 | Plummer et al. | |
| 2018/0225230 A1 | 8/2018 | Litichever et al. | |
| 2018/0246903 A1 | 8/2018 | Frerking et al. | |
| 2018/0253333 A1 | 9/2018 | Gupta | |
| 2018/0262533 A1 | 9/2018 | McCaig et al. | |
| 2018/0275987 A1 | 9/2018 | Vandeputte | |
| 2018/0285591 A1* | 10/2018 | Thayer | G06F 21/6245 |
| 2018/0295134 A1 | 10/2018 | Gupta et al. | |
| 2018/0309819 A1 | 10/2018 | Thompson | |
| 2018/0322136 A1* | 11/2018 | Carpentier | G06F 9/452 |
| 2018/0322176 A1 | 11/2018 | Busayarat et al. | |
| 2019/0028552 A1* | 1/2019 | Johnson, II | H04L 67/02 |
| 2019/0034363 A1* | 1/2019 | Palermo | G06F 13/4068 |
| 2019/0072529 A1 | 3/2019 | Andrawes et al. | |
| 2019/0102231 A1 | 4/2019 | Wagner | |
| 2019/0108058 A1 | 4/2019 | Wagner et al. | |
| 2019/0146920 A1* | 5/2019 | Hua | G06F 9/00 711/141 |
| 2019/0155629 A1 | 5/2019 | Wagner et al. | |
| 2019/0171470 A1 | 6/2019 | Wagner | |
| 2019/0196884 A1 | 6/2019 | Wagner | |
| 2019/0227849 A1 | 7/2019 | Wisniewski et al. | |
| 2019/0272162 A1* | 9/2019 | Couillard | G06F 8/60 |
| 2019/0384647 A1 | 12/2019 | Reque et al. | |
| 2019/0391834 A1 | 12/2019 | Mullen et al. | |
| 2019/0391841 A1 | 12/2019 | Mullen et al. | |
| 2020/0004571 A1 | 1/2020 | Piwonka et al. | |
| 2020/0019730 A1* | 1/2020 | Piret | G06F 21/51 |
| 2020/0057680 A1 | 2/2020 | Marriner et al. | |
| 2020/0074109 A1* | 3/2020 | Pieniazek | G06F 16/903 |
| 2020/0104198 A1 | 4/2020 | Hussels et al. | |
| 2020/0104378 A1 | 4/2020 | Wagner et al. | |
| 2020/0218829 A1* | 7/2020 | Bodziony | G06F 16/90335 |
| 2021/0089673 A1 | 3/2021 | Takahashi et al. | |

FOREIGN PATENT DOCUMENTS

| | | |
|---|---|---|
| JP | 2006-107599 A | 4/2006 |
| JP | 2007-538323 A | 12/2007 |
| JP | 2010-026562 A | 2/2010 |
| JP | 2011-233146 A | 11/2011 |
| JP | 2011257847 A | 12/2011 |
| JP | 2013-156996 A | 8/2013 |
| JP | 2014-525624 A | 9/2014 |
| JP | 2017-534107 A | 11/2017 |
| JP | 2017-534967 A | 11/2017 |
| JP | 2018-503896 A | 2/2018 |
| JP | 2018-512087 A | 5/2018 |
| JP | 2018-536213 A | 12/2018 |
| WO | WO 2008/114454 A1 | 9/2008 |
| WO | WO 2009/137567 A1 | 11/2009 |
| WO | WO 2012/039834 A1 | 3/2012 |
| WO | WO 2012/050772 A1 | 4/2012 |
| WO | WO 2013/106257 A1 | 7/2013 |
| WO | WO 2015/078394 A1 | 6/2015 |
| WO | WO 2015/108539 A1 | 7/2015 |
| WO | WO 2016/053950 A1 | 4/2016 |
| WO | WO 2016/053968 A1 | 4/2016 |
| WO | WO 2016/053973 A1 | 4/2016 |
| WO | WO 2016/090292 A1 | 6/2016 |
| WO | WO 2016/126731 A1 | 8/2016 |

(56) References Cited

FOREIGN PATENT DOCUMENTS

| WO | WO 2016/164633 A1 | 10/2016 |
|---|---|---|
| WO | WO 2016/164638 A1 | 10/2016 |
| WO | WO 2017/059248 A1 | 4/2017 |
| WO | WO 2017/112526 A1 | 6/2017 |
| WO | WO 2017/172440 A1 | 10/2017 |
| WO | WO 2018/204530 A1 | 11/2018 |
| WO | WO 2020/005764 A1 | 1/2020 |
| WO | WO 2020/069104 A1 | 4/2020 |

OTHER PUBLICATIONS

Adapter Pattern, Wikipedia, https://en.wikipedia.org/w/index.php?title=Adapter_pattern&oldid=654971255, [retrieved May 26, 2016], 6 pages.

Amazon, "AWS Lambda: Developer Guide", Retrieved from the Internet, Jun. 26, 2016, URL : http://docs.aws.amazon.com/lambda/latest/dg/lambda-dg.pdf, 346 pages.

Amazon, "AWS Lambda: Developer Guide", Retrieved from the Internet, 2019, URL : http://docs.aws.amazon.com/lambda/ latest/dg/lambda-dg.pdf, 521 pages.

Balazinska et al., Moirae: History-Enhanced Monitoring, Published: 2007, 12 pages.

Ben-Yehuda et al., "Deconstructing Amazon EC2 Spot Instance Pricing", ACM Transactions on Economics and Computation 1.3, 2013, 15 pages.

Bhadani et al., Performance evaluation of web servers using central load balancing policy over virtual machines on cloud, Jan. 2010, 4 pages.

CodeChef ADMIN discussion web page, retrieved from https://discuss.codechef.com/t/what-are-the-memory-limit-and-stack-size-on-codechef/14159, 2019.

CodeChef IDE web page, Code, Compile & Run, retrieved from https://www.codechef.com/ide, 2019.

Czajkowski, G., and L. Daynes, Multitasking Without Compromise: A Virtual Machine Evolution 47(4a):60-73, ACM SIGPLAN Notices—Supplemental Issue, Apr. 2012.

Das et al., Adaptive Stream Processing using Dynamic Batch Sizing, 2014, 13 pages.

Deis, Container, 2014, 1 page.

Dombrowski, M., et al., Dynamic Monitor Allocation in the Java Virtual Machine, JTRES '13, Oct. 9-11, 2013, pp. 30-37.

Dynamic HTML, Wikipedia page from date Mar. 27, 2015, retrieved using the WayBackMachine, from https://web.archive.org/web/20150327215418/https://en.wikipedia.org/wiki/Dynamic_HTML, 2015, 6 pages.

Espadas, J., et al., A Tenant-Based Resource Allocation Model for Scaling Software-as-a-Service Applications Over Cloud Computing Infrastructures, Future Generation Computer Systems, vol. 29, pp. 273-286, 2013.

Han et al., Lightweight Resource Scaling for Cloud Applications, 2012, 8 pages.

Hoffman, Auto scaling your website with Amazon Web Services (AWS)—Part 2, Cardinalpath, Sep. 2015, 15 pages.

http://discuss.codechef.com discussion web page from date Nov. 11, 2012, retrieved using the WayBackMachine, from https://web.archive.org/web/20121111040051/http://discuss.codechef.com/questions/2881 /why-are-simple-java-programs-using-up-so-much-space, 2012.

https://www.codechef.com code error help page from Jan. 2014, retrieved from https://www.codechef.com/JAN14/status/ERROR,va123, 2014.

http://www.codechef.com/ide web page from date Apr. 5, 2015, retrieved using the WayBackMachine, from https://web.archive.org/web/20150405045518/http://www.codechef.com/ide, 2015.

Kamga et al., Extended scheduler for efficient frequency scaling in virtualized systems, Jul. 2012, 8 pages.

Kato, et al. "Web Service Conversion Architecture of the Web Application and Evaluation"; Research Report from Information Processing Society, Apr. 3, 2006 with Machine Translation.

Kazempour et al., AASH: an asymmetry-aware scheduler for hypervisors, Jul. 2010, 12 pages.

Kraft et al., 10 performance prediction in consolidated virtualized environments, Mar. 2011, 12 pages.

Krsul et al., "VMPlants: Providing and Managing Virtual Machine Execution Environments for Grid Computing", Supercomputing, 2004. Proceedings of the ACM/IEEESC 2004 Conference Pittsburgh, PA, XP010780332, Nov. 6-12, 2004, 12 pages.

Meng et al., Efficient resource provisioning in compute clouds via VM multiplexing, Jun. 2010, 10 pages.

Merkel, "Docker: Lightweight Linux Containers for Consistent Development and Deployment", Linux Journal, vol. 2014 Issue 239, Mar. 2014, XP055171140, 16 pages.

Monteil, Coupling profile and historical methods to predict execution time of parallel applications. Parallel and Cloud Computing, 2013, <hal-01228236, pp. 81-89.

Nakajima, J., et al., Optimizing Virtual Machines Using Hybrid Virtualization, SAC '11, Mar. 21-25, 2011, TaiChung, Taiwan, pp. 573-578.

Qian, H., and D. Medhi, et al., Estimating Optimal Cost of Allocating Virtualized Resources With Dynamic Demand, ITC 2011, Sep. 2011, pp. 320-321.

Sakamoto, et al. "Platform for Web Services using Proxy Server"; Research Report from Information Processing Society, Mar. 22, 2002, vol. 2002, No. 31.

Shim (computing), Wikipedia, https://en.wikipedia.org/w/index.php?title+Shim_(computing)&oldid+654971528, [retrieved on May 26, 2016], 2 pages.

Stack Overflow, Creating a database connection pool, 2009, 4 pages.

Tan et al., Provisioning for large scale cloud computing services, Jun. 2012, 2 pages.

Vaghani, S.B., Virtual Machine File System, ACM SIGOPS Operating Systems Review 44(4):57-70, Dec. 2010.

Vaquero, L., et al., Dynamically Scaling Applications in the cloud, ACM SIGCOMM Computer Communication Review 41(1):45-52, Jan. 2011.

Wang et al., "Improving utilization through dynamic VM resource allocation in hybrid cloud environment", Parallel and Distributed V Systems (ICPADS), IEEE, 2014. Retrieved on Feb. 14, 2019, Retrieved from the internet: URL<https://ieeexplore.ieee.org/stamp/stamp.jsp?tp=&arnumber=7097814, 8 pages.

Wikipedia "API" pages from date Apr. 7, 2015, retrieved using the WayBackMachine from https://web.archive.org/web/20150407191158/https://en .wikipedia.org/wiki/Application_programming_interface.

Wikipedia List_of_HTTP status_codes web page, retrieved from https://en.wikipedia.org/wiki/List_of_HTTP status_codes, 2019.

Wikipedia Recursion web page from date Mar. 26, 2015, retrieved using the WayBackMachine, from https://web.archive.org/web/20150326230100/https://en.wikipedia.org/wiki/Recursion_(computer _science), 2015.

Wikipedia subroutine web page, retrieved from https://en.wikipedia.org/wiki/Subroutine, 2019.

Wu et al., HC-Midware: A Middleware to Enable High Performance Communication System Simulation in Heterogeneous Cloud, Association for Computing Machinery, Oct. 20-22, 2017, 10 pages.

Yamasaki et al. "Model-based resource selection for efficient virtual cluster deployment", Virtualization Technology in Distributed Computing, ACM, Nov. 2007, pp. 1-7.

Yue et al., AC 2012-4107: Using Amazon EC2 in Computer and Network Security Lab Exercises: Design, Results, and Analysis, 2012, American Society for Engineering Education 2012.

Zheng, C., and D. Thain, Integrating Containers into Workflows: A Case Study Using Makeflow, Work Queue, and Docker, VTDC '15, Jun. 15, 2015, Portland, Oregon, pp. 31-38.

Singh et al., Enhancing Cloud Data Security with Data Encryption & Tokenization, International Journal of Current Trends in Engineering & Research, vol. 2, Issue 5, May 2016, pp. 191-196.

International Search Report and Written Opinion for PCT Application No. PCT/US2020/051955 dated Dec. 7, 2020 in 19 pages.

International Search Report and Written Opinion for PCT Application No. PCT/US2020/051928 dated Dec. 3, 2020 in 17 pages.

(56) References Cited

OTHER PUBLICATIONS

International Search Report and Written Opinion for PCT Application No. PCT/US2020/052280 dated Dec. 17, 2020 in 16 pages.
International Search Report and Written Opinion for PCT Application No. PCT/US2020/052419 dated Jan. 12, 2021 in 17 pages.

* cited by examiner

ON-DEMAND EXECUTION OF OBJECT TRANSFORMATION CODE IN OUTPUT PATH OF OBJECT STORAGE SERVICE

CROSS-REFERENCE TO CONCURRENTLY-FILED APPLICATIONS

This application is being filed concurrently with the following U.S. Applications, each of which is incorporated herein by reference in its entirety:

| U.S. application Ser. No. | Title | Filing Date |
|---|---|---|
| 16/586,619 | EXECUTION OF OWNER-SPECIFIED CODE DURING INPUT/OUTPUT PATH TO OBJECT STORAGE SERVICE | Sep. 27, 2019 |
| 16/586,704 | INSERTING OWNER-SPECIFIED DATA PROCESSING PIPELINES INTO INPUT/OUTPUT PATH OF OBJECT STORAGE SERVICE | Sep. 27, 2019 |
| 16/586,673 | INSERTING EXECUTIONS OF OWNER-SPECIFIED CODE INTO INPUT/OUTPUT PATH OF OBJECT STORAGE SERVICE | Sep. 27, 2019 |
| 16/586,580 | ON-DEMAND EXECUTION OF OBJECT COMBINATION CODE IN OUTPUT PATH OF OBJECT STORAGE SERVICE | Sep. 27, 2019 |
| 16/586,539 | ON-DEMAND EXECUTION OF OBJECT FILTER CODE IN OUTPUT PATH OF OBJECT STORAGE SERVICE | Sep. 27, 2019 |
| 16/586,825 | ON-DEMAND CODE EXECUTION IN INPUT PATH OF DATA UPLOADED TO STORAGE SERVICE IN MULTIPLE DATA PORTIONS | Sep. 27, 2019 |
| 16/586,816 | ON-DEMAND CODE OBFUSCATION OF DATA IN INPUT PATH OF OBJECT STORAGE SERVICE | Sep. 27, 2019 |
| 16/586,818 | ON-DEMAND INDEXING OF DATA IN INPUT PATH OF OBJECT STORAGE SERVICE | Sep. 27, 2019 |
| 16/586,647 | DATA ACCESS CONTROL SYSTEM FOR OBJECT STORAGE SERVICE BASED ON OWNER-DEFINED CODE | Sep. 27, 2019 |
| 16/586,659 | USER-SPECIFIC DATA MANIPULATION SYSTEM FOR OBJECT STORAGE SERVICE BASED ON USER-SUBMITTED CODE | Sep. 27, 2019 |
| 16/586,686 | CODE EXECUTION ENVIRONMENT CUSTOMIZATION SYSTEM FOR OBJECT STORAGE SERVICE | Sep. 27, 2019 |
| 16/586,626 | EXECUTION OF USER-SUBMITTED CODE ON A STREAM OF DATA | Sep. 27, 2019 |
| 16/586,694 | SEQUENTIAL EXECUTION OF USER-SUBMITTED CODE AND NATIVE FUNCTIONS | Sep. 27, 2019 |

BACKGROUND

Computing devices can utilize communication networks to exchange data. Companies and organizations operate computer networks that interconnect a number of computing devices to support operations or to provide services to third parties. The computing devices can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In addition to computational resources, data centers provide a number of other beneficial services to client devices. For example, data centers may provide data storage services configured to store data submitted by client devices, and enable retrieval of that data over a network. A variety of types of data storage services can be provided, often varying according to their input/output (I/O) mechanisms. For example, database services may allow I/O based on a database query language, such as the Structured Query Language (SQL). Block storage services may allow I/O based on modification to one or more defined-length blocks, in a manner similar to how an operating system interacts with local storage, and may thus facilitate virtualized disk drives usable, for example, to store an operating system of a virtual machine. Object storage services may allow I/O at the level of individual objects or resources, such as individual files, which may vary in content and length. For example, an object storage service may provide an interface compliant with the Representational State Transfer (REST) architectural style, such as by allowing I/O based on calls designating input data and a hypertext transport protocol request method (e.g., GET, PUT, POST, DELETE, etc.) to be applied to that data. By transmitting a call designating input data and a request method, a client can thus retrieve the data from an object storage service, write the data to the object storage service as a new object, modify an existing object, etc.

DETAILED DESCRIPTION

Figure 1:
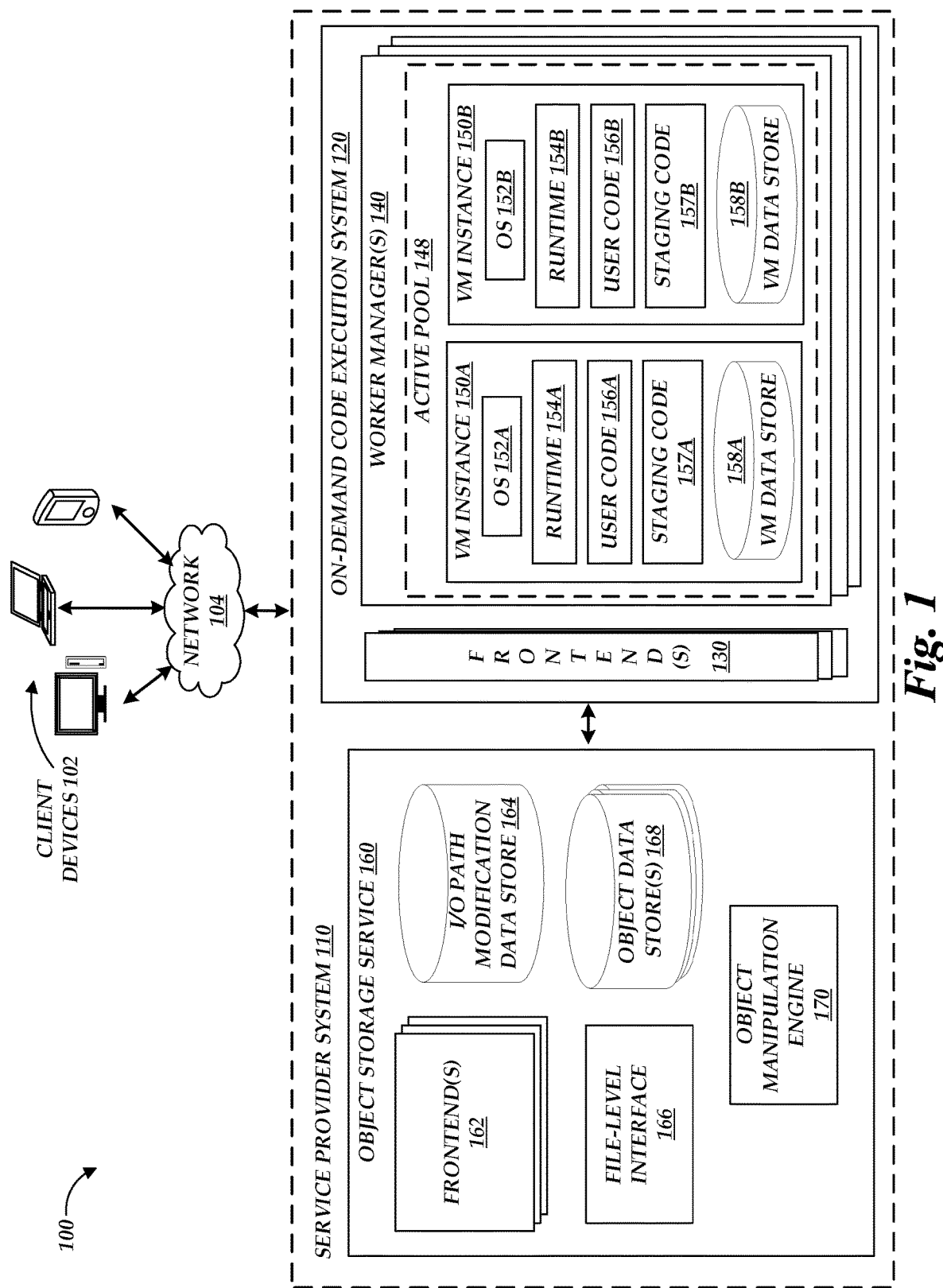
FIG. 1 is a block diagram depicting an illustrative environment in which an object storage service can operate in conjunction with an on-demand code execution system to implement functions in connection with input/output (I/O) requests to the object storage service.

Generally described, aspects of the present disclosure relate to handling requests to read or write to data objects on an object storage system. More specifically, aspects of the present disclosure relate to modification of an input/output (I/O) path for an object storage service, such that one or more data manipulations can be inserted into the I/O path to modify the data to which a called request method is applied, without requiring a calling client device to specify such data manipulations. In one embodiment, data manipulations occur through execution of user-submitted code, which may be provided for example by an owner of a collection of data objects on an object storage system in order to control interactions with that data object. For example, in cases where an owner of an object collection wishes to ensure that end users do not submit objects to the collection including any personally identifying information (to ensure end user's privacy), the owner may submit code executable to strip such information from a data input. The owner may further specify that such code should be executed during each write of a data object to the collection. Accordingly, when an end user attempts to write input data to the collection as a data object (e.g., via an HTTP PUT method), the code may be first executed against the input data, and resulting output data may be written to the collection as the data object. Notably, this may result in the operation requested by the end user—such as a write operation—being applied not to the end user's input data, but instead to the data output by the data manipulation (e.g., owner-submitted) code. In this way, owners of data collections control I/O to those collections without relying on end users to comply with owner requirements. Indeed, end users (or any other client device) may be unaware that modifications to I/O are occurring. As such, embodiments of the present disclosure enable modification of I/O to an object storage service without modification of an interface to the service, ensuring inter-compatibility with other pre-existing software utilizing the service.

In some embodiments of the present disclosure, data manipulations may occur on an on-demand code execution system, sometimes referred to as a serverless execution system. Generally described, on-demand code execution systems enable execution of arbitrary user-designated code, without requiring the user to create, maintain, or configure an execution environment (e.g., a physical or virtual machine) in which the code is executed. For example, whereas conventional computing services often require a user to provision a specific device (virtual or physical), install an operating system on the device, configure application, define network interfaces, and the like, an on-demand code execution system may enable a user to submit code and may provide to the user an application programming interface (API) that, when used, enables the user to request execution of the code. On receiving a call through the API, the on-demand code execution system may generate an execution environment for the code, provision the environment with the code, execute the code, and provide a result. Thus, an on-demand code execution system can remove a need for a user to handle configuration and management of environments for code execution. Example techniques for implementing an on-demand code execution system are disclosed, for example, within U.S. Pat. No. 9,323,556, entitled "PROGRAMMATIC EVENT DETECTION AND MESSAGE GENERATION FOR REQUESTS TO EXECUTE PROGRAM CODE," and filed Sep. 30, 2014 (the "'556 Patent"), the entirety of which is hereby incorporated by reference.

Due to the flexibility of on-demand code execution system to execute arbitrary code, such a system can be used to create a variety of network services. For example, such a system could be used to create a "micro-service," a network service that implements a small number of functions (or only one function), and that interacts with other services to provide an application. In the context of on-demand code execution systems, the code executed to create such a service is often referred to as a "function" or a "task," which can be executed to implement the service. Accordingly, one technique for performing data manipulations within the I/O path of an object storage service may be to create a task on an on-demand code execution system that, when executed, performs the required data manipulation. Illustratively, the task could provide an interface similar or identical to that of the object storage service, and be operable to obtain input data in response to a request method call (e.g., HTTP PUT or GET calls), execute the code of the task against the input data, and perform a call to the object storage service for implementation of the request method on resulting output data. A downside of this technique is a complexity. For example, end users might be required under this scenario to submit I/O requests to the on-demand code execution system, rather than the object storage service, to ensure execution of the task. Should an end user submit a call directly to the object storage service, task execution may not occur, and thus an owner would not be enabled to enforce a desired data manipulation for an object collection. In addition, this technique may require that code of a task be authored to both provide an interface to end users that enables handling of calls to implement request methods on input data, and an interface that enables performance of calls from the task execution to the object storage service. Implementation of these network interfaces may significantly increase the complexity of the required code, thus disincentivizing owners of data collections from using this technique. Moreover, where user-submitted code directly implements network communication, that code may need to be varied according to the request method handled. For example, a first set of code may be required to support GET operations, a second set of code may be required to support PUT operations, etc. Because embodiments of the present disclosure relieve the user-submitted code of the requirement of handling network communications, one set of code may in some cases be enabled to handle multiple request methods.

To address the above-noted problems, embodiments of the present disclosure can enable strong integration of serverless task executions with interfaces of an object storage service, such that the service itself is configured to invoke a task execution on receiving an I/O request to a data collection. Moreover, generation of code to perform data manipulations may be simplified by configuring the object storage service to facilitate data input and output from a task execution, without requiring the task execution to itself implement network communications for I/O operations. Specifically, an object storage service and on-demand code execution system can be configured in one embodiment to "stage" input data to a task execution in the form of a handle (e.g., a POSIX-compliant descriptor) to an operating-system-level input/output stream, such that code of a task can manipulate the input data via defined-stream operations (e.g., as if the data existed within a local file system). This stream-level access to input data can be contrasted, for example, with network-level access of input data, which generally requires that code implement network communication to retrieve the input data. Similarly, the object storage service and on-demand code execution system can be configured to provide an output stream handle representing an output stream to which a task execution may write output. On detecting writes to the output stream, the object storage service and on-demand code execution system may handle such writes as output data of the task execution, and apply a called request method to the output data. By enabling a task to manipulate data based on input and output streams passed to the task, as opposed to requiring the code to handle data communications over a network, the code of the task can be greatly simplified.

Another benefit of enabling a task to manipulate data based on input and output handles is increased security. A general-use on-demand code execution system may operate permissively with respect to network communications from a task execution, enabling any network communication from the execution unless such communication is explicitly denied. This permissive model is reflective of the use of task executions as micro-services, which often require interaction with a variety of other network services. However, this permissive model also decreases security of the function, since potentially malicious network communications can also reach the execution. In contrast to a permissive model, task executions used to perform data manipulations on an object storage system's I/O path can utilize a restrictive model, whereby only explicitly-allowed network communications can occur from an environment executing a task. Illustratively, because data manipulation can occur via input and output handles, it is envisioned that many or most tasks used to perform data manipulation in embodiments of the present disclosure would require no network communications to occur at all, greatly increasing security of such an execution. Where a task execution does require some network communications, such as to contact an external service to assist with a data manipulation, such communications can be explicitly allowed, or "whitelisted," thus exposing the execution in only a strictly limited manner.

In some embodiments, a data collection owner may require only a single data manipulation to occur with respect to I/O to the collection. Accordingly, the object storage service may detect I/O to the collection, implement the data manipulation (e.g., by executing a serverless task within an environment provisioned with input and output handles), and apply the called request method to the resulting output data. In other embodiments, an owner may request multiple data manipulations occur with respect to an I/O path. For example, to increase portability and reusability, an owner may author multiple serverless tasks, which may be combined in different manners on different I/O paths. Thus, for each path, the owner may define a series of serverless tasks to be executed on I/O to the path. Moreover, in some configurations, an object storage system may natively provide one or more data manipulations. For example, an object storage system may natively accept requests for only portions of an object (e.g., of a defined byte range), or may natively enable execution of queries against data of an object (e.g., SQL queries). In some embodiments, any combination of various native manipulations and serverless task-based manipulations may be specified for a given I/O path. For example, an owner may specify that, for a particular request to read an object, a given SQL query be executed against the object, the output of which is processed via a first task execution, the output of which is processed via a second task execution, etc. The collection of data manipulations (e.g., native manipulations, serverless task-based manipulations, or a combination thereof) applied to an I/O path is generally referred to herein as a data processing "pipeline" applied to the I/O path.

In accordance with aspects of the present disclosure, a particular path modification (e.g., the addition of a pipeline) applied to an I/O path may vary according to attributes of the path, such as a client device from which an I/O request originates or an object or collection of objects within the request. For example, pipelines may be applied to individual objects, such that the pipeline is applied to all I/O requests for the object, or a pipeline may be selectively applied only when certain client devices access the object. In some instances, an object storage service may provide multiple I/O paths for an object or collection. For example, the same object or collection may be associated with multiple resource identifiers on the object storage service, such that the object or collection can be accessed through the multiple identifiers (e.g., uniform resource identifiers, or URIs), which illustratively correspond to different network-accessible endpoints. In one embodiment, different pipelines may be applied to each I/O path for a given object. For example, a first I/O path may be associated with unprivileged access to a data set, and thus be subject to data manipulations that remove confidential information from the data set prior during retrieval. A second I/O path may be associated with privileged access, and thus not be subject to those data manipulations. In some instances, pipelines may be selectively applied based on other criteria. For example, whether a pipeline is applied may be based on time of day, a number or rate of accesses to an object or collection, etc.

As will be appreciated by one of skill in the art in light of the present disclosure, the embodiments disclosed herein improve the ability of computing systems, such as object storage systems, to provide and enforce data manipulation functions against data objects. Whereas prior techniques generally depend on external enforcement of data manipulation functions (e.g., requesting that users strip personal information before uploading it), embodiments of the present disclosure enable direct insertion of data manipulation into an I/O path for the object storage system. Moreover, embodiments of the present disclosure provide a secure mechanism for implementing data manipulations, by providing for serverless execution of manipulation functions within an isolated execution environment. Embodiments of the present disclosure further improve operation of serverless functions, by enabling such functions to operate on the basis of local stream (e.g., "file") handles, rather than requiring that functions act as network-accessible services. The presently disclosed embodiments therefore address technical problems inherent within computing systems, such as the difficulty of enforcing data manipulations at storage systems and the complexity of creating external services to enforce such data manipulations. These technical problems are addressed by the various technical solutions described herein, including the insertion of data processing pipelines into an I/O path for an object or object collection, potentially without knowledge of a requesting user, the use of serverless functions to perform aspects of such pipelines, and the use of local stream handles to enable simplified creation of serverless functions. Thus, the present disclosure represents an improvement on existing data processing systems and computing systems in general.

The general execution of tasks on the on-demand code execution system will now be discussed. As described in detail herein, the on-demand code execution system may provide a network-accessible service enabling users to submit or designate computer-executable source code to be executed by virtual machine instances on the on-demand code execution system. Each set of code on the on-demand code execution system may define a "task," and implement specific functionality corresponding to that task when executed on a virtual machine instance of the on-demand code execution system. Individual implementations of the task on the on-demand code execution system may be referred to as an "execution" of the task (or a "task execution"). In some cases, the on-demand code execution system may enable users to directly trigger execution of a task based on a variety of potential events, such as transmission of an application programming interface ("API") call to the on-demand code execution system, or transmission of a specially formatted hypertext transport protocol ("HTTP") packet to the on-demand code execution system. In accordance with embodiments of the present disclosure, the on-demand code execution system may further interact with an object storage system, in order to execute tasks during application of a data manipulation pipeline to an 110 path. The on-demand code execution system can therefore execute any specified executable code "on-demand," without requiring configuration or maintenance of the underlying hardware or infrastructure on which the code is executed. Further, the on-demand code execution system may be configured to execute tasks in a rapid manner (e.g., in under 100 milliseconds [ms]), thus enabling execution of tasks in "real-time" (e.g., with little or no perceptible delay to an end user). To enable this rapid execution, the on-demand code execution system can include one or more virtual machine instances that are "pre-warmed" or pre-initialized (e.g., booted into an operating system and executing a complete or substantially complete runtime environment) and configured to enable execution of user-defined code, such that the code may be rapidly executed in response to a request to execute the code, without delay caused by initializing the virtual machine instance. Thus, when an execution of a task is triggered, the code corresponding to that task can be executed within a pre-initialized virtual machine in a very short amount of time.

Specifically, to execute tasks, the on-demand code execution system described herein may maintain a pool of executing virtual machine instances that are ready for use as soon as a request to execute a task is received. Due to the pre-initialized nature of these virtual machines, delay (sometimes referred to as latency) associated with executing the task code (e.g., instance and language runtime startup time) can be significantly reduced, often to sub-100 millisecond levels. Illustratively, the on-demand code execution system may maintain a pool of virtual machine instances on one or more physical computing devices, where each virtual machine instance has one or more software components (e.g., operating systems, language runtimes, libraries, etc.) loaded thereon. When the on-demand code execution system receives a request to execute program code (a "task"), the on-demand code execution system may select a virtual machine instance for executing the program code of the user based on the one or more computing constraints related to the task (e.g., a required operating system or runtime) and cause the task to be executed on the selected virtual machine instance. The tasks can be executed in isolated containers that are created on the virtual machine instances, or may be executed within a virtual machine instance isolated from other virtual machine instances acting as environments for other tasks. Since the virtual machine instances in the pool have already been booted and loaded with particular operating systems and language runtimes by the time the requests are received, the delay associated with finding compute capacity that can handle the requests (e.g., by executing the user code in one or more containers created on the virtual machine instances) can be significantly reduced.

As used herein, the term "virtual machine instance" is intended to refer to an execution of software or other executable code that emulates hardware to provide an environment or platform on which software may execute (an example "execution environment"). Virtual machine instances are generally executed by hardware devices, which may differ from the physical hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a device into a number of logical sub-devices (each referred to as a "virtual machine instance"). While virtual machine instances can generally provide a level of abstraction away from the hardware of an underlying physical device, this abstraction is not required. For example, assume a device implements a plurality of virtual machine instances, each of which emulate hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying hardware, such as hardware pass-through techniques, may be used, as well.

While a virtual machine executing an operating system is described herein as one example of an execution environment, other execution environments are also possible. For example, tasks or other processes may be executed within a software "container," which provides a runtime environment without itself providing virtualization of hardware. Containers may be implemented within virtual machines to provide additional security, or may be run outside of a virtual machine instance.

The foregoing aspects and many of the attendant advantages of this disclosure will become more readily appreciated as the same become better understood by reference to the following description, when taken in conjunction with the accompanying drawings.

FIG. 1 is a block diagram of an illustrative operating environment 100 in which a service provider system 110 operates to enable client devices 102 to perform I/O operations on objects stored within an object storage service 160 and to apply path modifications to such I/O operations, which modifications may include execution of user-defined code on an on-demand code execution system 120.

By way of illustration, various example client devices 102 are shown in communication with the service provider system 110, including a desktop computer, laptop, and a mobile phone. In general, the client devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like.

Generally described, the object storage service 160 can operate to enable clients to read, write, modify, and delete data objects, each of which represents a set of data associated with an identifier (an "object identifier" or "resource identifier") that can be interacted with as an individual resource. For example, an object may represent a single file submitted by a client device 102 (though the object storage service 160 may or may not store such an object as a single file). This object-level interaction can be contrasted with other types of storage services, such as block-based storage services providing data manipulation at the level of individual blocks or database storage services providing data manipulation at the level of tables (or parts thereof) or the like.

The object storage service 160 illustratively includes one or more frontends 162, which provide an interface (a command-line interface (CLIs), application programing interface (APIs), or other programmatic interface) through which client devices 102 can interface with the service 160 to configure the service 160 on their behalf and to perform I/O operations on the service 160. For example, a client device 102 may interact with a frontend 162 to create a collection of data objects on the service 160 (e.g., a "bucket" of objects) and to configure permissions for that collection. Client devices 102 may thereafter create, read, update, or delete objects within the collection based on the interfaces of the frontends 162. In one embodiment, the frontend 162 provides a REST-compliant HTTP interface supporting a variety of request methods, each of which corresponds to a requested I/O operation on the service 160. By way of non-limiting example, request methods may include:

- a GET operation requesting retrieval of an object stored on the service 160 by reference to an identifier of the object;
- a PUT operation requesting storage of an object to be stored on the service 160, including an identifier of the object and input data to be stored as the object;
- a DELETE operation requesting deletion of an object stored on the service 160 by reference to an identifier of the object; and
- a LIST operation requesting listing of objects within an object collection stored on the service 160 by reference to an identifier of the collection. A variety of other operations may also be supported. For example, the service 160 may provide a POST operation similar to a PUT operation but associated with a different upload mechanism (e.g., a browser-based HTML upload), or a HEAD operation enabling retrieval of metadata for an object without retrieving the object itself. In some embodiments, the service 160 may enable operations that combine one or more of the above operations, or combining an operation with a native data manipulation. For example, the service 160 may provide a COPY operation enabling copying of an object stored on the service 160 to another object, which operation combines a GET operation with a PUT operation. As another example, the service 160 may provide a SELECT operation enabling specification of an SQL query to be applied to an object prior to returning the contents of that object, which combines an application of an SQL query to a data object (a native data manipulation) with a GET operation. As yet another example, the service 160 may provide a "byte range" GET, which enables a GET operation on only a portion of a data object. In some instances, the operation requested by a client device 102 on the service 160 may be transmitted to the service via an HTTP request, which itself may include an HTTP method. In some cases, such as in the case of a GET operation, the HTTP method specified within the request may match the operation requested at the service 160. However, in other cases, the HTTP method of a request may not match the operation requested at the service 160. For example, a request may utilize an HTTP POST method to transmit a request to implement a SELECT operation at the service 160.

During general operation, frontends 162 may be configured to obtain a call to a request method, and apply that request method to input data for the method. For example, a frontend 162 can respond to a request to PUT input data into the service 160 as an object by storing that input data as the object on the service 160. Objects may be stored, for example, on object data stores 168, which correspond to any persistent or substantially persistent storage (including hard disk drives (HDDs), solid state drives (SSDs), network accessible storage (NAS), storage area networks (SANs), non-volatile random access memory (NVRAM), or any of a variety of storage devices known in the art). As a further example, the frontend 162 can respond to a request to GET an object from the service 160 by retrieving the object from the stores 168 (the object representing input data to the GET resource request), and returning the object to a requesting client device 102.

In some cases, calls to a request method may invoke one or more native data manipulations provided by the service 160. For example, a SELECT operation may provide an SQL-formatted query to be applied to an object (also identified within the request), or a GET operation may provide a specific range of bytes of an object to be returned. The service 160 illustratively includes an object manipulation engine 170 configured to perform native data manipulations, which illustratively corresponds to a device configured with software executable to implement native data manipulations on the service 160 (e.g., by stripping non-selected bytes from an object for a byte-range GET, by applying an SQL query to an object and returning results of the query, etc.).

In accordance with embodiments of the present disclosure, the service 160 can further be configured to enable modification of an I/O path for a given object or collection of objects, such that a called request method is applied to an output of a data manipulation function, rather than the resource identified within the call. For example, the service 160 may enable a client device 102 to specify that GET operations for a given object should be subject to execution of a user-defined task on the on-demand code execution system 120, such that the data returned in response to the operation is the output of a task execution rather than the requested object. Similarly, the service 160 may enable a client device 102 to specify that PUT operations to store a given object should be subject to execution of a user-defined task on the on-demand code execution system 120, such that the data stored in response to the operation is the output of a task execution rather than the data provided for storage by a client device 102. As will be discussed in more detail below, path modifications may include specification of a pipeline of data manipulations, including native data manipulations, task-based manipulations, or combinations thereof. Illustratively, a client device 102 may specify a pipeline or other data manipulation for an object or object collection through the frontend 162, which may store a record of the pipeline or manipulation in the I/O path modification data store 164, which store 164, like the object data stores 168, can represent any persistent or substantially persistent storage. While shown as distinct in FIG. 1, in some instances the data stores 164 and 168 may represent a single collection of data stores. For example, data modifications to objects or collections may themselves be stored as objects on the service 160.

To enable data manipulation via execution of user-defined code, the system further includes an on-demand code execution system 120. In one embodiment, the system 120 is solely usable by the object storage service 160 in connection with data manipulations of an I/O path. In another embodiment, the system 120 is additionally accessible by client devices 102 to directly implement serverless task executions. For example, the on-demand code execution system 120 may provide the service 160 (and potentially client devices 102) with one or more user interfaces, command-line interfaces (CLIs), application programing interfaces (APIs), or other programmatic interfaces for generating and uploading user-executable code (e.g., including metadata identifying dependency code objects for the uploaded code), invoking the user-provided code (e.g., submitting a request to execute the user codes on the on-demand code execution system 120), scheduling event-based jobs or timed jobs, tracking the user-provided code, or viewing other logging or monitoring information related to their requests or user codes. Although one or more embodiments may be described herein as using a user interface, it should be appreciated that such embodiments may, additionally or alternatively, use any CLIs, APIs, or other programmatic interfaces.

The client devices 102, object storage service 160, and on-demand code execution system 120 may communicate via a network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

To enable interaction with the on-demand code execution system 120, the system 120 includes one or more frontends 130, which enable interaction with the on-demand code execution system 120. In an illustrative embodiment, the frontends 130 serve as a "front door" to the other services provided by the on-demand code execution system 120, enabling users (via client devices 102) or the service 160 to provide, request execution of, and view results of computer executable code. The frontends 130 include a variety of components to enable interaction between the on-demand code execution system 120 and other computing devices. For example, each frontend 130 may include a request interface providing client devices 102 and the service 160 with the ability to upload or otherwise communication user-specified code to the on-demand code execution system 120 and to thereafter request execution of that code. In one embodiment, the request interface communicates with external computing devices (e.g., client devices 102, frontend 162, etc.) via a graphical user interface (GUI), CLI, or API. The frontends 130 process the requests and make sure that the requests are properly authorized. For example, the frontends 130 may determine whether the user associated with the request is authorized to access the user code specified in the request.

References to user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific function, for example, in connection with a particular data transformation developed by the user. As noted above, individual collections of user code (e.g., to achieve a specific function) are referred to herein as "tasks," while specific executions of that code (including, e.g., compiling code, interpreting code, or otherwise making the code executable) are referred to as "task executions" or simply "executions." Tasks may be written, by way of non-limiting example, in JavaScript (e.g., node.js), Java, Python, or Ruby (or another programming language).

To manage requests for code execution, the frontend 130 can include an execution queue, which can maintain a record of requested task executions. Illustratively, the number of simultaneous task executions by the on-demand code execution system 120 is limited, and as such, new task executions initiated at the on-demand code execution system 120 (e.g., via an API call, via a call from an executed or executing task, etc.) may be placed on the execution queue and processed, e.g., in a first-in-first-out order. In some embodiments, the on-demand code execution system 120 may include multiple execution queues, such as individual execution queues for each user account. For example, users of the service provider system 110 may desire to limit the rate of task executions on the on-demand code execution system 120 (e.g., for cost reasons). Thus, the on-demand code execution system 120 may utilize an account-specific execution queue to throttle the rate of simultaneous task executions by a specific user account. In some instances, the on-demand code execution system 120 may prioritize task executions, such that task executions of specific accounts or of specified priorities bypass or are prioritized within the execution queue. In other instances, the on-demand code execution system 120 may execute tasks immediately or substantially immediately after receiving a call for that task, and thus, the execution queue may be omitted.

The frontend 130 can further include an output interface configured to output information regarding the execution of tasks on the on-demand code execution system 120. Illustratively, the output interface may transmit data regarding task executions (e.g., results of a task, errors related to the task execution, or details of the task execution, such as total time required to complete the execution, total data processed via the execution, etc.) to the client devices 102 or the object storage service 160.

In some embodiments, the on-demand code execution system 120 may include multiple frontends 130. In such embodiments, a load balancer may be provided to distribute the incoming calls to the multiple frontends 130, for example, in a round-robin fashion. In some embodiments, the manner in which the load balancer distributes incoming calls to the multiple frontends 130 may be based on the location or state of other components of the on-demand code execution system 120. For example, a load balancer may distribute calls to a geographically nearby frontend 130, or to a frontend with capacity to service the call. In instances where each frontend 130 corresponds to an individual instance of another component of the on-demand code execution system 120, such as the active pool 148 described below, the load balancer may distribute calls according to the capacities or loads on those other components. Calls may in some instances be distributed between frontends 130 deterministically, such that a given call to execute a task will always (or almost always) be routed to the same frontend 130. This may, for example, assist in maintaining an accurate execution record for a task, to ensure that the task executes only a desired number of times. For example, calls may be distributed to load balance between frontends 130. Other distribution techniques, such as anycast routing, will be apparent to those of skill in the art.

The on-demand code execution system 120 further includes one or more worker managers 140 that manage the execution environments, such as virtual machine instances 150 (shown as VM instance 150A and 150B, generally referred to as a "VM"), used for servicing incoming calls to execute tasks. While the following will be described with reference to virtual machine instances 150 as examples of such environments, embodiments of the present disclosure may utilize other environments, such as software containers. In the example illustrated in FIG. 1, each worker manager 140 manages an active pool 148, which is a group (sometimes referred to as a pool) of virtual machine instances 150 executing on one or more physical host computing devices that are initialized to execute a given task (e.g., by having the code of the task and any dependency data objects loaded into the instance).

Although the virtual machine instances 150 are described here as being assigned to a particular task, in some embodiments, the instances may be assigned to a group of tasks, such that the instance is tied to the group of tasks and any tasks of the group can be executed within the instance. For example, the tasks in the same group may belong to the same security group (e.g., based on their security credentials) such that executing one task in a container on a particular instance 150 after another task has been executed in another container on the same instance does not pose security risks. As discussed below, a task may be associated with permissions encompassing a variety of aspects controlling how a task may execute. For example, permissions of a task may define what network connections (if any) can be initiated by an execution environment of the task. As another example, permissions of a task may define what authentication information is passed to a task, controlling what network-accessible resources are accessible to execution of a task (e.g., objects on the service 160). In one embodiment, a security group of a task is based on one or more such permissions. For example, a security group may be defined based on a combination of permissions to initiate network connections and permissions to access network resources. As another example, the tasks of the group may share common dependencies, such that an environment used to execute one task of the group can be rapidly modified to support execution of another task within the group.

Once a triggering event to execute a task has been successfully processed by a frontend 130, the frontend 130 passes a request to a worker manager 140 to execute the task. In one embodiment, each frontend 130 may be associated with a corresponding worker manager 140 (e.g., a worker manager 140 co-located or geographically nearby to the frontend 130) and thus, the frontend 130 may pass most or all requests to that worker manager 140. In another embodiment, a frontend 130 may include a location selector configured to determine a worker manager 140 to which to pass the execution request. In one embodiment, the location selector may determine the worker manager 140 to receive a call based on hashing the call, and distributing the call to a worker manager 140 selected based on the hashed value (e.g., via a hash ring). Various other mechanisms for distributing calls between worker managers 140 will be apparent to one of skill in the art.

Thereafter, the worker manager 140 may modify a virtual machine instance 150 (if necessary) and execute the code of the task within the instance 150. As shown in FIG. 1, respective instances 150 may have operating systems (OS) 152 (shown as OS 152A and 152B), language runtimes 154 (shown as runtime 154A and 154B), and user code 156 (shown as user code 156A and 156B). The OS 152, runtime 154, and user code 156 may collectively enable execution of the user code to implement the task. Thus, via operation of the on-demand code execution system 120, tasks may be rapidly executed within an execution environment.

In accordance with aspects of the present disclosure, each VM 150 additionally includes staging code 157 executable to facilitate staging of input data on the VM 150 and handling of output data written on the VM 150, as well as a VM data store 158 accessible through a local file system of the VM 150. Illustratively, the staging code 157 represents a process executing on the VM 150 (or potentially a host device of the VM 150) and configured to obtain data from the object storage service 160 and place that data into the VM data store 158. The staging code 157 can further be configured to obtain data written to a file within the VM data store 158, and to transmit that data to the object storage service 160. Because such data is available at the VM data store 158, user code 156 is not required to obtain data over a network, simplifying user code 156 and enabling further restriction of network communications by the user code 156, thus increasing security. Rather, as discussed above, user code 156 may interact with input data and output data as files on the VM data store 158, by use of file handles passed to the code 156 during an execution. In some embodiments, input and output data may be stored as files within a kernel-space file system of the data store 158. In other instances, the staging code 157 may provide a virtual file system, such as a filesystem in userspace (FUSE) interface, which provides an isolated file system accessible to the user code 156, such that the user code's access to the VM data store 158 is restricted.

As used herein, the term "local file system" generally refers to a file system as maintained within an execution environment, such that software executing within the environment can access data as file, rather than via a network connection. In accordance with aspects of the present disclosure, the data storage accessible via a local file system may itself be local (e.g., local physical storage), or may be remote (e.g., accessed via a network protocol, like NFS, or represented as a virtualized block device provided by a network-accessible service). Thus, the term "local file system" is intended to describe a mechanism for software to access data, rather than physical location of the data.

The VM data store 158 can include any persistent or non-persistent data storage device. In one embodiment, the VM data store 158 is physical storage of the host device, or a virtual disk drive hosted on physical storage of the host device. In another embodiment, the VM data store 158 is represented as local storage, but is in fact a virtualized storage device provided by a network accessible service. For example, the VM data store 158 may be a virtualized disk drive provided by a network-accessible block storage service. In some embodiments, the object storage service 160 may be configured to provide file-level access to objects stored on the data stores 168, thus enabling the VM data store 158 to be virtualized based on communications between the staging code 157 and the service 160. For example, the object storage service 160 can include a file-level interface 166 providing network access to objects within the data stores 168 as files. The file-level interface 166 may, for example, represent a network-based file system server (e.g., a network file system (NFS)) providing access to objects as files, and the staging code 157 may implement a client of that server, thus providing file-level access to objects of the service 160.

In some instances, the VM data store 158 may represent virtualized access to another data store executing on the same host device of a VM instance 150. For example, an active pool 148 may include one or more data staging VM instances (not shown in FIG. 1), which may be co-tenanted with VM instances 150 on the same host device. A data staging VM instance may be configured to support retrieval and storage of data from the service 160 (e.g., data objects or portions thereof, input data passed by client devices 102, etc.), and storage of that data on a data store of the data staging VM instance. The data staging VM instance may, for example, be designated as unavailable to support execution of user code 156, and thus be associated with elevated permissions relative to instances 150 supporting execution of user code. The data staging VM instance may make this data accessible to other VM instances 150 within its host device (or, potentially, on nearby host devices), such as by use of a network-based file protocol, like NFS. Other VM instances 150 may then act as clients to the data staging VM instance, enabling creation of virtualized VM data stores 158 that, from the point of view of user code 156A, appear as local data stores. Beneficially, network-based access to data stored at a data staging VM can be expected to occur very quickly, given the co-location of a data staging VM and a VM instance 150 within a host device or on nearby host devices.

While some examples are provided herein with respect to use of IO stream handles to read from or write to a VM data store 158, IO streams may additionally be used to read from or write to other interfaces of a VM instance 150 (while still removing a need for user code 156 to conduct operations other than stream-level operations, such as creating network connections). For example, staging code 157 may "pipe" input data to an execution of user code 156 as an input stream, the output of which may be "piped" to the staging code 157 as an output stream. As another example, a staging VM instance or a hypervisor to a VM instance 150 may pass input data to a network port of the VM instance 150, which may be read-from by staging code 157 and passed as an input stream to the user code 157. Similarly, data written to an output stream by the task code 156 may be written to a second network port of the instance 150A for retrieval by the staging VM instance or hypervisor. In yet another example, a hypervisor to the instance 150 may pass input data as data written to a virtualized hardware input device (e.g., a keyboard) and staging code 157 may pass to the user code 156 a handle to the IO stream corresponding to that input device. The hypervisor may similarly pass to the user code 156 a handle for an IO stream corresponding to an virtualized hardware output device, and read data written to that stream as output data. Thus, the examples provided herein with respect to file streams may generally be modified to relate to any IO stream.

The object storage service 160 and on-demand code execution system 120 are depicted in FIG. 1 as operating in a distributed computing environment including several computer systems that are interconnected using one or more computer networks (not shown in FIG. 1). The object storage service 160 and on-demand code execution system 120 could also operate within a computing environment having a fewer or greater number of devices than are illustrated in FIG. 1. Thus, the depiction of the object storage service 160 and on-demand code execution system 120 in FIG. 1 should be taken as illustrative and not limiting to the present disclosure. For example, the on-demand code execution system 120 or various constituents thereof could implement various Web services components, hosted or "cloud" computing environments, or peer to peer network configurations to implement at least a portion of the processes described herein. In some instances, the object storage service 160 and on-demand code execution system 120 may be combined into a single service. Further, the object storage service 160 and on-demand code execution system 120 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

In the example of FIG. 1, the object storage service 160 and on-demand code execution system 120 are illustrated as connected to the network 104. In some embodiments, any of the components within the object storage service 160 and on-demand code execution system 120 can communicate with other components of the on-demand code execution system 120 via the network 104. In other embodiments, not all components of the object storage service 160 and on-demand code execution system 120 are capable of communicating with other components of the virtual environment 100. In one example, only the frontends 130 and 162 (which may in some instances represent multiple frontends) may be connected to the network 104, and other components of the object storage service 160 and on-demand code execution system 120 may communicate with other components of the environment 100 via the respective frontends 130 and 162.

While some functionalities are generally described herein with reference to an individual component of the object storage service 160 and on-demand code execution system 120, other components or a combination of components may additionally or alternatively implement such functionalities. For example, while the object storage service 160 is depicted in FIG. 1 as including an object manipulation engine 170, functions of that engine 170 may additionally or alternatively be implemented as tasks on the on-demand code execution system 120. Moreover, while the on-demand code execution system 120 is described as an example system to apply data manipulation tasks, other compute systems may be used to execute user-defined tasks, which compute systems may include more, fewer or different components than depicted as part of the on-demand code execution system 120. In a simplified example, the object storage service 160 may include a physical computing device configured to execute user-defined tasks on demand, thus representing a compute system usable in accordance with embodiments of the present disclosure. Thus, the specific configuration of elements within FIG. 1 is intended to be illustrative.

Figure 2:
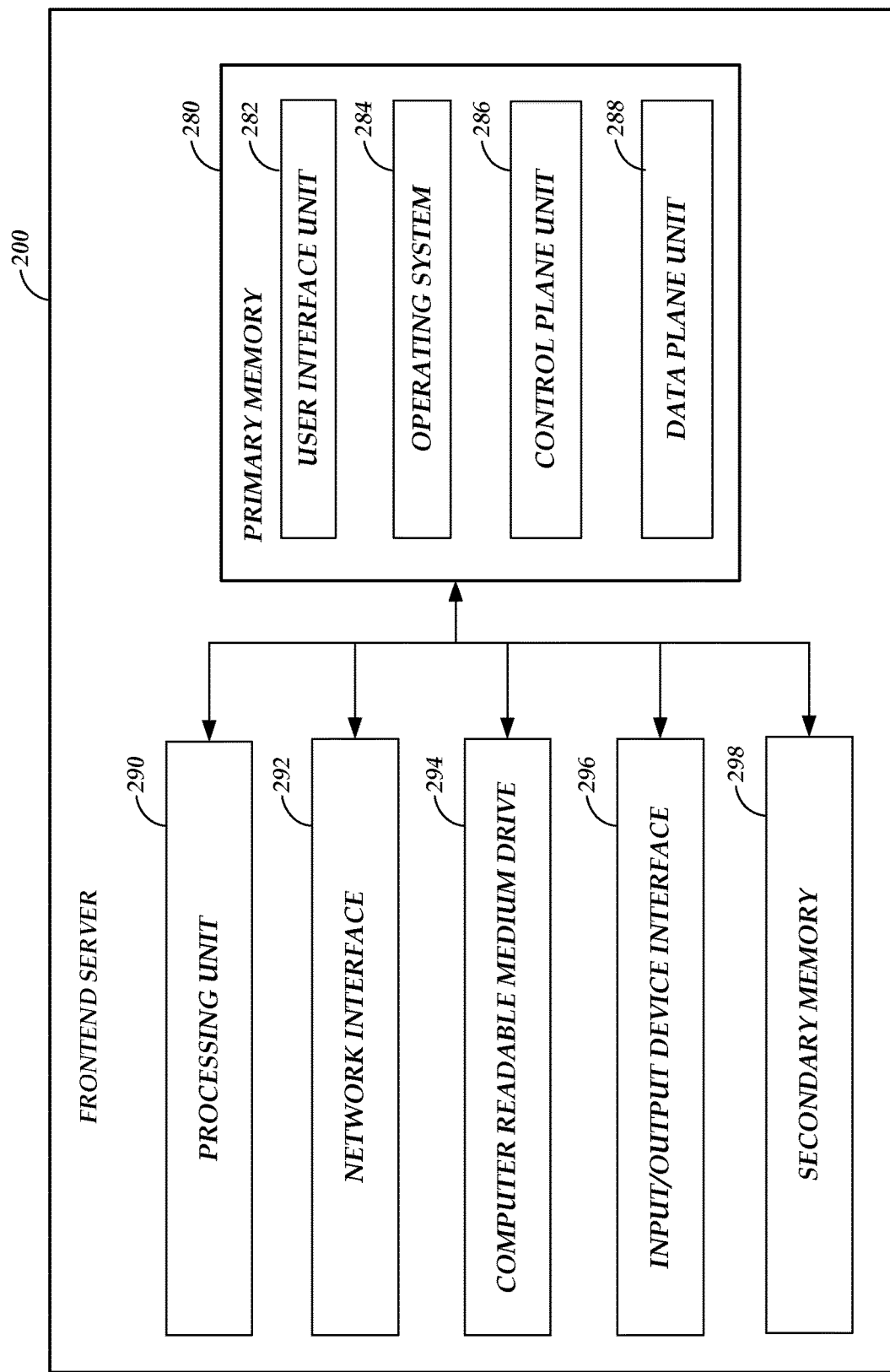
FIG. 2 depicts a general architecture of a computing device providing a frontend of the object storage service of FIG. 1.

FIG. 2 depicts a general architecture of a frontend server 200 computing device implementing a frontend 162 of FIG. 1. The general architecture of the frontend server 200 depicted in FIG. 2 includes an arrangement of computer hardware and software that may be used to implement aspects of the present disclosure. The hardware may be implemented on physical electronic devices, as discussed in greater detail below. The frontend server 200 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1.

As illustrated, the frontend server 200 includes a processing unit 290, a network interface 292, a computer readable medium drive 294, and an input/output device interface 296, all of which may communicate with one another by way of a communication bus. The network interface 292 may provide connectivity to one or more networks or computing systems. The processing unit 290 may thus receive information and instructions from other computing systems or services via the network 104. The processing unit 290 may also communicate to and from primary memory 280 or secondary memory 298 and further provide output information for an optional display (not shown) via the input/output device interface 296. The input/output device interface 296 may also accept input from an optional input device (not shown).

The primary memory 280 or secondary memory 298 may contain computer program instructions (grouped as units in some embodiments) that the processing unit 290 executes in order to implement one or more aspects of the present disclosure. These program instructions are shown in FIG. 2 as included within the primary memory 280, but may additionally or alternatively be stored within secondary memory 298. The primary memory 280 and secondary memory 298 correspond to one or more tiers of memory devices, including (but not limited to) RAM, 3D XPOINT memory, flash memory, magnetic storage, and the like. The primary memory 280 is assumed for the purposes of description to represent a main working memory of the worker manager 140, with a higher speed but lower total capacity than secondary memory 298.

The primary memory 280 may store an operating system 284 that provides computer program instructions for use by the processing unit 290 in the general administration and operation of the frontend server 200. The memory 280 may further include computer program instructions and other information for implementing aspects of the present disclosure. For example, in one embodiment, the memory 280 includes a user interface unit 282 that generates user interfaces (or instructions therefor) for display upon a computing device, e.g., via a navigation or browsing interface such as a browser or application installed on the computing device.

In addition to or in combination with the user interface unit 282, the memory 280 may include a control plane unit 286 and data plane unit 288 each executable to implement aspects of the present disclosure. Illustratively, the control plane unit 286 may include code executable to enable owners of data objects or collections of objects to attach manipulations, serverless functions, or data processing pipelines to an I/O path, in accordance with embodiments of the present disclosure. For example, the control plane unit 286 may enable the frontend 162 to implement the interactions of FIG. 3. The data plane unit 288 may illustratively include code enabling handling of I/O operations on the object storage service 160, including implementation of manipulations, serverless functions, or data processing pipelines attached to an I/O path (e.g., via the interactions of FIGS. 5A-6B, implementation of the routines of FIGS. 7-8, etc.).

The frontend server 200 of FIG. 2 is one illustrative configuration of such a device, of which others are possible. For example, while shown as a single device, a frontend server 200 may in some embodiments be implemented as multiple physical host devices. Illustratively, a first device of such a frontend server 200 may implement the control plane unit 286, while a second device may implement the data plane unit 288.

While described in FIG. 2 as a frontend server 200, similar components may be utilized in some embodiments to implement other devices shown in the environment 100 of FIG. 1. For example, a similar device may implement a worker manager 140, as described in more detail in U.S. Pat. No. 9,323,556, entitled "PROGRAMMATIC EVENT DETECTION AND MESSAGE GENERATION FOR REQUESTS TO EXECUTE PROGRAM CODE," and filed Sep. 30, 2014 (the "'556 Patent"), the entirety of which is hereby incorporated by reference.

Figure 3:
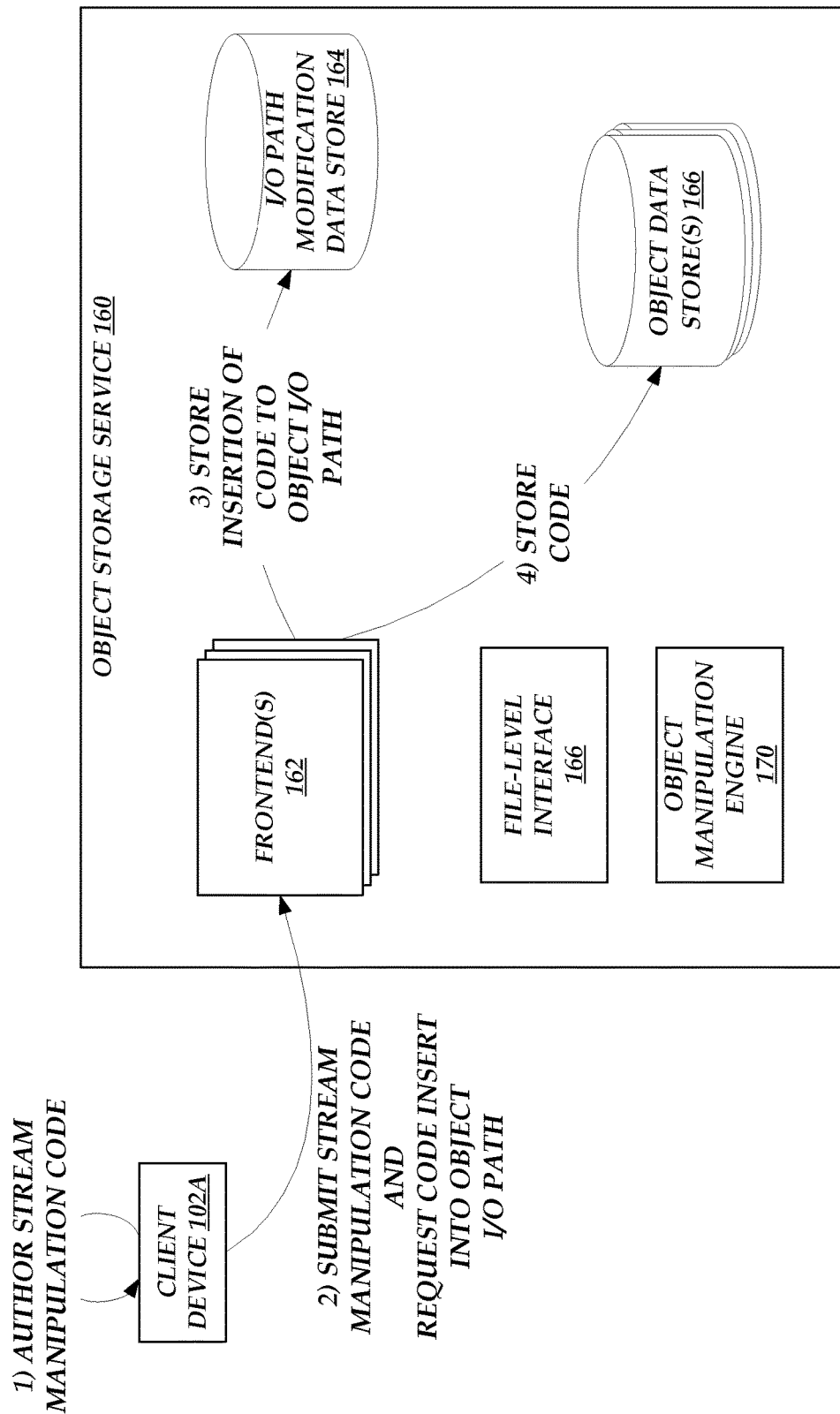
FIG. 3 is a flow diagram depicting illustrative interactions for enabling a client device to modify an I/O path for the object storage service by insertion of a function implemented by execution of a task on the on-demand code execution system.

With reference to FIG. 3, illustrative interactions are depicted for enabling a client device 102A to modify an I/O path for one or more objects on an object storage service 160 by inserting a data manipulation into the I/O path, which manipulation is implemented within a task executable on the on-demand code execution system 120.

The interactions of FIG. 3 begin at (1), where the client device 102A authors the stream manipulation code. The code can illustratively function to access an input file handle provided on execution of the program (which may, for example, be represented by the standard input stream for a program, commonly "stdin"), perform manipulations on data obtained from that file handle, and write data to an output file handle provided on execution of the program (which may, for example, by represented by the standard output stream for a program, commonly "stdout").

While examples are discussed herein with respect to a "file" handle, embodiments of the present disclosure may utilize handles providing access to any operating-system-level input/output (IO) stream, examples of which include byte streams, character streams, file streams, and the like. As used herein, the term operating-system-level input/output stream (or simply an "IO stream") is intended to refer to a stream of data for which an operating system provides a defined set of functions, such as seeking within the stream, reading from a stream, and writing to a stream. Streams may be created in various manners. For example, a programming language may generate a stream by use of a function library to open a file on a local operating system, or a stream may be created by use of a "pipe" operator (e.g., within an operating system shell command language). As will be appreciated by one skilled in the art, most general purpose programming languages include, as basic functionality of the code, the ability to interact with streams.

In accordance with embodiments of the present disclosure, task code may be authored to accept, as a parameter of the code, an input handle and an output handle, both representing IO streams (e.g., an input stream and an output stream, respectively). The code may then manipulate data of the input stream, and write an output to the output stream. Given use of a general purpose programming language, any of a variety of functions may be implemented according to the desires of the user. For example, a function may search for and remove confidential information from the input stream. While some code may utilize only input and output handles, other code may implement additional interfaces, such as network communication interfaces. However, by providing the code with access to input and output streams (via respective handles) created outside of the code, the need for the code to create such streams is removed. Moreover, because streams may be created outside of the code, and potentially outside of an execution environment of the code, stream manipulation code need not necessarily be trusted to conduct certain operations that may be necessary to create a stream. For example, a stream may represent information transmitted over a network connection, without the code being provided with access to that network connection. Thus, use of IO streams to pass data into and out of code executions can simplify code while increasing security.

As noted above, the code may be authored in a variety of programming languages. Authoring tools for such languages are known in the art and thus will not be described herein. While authoring is described in FIG. 3 as occurring on the client device 102A, the service 160 may in some instances provide interfaces (e.g., web GUIs) through which to author or select code.

At (2), the client device 102A submits the stream manipulation code to the frontend 162 of the service 160, and requests that an execution of the code be inserted into an I/O path for one or more objects. Illustratively, the frontends 162 may provide one or more interfaces to the device 102A enabling submission of the code (e.g., as a compressed file). The frontends 162 may further provide interfaces enabling designation of one or more I/O paths to which an execution of the code should be applied. Each I/O path may correspond, for example, to an object or collection of objects (e.g., a "bucket" of objects). In some instances, an I/O path may further corresponding to a given way of accessing such object or collection (e.g., a URI through which the object is created), to one or more accounts attempting to access the object or collection, or to other path criteria. Designation of the path modification is then stored in the I/O path modification data store 164, at (3). Additionally, the stream manipulation code is stored within the object data stores 166 at (4).

As such, when an I/O request is received via the specified I/O path, the service 160 is configured to execute the stream manipulation code against input data for the request (e.g., data provided by the client device 102A or an object of the service 160, depending on the I/O request), before then applying the request to the output of the code execution. In this manner, a client device 102A (which in FIG. 3 illustratively represents an owner of an object or object collection) can obtain greater control over data stored on and retrieved from the object storage service 160.

The interactions of FIG. 3 generally relate to insertion of a single data manipulation into the I/O path of an object or collection on the service 160. However, in some embodiments of the present disclosure an owner of an object or collection is enabled to insert multiple data manipulations into such an I/O path. Each data manipulation may correspond, for example, to a serverless code-based manipulation or a native manipulation of the service 160. For example, assume an owner has submitted a data set to the service 160 as an object, and that the owner wishes to provide an end user with a filtered view of a portion of that data set. While the owner could store that filtered view of the portion as a separate object and provide the end user with access to that separate object, this results in data duplication on the service 160. In the case that the owner wishes to provide multiple end users with different portions of the data set, potentially with customized filters, that data duplication grows, resulting in significant inefficiencies. In accordance with the present disclosure, another option may be for the owner to author or obtain custom code to implement different filters on different portions of the object, and to insert that code into the I/O path for the object. However, this approach may require the owner to duplicate some native functionality of the service 160 (e.g., an ability to retrieve a portion of a data set). Moreover, this approach would inhibit modularity and reusability of code, since a single set of code would be required to conduct two functions (e.g., selecting a portion of the data and filtering that portion).

Figure 4:
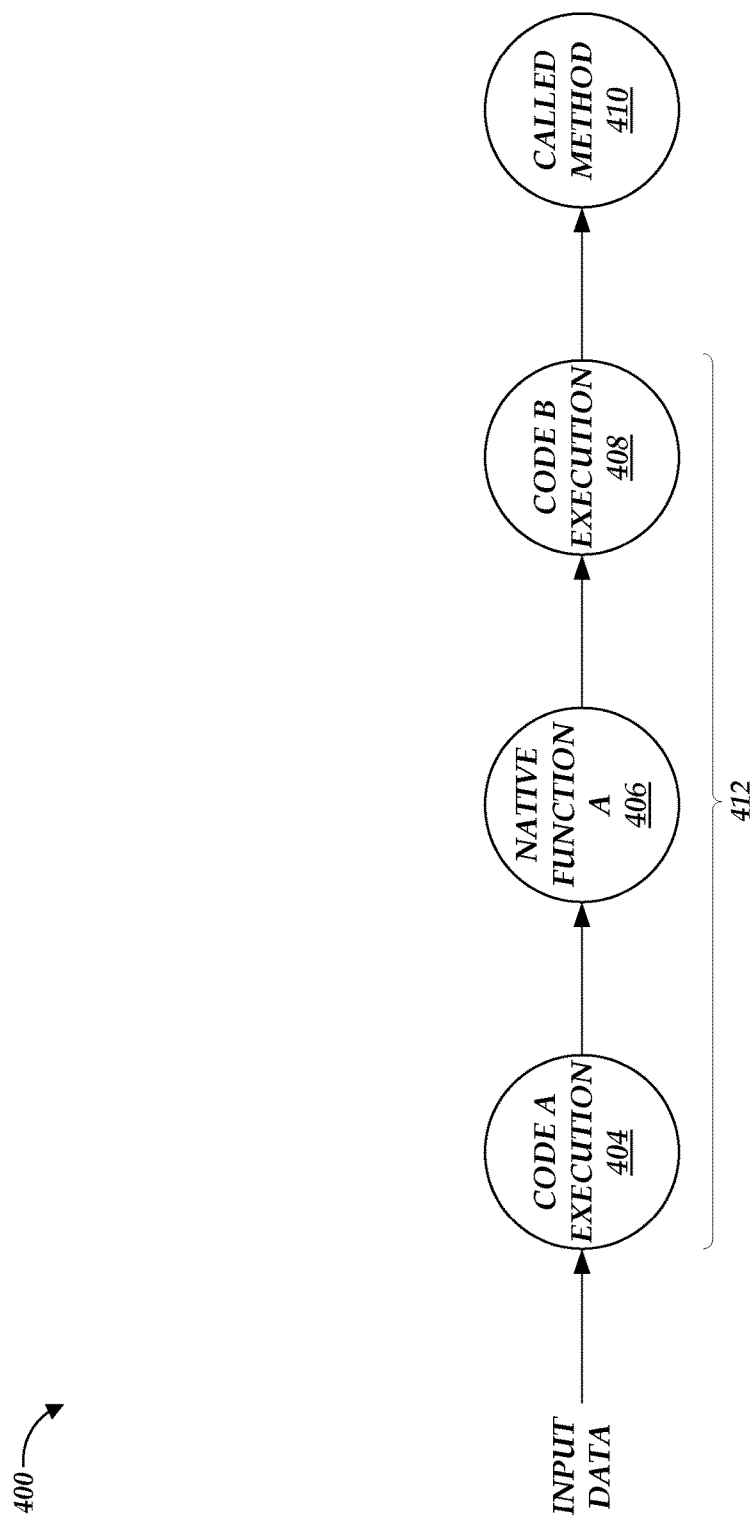
FIG. 4 is an illustrative visualization of a pipeline of functions to be applied to an I/O path for the object storage service of FIG. 1.

To address these shortcomings, embodiments of the present disclosure enable an owner to create a pipeline of data manipulations to be applied to an I/O path, linking together multiple data manipulations, each of which may also be inserted into other I/O paths. An illustrative visualization of such a pipeline is shown in FIG. 4 as pipeline 400. Specifically, the pipeline 400 illustrates a series of data manipulations that an owner specifies are to occur on calling of a request method against an object or object collection. As shown in FIG. 4, the pipeline begins with input data, specified within the call according to a called request method. For example, a PUT call may generally include the input data as the data to be stored, while a GET call may generally include the input data by reference to a stored object. A LIST call may specify a directory, a manifest of which is the input data to the LIST request method.

Contrary to typical implementations of request methods, in the illustrative pipeline 400, the called request method is not initially applied to the input data. Rather, the input data is initially passed to an execution of "code A" 404, where code A represents a first set of user-authored code. The output of that execution is then passed to "native function A" 406, which illustratively represents a native function of the service 160, such as a "SELECT" or byte-range function implemented by the object manipulation engine 170. The output of that native function 406 is then passed to an execution of "code B" 408, which represents a second set of user-authored code. Thereafter, the output of that execution 408 is passed to the called request method 410 (e.g., GET, PUT, LIST, etc.). Accordingly, rather than the request method being applied to the input data as in conventional techniques, in the illustration of FIG. 4, the request method is applied to the output of the execution 408, which illustratively represents a transformation of the input data according to one or more owner-specified manipulations 412. Notably, implementation of the pipeline 400 may not require any action or imply any knowledge of the pipeline 400 on the part of a calling client device 102. As such, implementation of pipelines can be expected not to impact existing mechanisms of interacting with the service 160 (other than altering the data stored on or retrieved from the service 160 in accordance with the pipeline). For example, implementation of a pipeline can be expected not to require reconfiguration of existing programs utilizing an API of the service 160.

While the pipeline 400 of FIG. 4 is linear, in some embodiments the service 160 may enable an owner to configure non-linear pipelines, such as by include conditional or branching nodes within the pipeline. Illustratively, as described in more detail below, data manipulations (e.g., serverless-based functions) can be configured to include a return value, such as an indication of successful execution, encountering an error, etc. In one example, the return value of a data manipulation may be used to select a conditional branch within a branched pipeline, such that a first return value causes the pipeline to proceed on a first branch, while a second return value causes the pipeline to proceed on a second branch. In some instances, pipelines may include parallel branches, such that data is copied or divided to multiple data manipulations, the outputs of which are passed to a single data manipulation for merging prior to executing the called method. The service 160 may illustratively provide a graphical user interface through which owners can create pipelines, such as by specifying nodes within the pipeline and linking those nodes together via logical connections. A variety of flow-based development interfaces are known and may be utilized in conjunction with aspects of the present disclosure.

Furthermore, in some embodiments, a pipeline applied to a particular I/O path may be generated on-the-fly, at the time of a request, based on data manipulations applied to the path according to different criteria. For example, an owner of a data collection may apply a first data manipulation to all interactions with objects within a collection, and a second data manipulation to all interactions obtained via a given URI. Thus, when a request is received to interact with an object within the collection and via the given URI, the service 160 may generate a pipeline combining the first and second data manipulations. The service 160 may illustratively implement a hierarchy of criteria, such that manipulations applied to objects are placed within the pipeline prior to manipulations applied to a URI, etc.

In some embodiments, client devices 102 may be enabled to request inclusion of a data manipulation within a pipeline. For example, within parameters of a GET request, a client device 102 may specify a particular data manipulation to be included within a pipeline applied in connection with the request. Illustratively, a collection owner may specify one or more data manipulations allowed for the collection, and further specify identifiers for those manipulations (e.g., function names). Thus, when requesting to interact with the collection, a client device 102 may specify the identifier to cause the manipulation to be included within a pipeline applied to the I/O path. In one embodiment, client-requested manipulations are appended to the end of a pipeline subsequent to owner-specified data manipulations and prior to implementing the requested request method. For example, where a client device 102 requests to GET a data set, and requests that a search function by applied to the data set before the GET method is implemented, the search function can receive as input data the output of an owner-specified data manipulations for the data set (e.g., manipulations to remove confidential information from the data set). In addition, requests may in some embodiments specify parameters to be passed to one or more data manipulations (whether specified within the request or not). Accordingly, while embodiments of the present disclosure can enable data manipulations without knowledge of those manipulations on the part of client devices 102, other embodiments may enable client devices 102 to pass information within an I/O request for use in implementing data manipulations.

Moreover, while example embodiments of the present disclosure are discussed with respect to manipulation of input data to a called method, embodiments of the present disclosure may further be utilized to modify aspects of a request, including a called method. For example, a serverless task execution may be passed the content of a request (including, e.g., a called method and parameters) and be configured to modify and return, as a return value to a frontend 162, a modified version of the method or parameters. Illustratively, where a client device 102 is authenticated as a user with access to only a portion of a data object, a serverless task execution may be passed a call to "GET" that data object, and may transform parameters of the GET request such that it applies only to a specific byte range of the data object corresponding to the portion that the user may access. As a further example, tasks may be utilized to implement customized parsing or restrictions on called methods, such as by limiting the methods a user may call, the parameters to those methods, or the like. In some instances, application of one or more functions to a request (e.g., to modify the method called or method parameters) may be viewed as a "pre-data processing" pipeline, and may thus be implemented prior to obtaining the input data within the pipeline 400 (which input data may change due to changes in the request), or may be implemented independently of a data manipulation pipeline 400.

Similarly, while example embodiments of the present disclosure are discussed with respect to application of a called method to output data of one or more data manipulations, in some embodiments manipulations can additionally or alternatively occur after application of a called method. For example, a data object may contain sensitive data that a data owner desires to remove prior to providing the data to a client. The owner may further enable a client to specify native manipulations to the data set, such as conducting a database query on the dataset (e.g., via a SELECT resource method). While the owner may specify a pipeline for the data set to cause filtering of sensitive data to be conducted prior to application of the SELECT method, such an order of operations may be undesirable, as filtering may occur with respect to the entire data object rather than solely the portion returned by the SELECT query. Accordingly, additionally or alternatively to specifying manipulations that occur prior to satisfying a request method, embodiments of the present disclosure can enable an owner to specify manipulations to occur subsequent to application of a called method but prior to conducting a final operation to satisfy a request. For example, in the case of a SELECT operation, the service 160 may first conduct the SELECT operation against specified input data (e.g., a data object), and then pass the output of that SELECT operation to a data manipulation, such as a serverless task execution. The output of that execution can then be returned to a client device 102 to satisfy the request.

While FIG. 3 and FIG. 4 are generally described with reference to serverless tasks authored by an owner of an object or collection, in some instances the service 160 may enable code authors to share their tasks with other users of the service 160, such that code of a first user is executed in the I/O path of an object owned by a second user. The service 160 may also provide a library of tasks for use by each user. In some cases, the code of a shared task may be provided to other users. In other cases, the code of the shared task may be hidden from other users, such that the other users can execute the task but not view code of the task. In these cases, other users may illustratively be enabled to modify specific aspects of code execution, such as the permissions under which the code will execute.

Figure 5A:
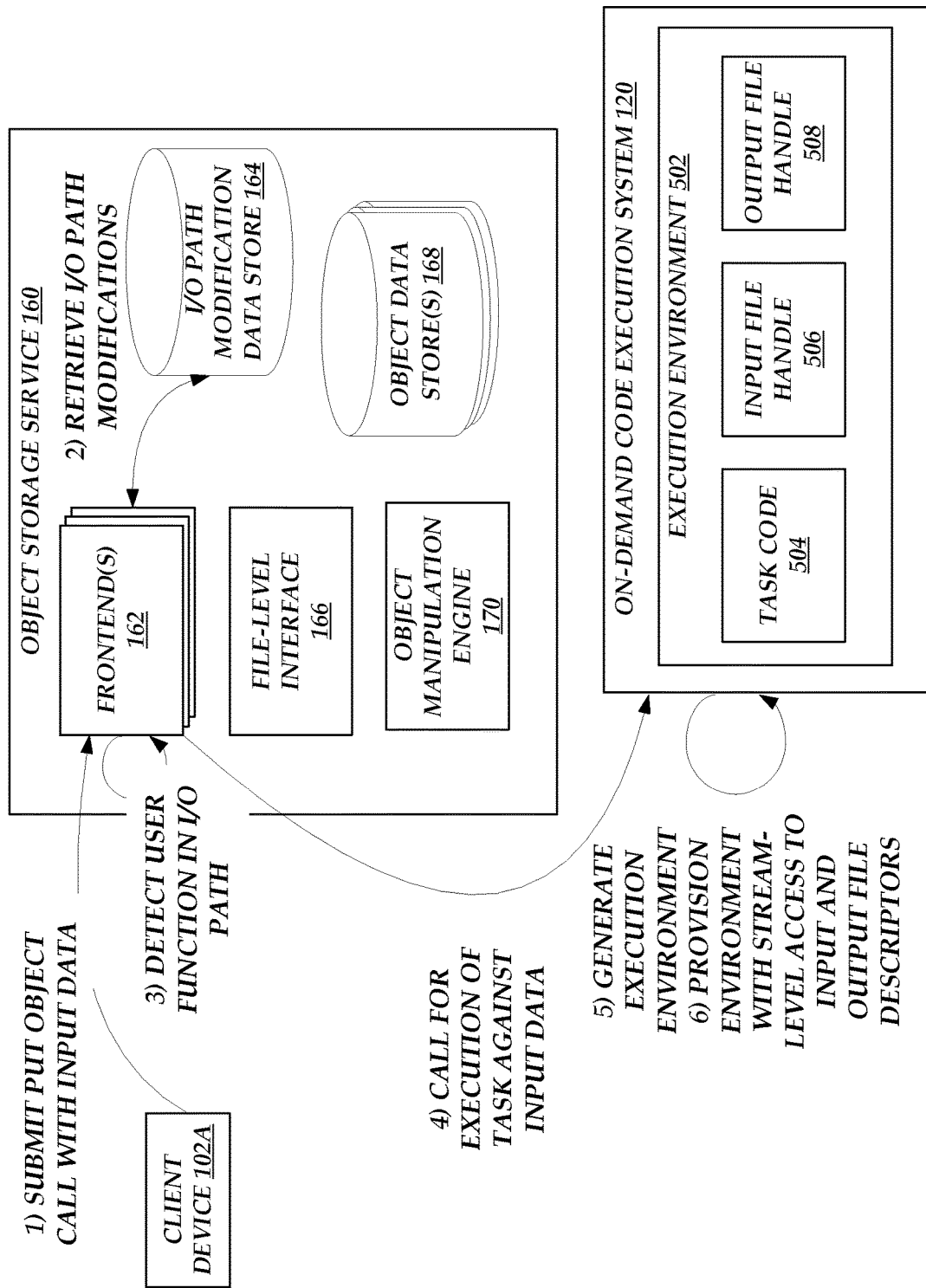
FIGS. 5A-5B show a flow diagram depicting illustrative interactions for handling a request to store input data as an object on the object storage service of FIG. 1, including execution of an owner-specified task to the input data and storage of output of the task as the object.
Figure 5B:
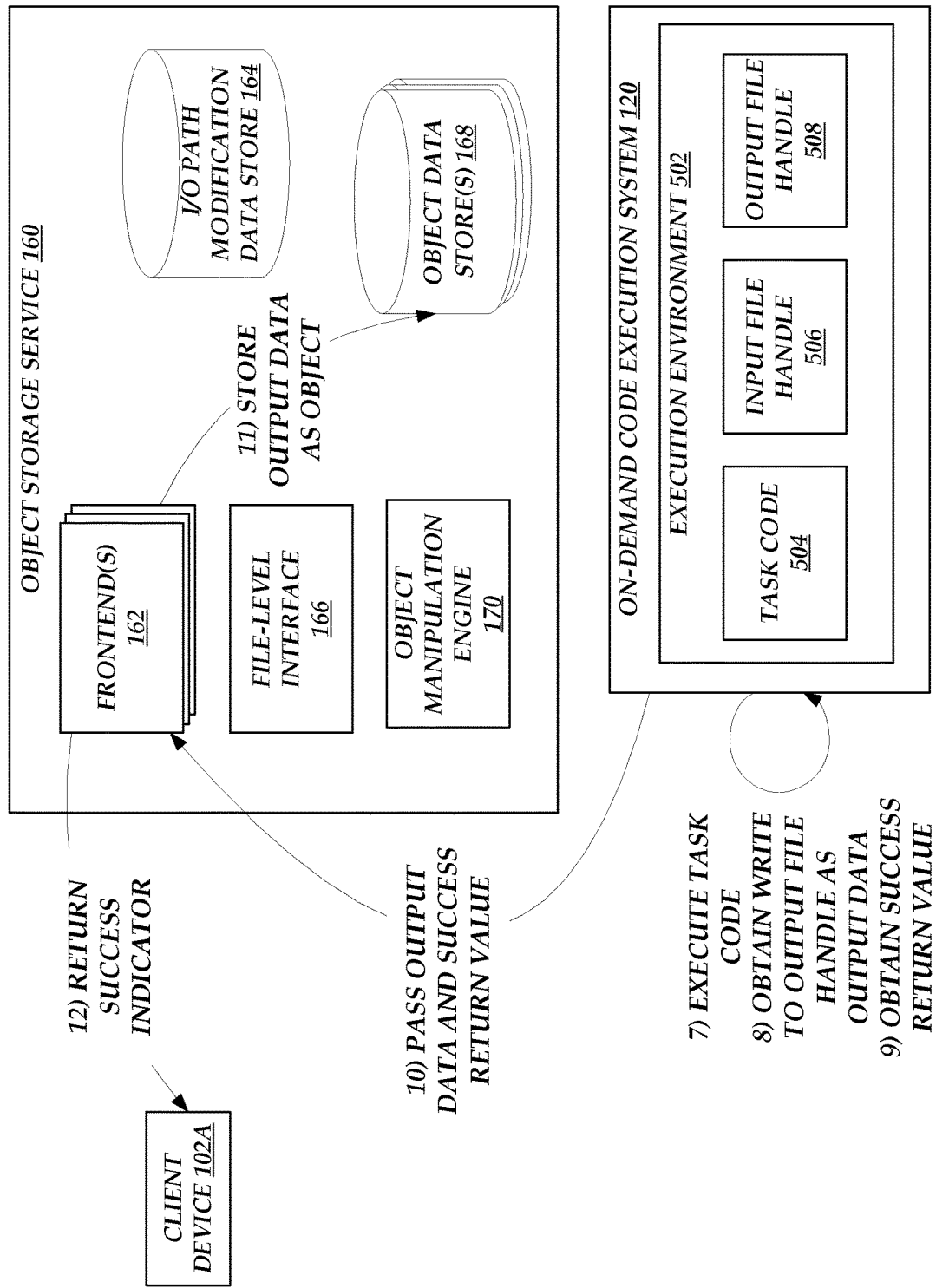

With reference to FIGS. 5A and 5B, illustrative interactions will be discussed for applying a modification to an I/O path for a request to store an object on the service 160, which request is referred to in connection with these figures as a "PUT" request or "PUT object call." While shown in two figures, numbering of interactions is maintained across FIGS. 5A and 5B.

The interactions begin at (1), where a client device 102A submits a PUT object call to the storage service 160, corresponding to a request to store input data (e.g., included or specified within the call) on the service 160. The input data may correspond, for example, to a file stored on the client device 102A. As shown in FIG. 5A, the call is directed to a frontend 162 of the service 162 that, at (2), retrieves from the I/O path modification data store 164 an indication of modifications to the I/O path for the call. The indication may reflect, for example, a pipeline to be applied to calls received on the I/O path. The I/O path for a call may generally be specified with respect to a request method included within a call, an object or collection of objects indicated within the call, a specific mechanism of reaching the service 160 (e.g., protocol, URI used, etc.), an identity or authentication status of the client device 102A, or a combination thereof. For example, in FIG. 5A, the I/O path used can correspond to use of a PUT request method directed to a particular URI (e.g., associated with the frontend 162) to store an object in a particular logical location on the service 160 (e.g., a specific bucket). In FIGS. 5A and 5B, it is assumed that an owner of that logical location has previously specified a modification to the I/O path, and specifically, has specified that a serverless function should be applied to the input data before a result of that function is stored in the service 160.

Accordingly, at (3), the frontend 162 detects within the modifications for the I/O path inclusion of a serverless task execution. Thus, at (4), the frontend 162 submits a call to the on-demand code execution system 120 to execute the task specified within the modifications against the input data specified within the call.

The on-demand code execution system 120, at (5), therefore generates an execution environment 502 in which to execute code corresponding to the task. Illustratively, the call may be directed to a frontend 130 of the system, which may distribute instructions to a worker manager 140 to select or generate a VM instance 150 in which to execute the task, which VM instance 150 illustratively represents the execution environment 502. During generation of the execution environment 502, the system 120 further provisions the environment with code 504 of the task indicated within the I/O path modification (which may be retrieved, for example, from the object data stores 166). While not shown in FIG. 5A, the environment 502 further includes other dependencies of the code, such as access to an operating system, a runtime required to execute the code, etc.

In some embodiments, generation of the execution environment 502 can include configuring the environment 502 with security constraints limiting access to network resources. Illustratively, where a task is intended to conduct data manipulation without reference to network resources, the environment 502 can be configured with no ability to send or receive information via a network. Where a task is intended to utilize network resources, access to such resources can be provided on a "whitelist" basis, such that network communications from the environment 502 are allowed only for specified domains, network addresses, or the like. Network restrictions may be implemented, for example, by a host device hosting the environment 502 (e.g., by a hypervisor or host operating system). In some instances, network access requirements may be utilized to assist in placement of the environment 502, either logically or physically. For example, where a task requires no access to network resources, the environment 502 for the task may be placed on a host device that is distant from other network-accessible services of the service provider system 110, such as an "edge" device with a lower-quality communication channel to those services. Where a task requires access to otherwise private network services, such as services implemented within a virtual private cloud (e.g., a local-area-network-like environment implemented on the service 160 on behalf of a given user), the environment 502 may be created to exist logically within that cloud, such that a task execution 502 accesses resources within the cloud. In some instances, a task may be configured to execute within a private cloud of a client device 102 that submits an I/O request. In other instances, a task may be configured to execute within a private cloud of an owner of the object or collection referenced within the request.

In addition to generating the environment 502, at (6), the system 120 provisions the environment with stream-level access to an input file handle 506 and an output file handle 508, usable to read from and write to the input data and output data of the task execution, respectively. In one embodiment, files handle 506 and 508 may point to a (physical or virtual) block storage device (e.g., disk drive) attached to the environment 502, such that the task can interact with a local file system to read input data and write output data. For example, the environment 502 may represent a virtual machine with a virtual disk drive, and the system 120 may obtain the input data from the service 160 and store the input data on the virtual disk drive. Thereafter, on execution of the code, the system 120 may pass to the code a handle of the input data as stored on the virtual disk drive, and a handle of a file on the drive to which to write output data. In another embodiment, files handle 506 and 508 may point to a network file system, such as an NFS-compatible file system, on which the input data has been stored. For example, the frontend 162 during processing of the call may store the input data as an object on the object data stores 166, and the file-level interface 166 may provide file-level access to the input data and to a file representing output data. In some cases, the file handles 506 and 508 may point to files on a virtual file system, such as a file system in user space. By providing handles 506 and 508, the task code 504 is enabled to read the input data and write output data using stream manipulations, as opposed to being required to implement network transmissions. Creation of the handles 506 and 508 (or streams corresponding to the handles) may illustratively be achieved by execution of staging code 157 within or associated with the environment 502.

The interactions of FIG. 5A are continued in FIG. 5B, where the system 120 executes the task code 504. As the task code 504 may be user-authored, any number of functionalities may be implemented within the code 504. However, for the purposes of description of FIGS. 5A and 5B, it will be assumed that the code 504, when executed, reads input data from the input file handle 506 (which may be passed as a commonly used input stream, such as stdin), manipulates the input data, and writes output data to the output file handle 508 (which may be passed as a commonly used output stream, such as stdout). Accordingly, at (8), the system 120 obtains data written to the output file (e.g., the file referenced in the output file handle) as output data of the execution. In addition, at (9), the system 120 obtains a return value of the code execution (e.g., a value passed in a final call of the function). For the purposes of description of FIGS. 5A and 5B, it will be assumed that the return value indicates success of the execution. At (10), the output data and the success return value are then passed to the frontend 162.

While shown as a single interaction in FIG. 5B, in some embodiments output data of a task execution and a return value of that execution may be returned separately. For example, during execution, task code 504 may write to an output file through the handle 508, and this data may be periodically or iteratively returned to the service 160. Illustratively, where the output file exists on a file system in user space implemented by staging code, the staging code may detect and forward each write to the output file to the frontend 162. Where the output file exists on a network file system, writes to the file may directly cause the written data to be transmitted to the interface 166 and thus the service 160. In some instances, transmitting written data iteratively may reduce the amount of storage required locally to the environment 502, since written data can, according to some embodiments, be deleted from local storage of the environment 502.

In addition, while a success return value is assumed in FIGS. 5A and 5B, other types of return value are possible and contemplated. For example, an error return value may be used to indicate to the frontend 162 that an error occurred during execution of task code 504. As another example, user-defined return values may be used to control how conditional branching within a pipeline proceeds. In some cases, the return value may indicate to the frontend 162 a request for further processing. For example, a task execution may return to the frontend 162 a call to execute another serverless task (potentially not specified within a path modification for the current I/O path). Moreover, return values may specify to the frontend 162 what return value is to be returned to the client device 102A. For example, a typical PUT request method called at the service 160 may be expected to return an HTTP 200 code ("OK"). As such, a success return value from the task code may further indicate that the frontend 162 should return an HTTP 200 code to the client device 102A. An error return value may, for example, indicate that the frontend 162 should return a 3XX HTTP redirection or 4XX HTTP error code to the client device 102A. Still further, in some cases, return values may specify to the frontend 162 content of a return message to the client device 102A other than a return value. For example, the frontend 162 may be configured to return a given HTTP code (e.g., 200) for any request from the client device 102A that is successfully retrieved at the frontend 162 and invokes a data processing pipeline. A task execution may then be configured to specify, within its return value, data to be passed to the client device 102A in addition to that HTTP code. Such data may illustratively include structured data (e.g., extensible markup language (XML) data) providing information generated by the task execution, such as data indicating success or failure of the task. This approach may beneficially enable the frontend 162 to quickly respond to requests (e.g., without awaiting execution of a task) while still enabling a task execution to pass information to the client device 102.

For purposes of the present illustration, it will be assumed that the success return value of the task indicates that an HTTP 2XX success response should be passed to the device 102A. Accordingly, on receiving output data, the frontend 162 stores the output data as an object within the object data stores 166, (11). Interaction (11) illustratively corresponds to implementation of the PUT request method, initially called for by the client device 102A, albeit by storing the output of the task execution rather than the provided input data. After implementing the called PUT request method, the frontend 162, at (12), returns to the client device 102A the success indicator indicated by the success return value of the task (e.g., an HTTP 200 response code). Thus, from the perspective of the client device 102A, a call to PUT an object on the storage service 160 resulted in creation of that object on the service 160. However, rather than storing the input data provided by the device 102A, the object stored on the service 160 corresponds to output data of an owner-specified task, thus enabling the owner of the object greater control over the contents of that object. In some use cases, the service 160 may additionally store the input data as an object (e.g., where the owner-specified task corresponds to code executable to provide output data usable in conjunction with the input data, such as checksum generated from the input data).

Figure 6A:
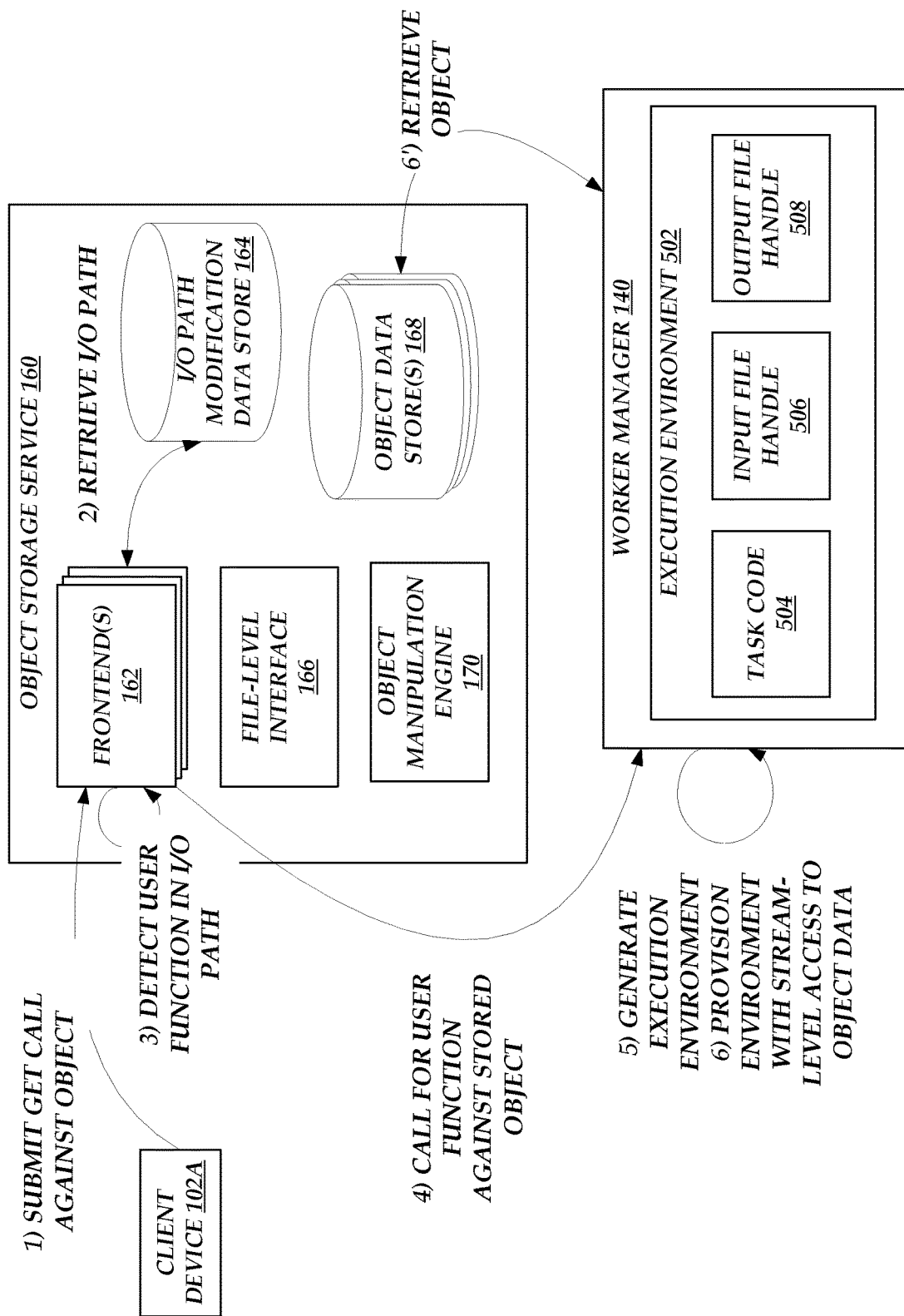
FIGS. 6A-6B show a flow diagram depicting illustrative interactions for handling a request to retrieve data of an object on the object storage service of FIG. 1, including execution of an owner-specified task to the object and transmission of an output of the task to a requesting device as the object.
Figure 6B:
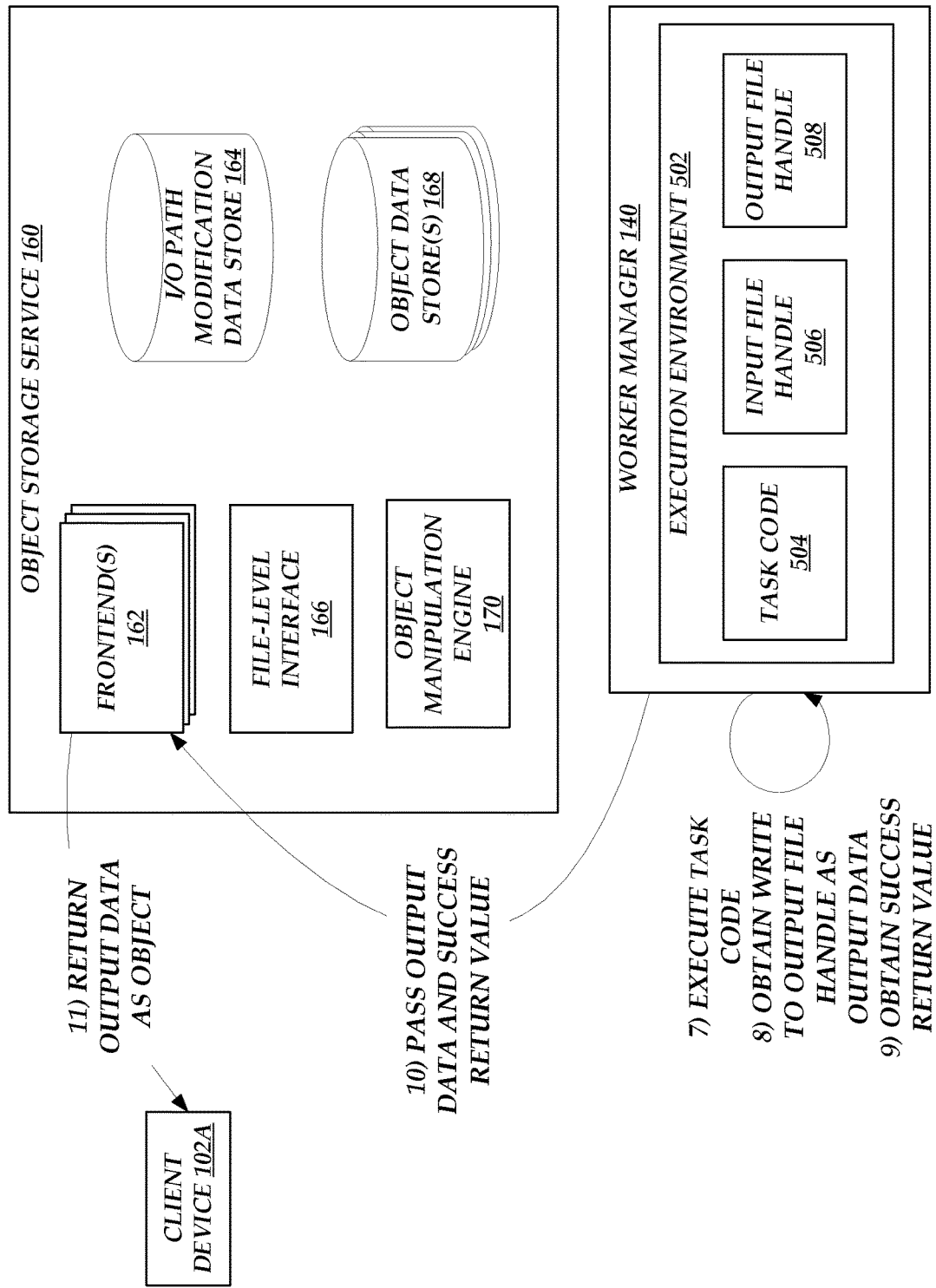

With reference to FIGS. 6A and 6B, illustrative interactions will be discussed for applying a modification to an I/O path for a request to retrieve an object on the service 160, which request is referred to in connection with these figures as a "GET" request or "GET call." While shown in two figures, numbering of interactions is maintained across FIGS. 6A and 6B.

The interactions begin at (1), where a client device 102A submits a GET call to the storage service 160, corresponding to a request to obtain data of an object (identified within the call) stored on the service 160. As shown in FIG. 6A, the call is directed to a frontend 162 of the service 160 that, at (2), retrieves from the I/O path modification data store 164 an indication of modifications to the I/O path for the call. For example, in FIG. 6A, the I/O path used can correspond to use of a GET request method directed to a particular URI (e.g., associated with the frontend 162) to retrieve an object in a particular logical location on the service 160 (e.g., a specific bucket). In FIGS. 6A and 6B, it is assumed that an owner of that logical location has previously specified a modification to the I/O path, and specifically, has specified that a serverless function should be applied to the object before a result of that function is returned to the device 102A as the requested object.

Accordingly, at (3), the frontend 162 detects within the modifications for the I/O path inclusion of a serverless task execution. Thus, at (4), the frontend 162 submits a call to the on-demand code execution system 120 to execute the task specified within the modifications against the object specified within the call. The on-demand code execution system 120, at (5), therefore generates an execution environment 502 in which to execute code corresponding to the task. Illustratively, the call may be directed to a frontend 130 of the system, which may distribute instructions to a worker manager 140 to select or generate a VM instance 150 in which to execute the task, which VM instance 150 illustratively represents the execution environment 502. During generation of the execution environment 502, the system 120 further provisions the environment with code 504 of the task indicated within the I/O path modification (which may be retrieved, for example, from the object data stores 166). While not shown in FIG. 6A, the environment 502 further includes other dependencies of the code, such as access to an operating system, a runtime required to execute the code, etc.

In addition, at (6), the system 120 provisions the environment with file-level access to an input file handle 506 and an output file handle 508, usable to read from and write to the input data (the object) and output data of the task execution, respectively. As discussed above, files handle 506 and 508 may point to a (physical or virtual) block storage device (e.g., disk drive) attached to the environment 502, such that the task can interact with a local file system to read input data and write output data. For example, the environment 502 may represent a virtual machine with a virtual disk drive, and the system 120 may obtain the object referenced within the call from the service 160, at (6'), and store the object on the virtual disk drive. Thereafter, on execution of the code, the system 120 may pass to the code a handle of the object as stored on the virtual disk drive, and a handle of a file on the drive to which to write output data. In another embodiment, files handle 506 and 508 may point to a network file system, such as an NFS-compatible file system, on which the object has been stored. For example, the file-level interface 166 may provide file-level access to the object as stored within the object data stores, as well as to a file representing output data. By providing handles 506 and 508, the task code 504 is enabled to read the input data and write output data using stream manipulations, as opposed to being required to implement network transmissions. Creation of the handles 506 and 508 may illustratively be achieved by execution of staging code 157 within or associated with the environment 502.

The interactions of FIG. 6A are continued in FIG. 6B, where the system 120 executes the task code 504 at (7). As the task code 504 may be user-authored, any number of functionalities may be implemented within the code 504. However, for the purposes of description of FIGS. 6A and 6B, it will be assumed that the code 504, when executed, reads input data (corresponding to the object identified within the call) from the input file handle 506 (which may be passed as a commonly used input stream, such as stdin), manipulates the input data, and writes output data to the output file handle 508 (which may be passed as a commonly used output stream, such as stdout). Accordingly, at (8), the system 120 obtains data written to the output file (e.g., the file referenced in the output file handle) as output data of the execution. In addition, at (9), the system 120 obtains a return value of the code execution (e.g., a value passed in a final call of the function). For the purposes of description of FIGS. 6A and 6B, it will be assumed that the return value indicates success of the execution. At (10), the output data and the success return value are then passed to the frontend 162.

On receiving output data and the return value, the frontend 162 returns the output data of the task execution as the requested object. Interaction (11) thus illustratively corresponds to implementation of the GET request method, initially called for by the client device 102A, albeit by returning the output of the task execution rather than the object specified within the call. From the perspective of the client device 102A, a call to GET an object from the storage service 160 therefore results in return of data to the client device 102A as the object. However, rather than returning the object as stored on the service 160, the data provided to the client device 102A corresponds to output data of an owner-specified task, thus enabling the owner of the object greater control over the data returned to the client device 102A.

Similarly to as discussed above with respect to FIGS. 5A and 5B, while shown as a single interaction in FIG. 6B, in some embodiments output data of a task execution and a return value of that execution may be returned separately. In addition, while a success return value is assumed in FIGS. 6A and 6B, other types of return value are possible and contemplated, such as error values, pipeline-control values, or calls to execute other data manipulations. Moreover, return values may indicate what return value is to be returned to the client device 102A (e.g., as an HTTP status code). In some instances, where output data is iteratively returned from a task execution, the output data may also be iteratively provided by the frontend 162 to the client device 102A. Where output data is large (e.g., on the order of hundreds of megabytes, gigabytes, etc.), iteratively returning output data to the client device 102A can enable that data to be provided as a stream, thus speeding delivery of the content to the device 102A relative to delaying return of the data until execution of the task completes.

While illustrative interactions are described above with reference to FIGS. 5A-6B, various modifications to these interactions are possible and contemplated herein. For example, while the interactions described above relate to manipulation of input data, in some embodiments a serverless task may be inserted into the I/O path of the service 160 to perform functions other than data manipulation. Illustratively, a serverless task may be utilized to perform validation or authorization with respect to a called request method, to verify that a client device 102A is authorized to perform the method. Task-based validation or authorization may enable functions not provided natively by the service 160. For example, consider a collection owner who wishes to limit certain client devices 102 to accessing only objects in the collection created during a certain time range (e.g., the last 30 days, any time excluding the last 30 days, etc.). While the service 160 may natively provide authorization on a per-object or per-collection basis, the service 160 may in some cases not natively provide authorization on a duration-since-creation basis. Accordingly, embodiments of the present disclosure enable the owner to insert into an I/O path to the collection (e.g., a GET path using a given URI to the collection) a serverless task that determines whether the client is authorized to retrieve a requested object based on a creation time of that object. Illustratively, the return value provided by an execution of the task may correspond to an "authorized" or "unauthorized" response. In instances where a task does not perform data manipulation, it may be unnecessary to provision an environment of the task execution with input and output stream handles. Accordingly, the service 160 and system 120 can be configured to forego provisioning the environment with such handles in these cases. Whether a task implements data manipulation may be specified, for example, on creation of the task and stored as metadata for the task (e.g., within the object data stores 166). The service 160 may thus determine from that metadata whether data manipulation within the task should be supported by provisioning of appropriate stream handles.

While some embodiments may utilize return values without use of stream handles, other embodiments may instead utilize stream handles without use of return values. For example, while the interactions described above relate to providing a return value of a task execution to the storage service 160, in some instances the system 120 may be configured to detect completion of a function based on interaction with an output stream handle. Illustratively, staging code within an environment (e.g., providing a file system in user space or network-based file system) may detect a call to deallocate the stream handle (e.g., by calling a "file.close( )" function or the like). The staging code may interpret such a call as successful completion of the function, and notify the service 160 of successful completion without requiring the task execution to explicitly provide return value.

While the interactions described above generally relate to passing of input data to a task execution, additional or alternative information may be passed to the execution. By way of non-limiting example, such information may include the content of the request from the client device 102 (e.g., the HTTP data transmitted), metadata regarding the request (e.g., a network address from which the request was received or a time of the request), metadata regarding the client device 102 (e.g., an authentication status of the device, account time, or request history), or metadata regarding the requested object or collection (e.g., size, storage location, permissions, or time created, modified, or accessed). Moreover, in addition or as an alternative to manipulation of input data, task executions may be configured to modify metadata regarding input data, which may be stored together with the input data (e.g., within the object) and thus written by way of an output stream handle, or which may be separately stored and thus modified by way of a metadata stream handle, inclusion of metadata in a return value, or separate network transmission to the service 160.

Figure 7:
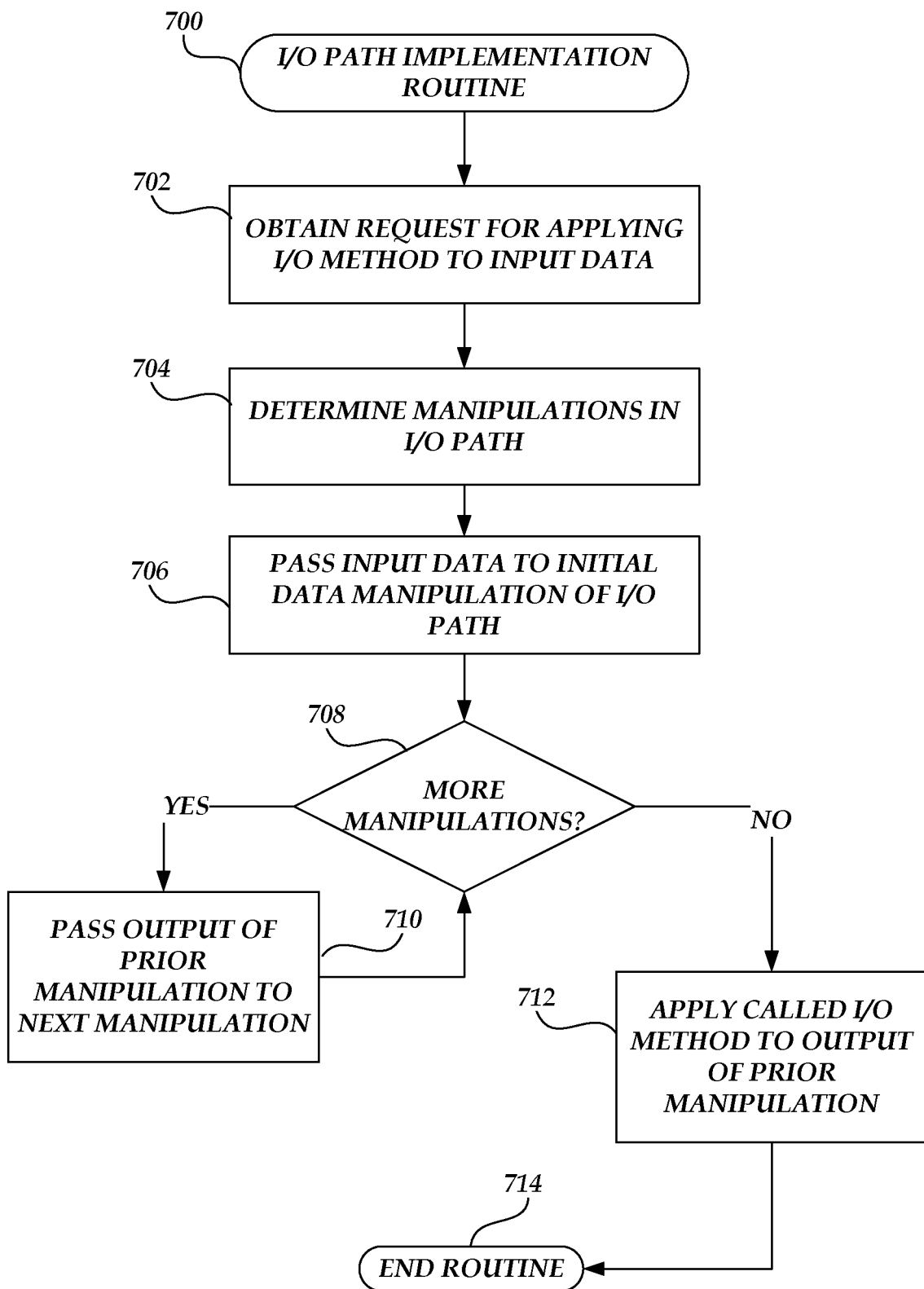
FIG. 7 is a flow chart depicting an illustrative routine for implementing owner-defined functions in connection with an I/O request obtained at the object storage service of FIG. 1 over an I/O path.

With reference to FIG. 7, an illustrative routine 700 for implementing owner-defined functions in connection with an I/O request obtained at the object storage service of FIG. 1 over an I/O path will be described. The routine 700 may illustratively be implemented subsequent to association of an I/O path (e.g., defined in terms of an object or collection, a mechanism of access to the object or collection, such as a URI, an account transmitting an 10 request, etc.) with a pipeline of data manipulations. For example, the routine 700 may be implemented prior to the interactions of FIG. 3, discussed above. The routine 700 is illustratively implemented by a frontend 162.

The routine 700 begins at block 702, where the frontend 162 obtains a request to apply an I/O method to input data. The request illustratively corresponds to a client device (e.g., an end user device). The I/O method may correspond, for example, to an HTTP request method, such as GET, PUT, LIST, DELETE, etc. The input data may be included within the request (e.g., within a PUT request), or referenced in the request (e.g., as an existing object on the object storage service 160).

At block 704, the frontend 162 determines one or more data manipulations in the I/O path for the request. As noted above, the I/O path may be defined based on a variety of criteria (or combinations thereof), such as the object or collection referenced in the request, a URI through which the request was transmitted, an account associated with the request, etc. Manipulations for each defined I/O path may illustratively be stored at the object storage service 160. Accordingly, at block 704, the frontend 162 may compare parameters of the I/O path for the request to stored data manipulations at the object storage service 160 to determine data manipulations inserted into the I/O path. In one embodiment, the manipulations form a pipeline, such as the pipeline 400 of FIG. 4, which may be previously stored or constructed by the frontend 162 at block 704 (e.g., by combining multiple manipulations that apply to the I/O path). In some instances, an additional data manipulation may be specified within the request, which data manipulation may be inserted, for example, prior to pre-specified data manipulations (e.g., not specified within the request). In other instances, the request may exclude reference to any data manipulation.

At block 706, the frontend 162 passes input data of the I/O request to an initial data manipulation for the I/O path. The initial data manipulation may include, for example, a native manipulation of the object storage service 160 or a serverless task defined by an owner of the object or collection referenced in the call. Illustratively, where the initial data manipulation is a native manipulation, the frontend 162 may pass the input to the object manipulation engine 170 of FIG. 1. Where the initial data manipulation is a serverless task, the frontend 162 can pass the input to the on-demand code execution system 120 of FIG. 1 for processing via an execution of the task. An illustrative routine for implementing a serverless task is described below with reference to FIG. 8.

While FIG. 7 illustratively describes data manipulations, in some instances other processing may be applied to an I/O path by an owner. For example, an owner may insert into an I/O path for an object or collection a serverless task that provides authentication independent of data manipulation. Accordingly, in some embodiments block 706 may be modified such that other data, such as metadata regarding a request or an object specified in the request, is passed to an authentication function or other path manipulation.

Thereafter, the routine 700 proceeds to block 708, where the implementation of the routine 700 varies according to whether additional data manipulations have been associated with the I/O path. If so, the routine 700 proceeds to block 710, where an output of a prior manipulation is passed to a next manipulation associated with the I/O path (e.g., a subsequent stage of a pipeline).

Subsequent to block 710, the routine 700 then returns to block 708, until no additional manipulations exist to be implemented. The routine 700 then proceeds to block 712, where the frontend 162 applies the called I/O method (e.g., GET, PUT, POST, LIST, DELETE, etc.) to the output of the prior manipulation. For example, the frontend 162 may provide the output as a result of a GET or LIST request, or may store the output as a new object as a result of a PUT or POST request. The frontend 162 may further provide a response to the request to a requesting device, such as an indication of success of the routine 700 (or, in cases of failure, failure of the routine). In one embodiment, the response may be determined by a return value provided by a data manipulation implemented at blocks 706 or 710 (e.g., the final manipulation implemented before error or success). For example, a manipulation that indicates an error (e.g., lack of authorization) may specify an HTTP code indicating that error, while a manipulation that proceeds successfully may instruct the frontend 162 to return an HTTP code indicating success, or may instruct the frontend 162 to return a code otherwise associated with application of the I/O method (e.g., in the absence of data manipulations). The routine 700 thereafter ends at block 714.

Notably, application of the called method to that output, as opposed to input specified in an initial request, may alter data stored in or retrieved from the object storage service 160. For example, data stored on the service 160 as an object may differ from the data submitted within a request to store such data. Similarly, data retrieved from the system as an object may not match the object as stored on the system. Accordingly, implementation of routine 700 enables an owner of data objects to assert greater control over I/O to an object or collection stored on the object storage service 160 on behalf of the owner.

In some instances, additional or alternative blocks may be included within the routine 700, or implementation of such blocks may include additional or alternative operations. For example, as discussed above, in addition to or as an alternative to providing output data, serverless task executions may provide a return value. In some instances, this return value may instruct a frontend 162 as to further actions to take in implementing the manipulation. For example, an error return value may instruct the frontend 162 to halt implementation of manipulations, and provide a specified error value (e.g., an HTTP error code) to a requesting device. Another return value may instruct the frontend 162 to implement an additional serverless task or manipulation. Thus, the routine 700 may in some cases be modified to include, subsequent to blocks 706 and 710 for example, handling of the return value of a prior manipulation (or block 708 may be modified to include handling of such a value). Thus, the routine 700 is intended to be illustrative in nature.

Figure 8:
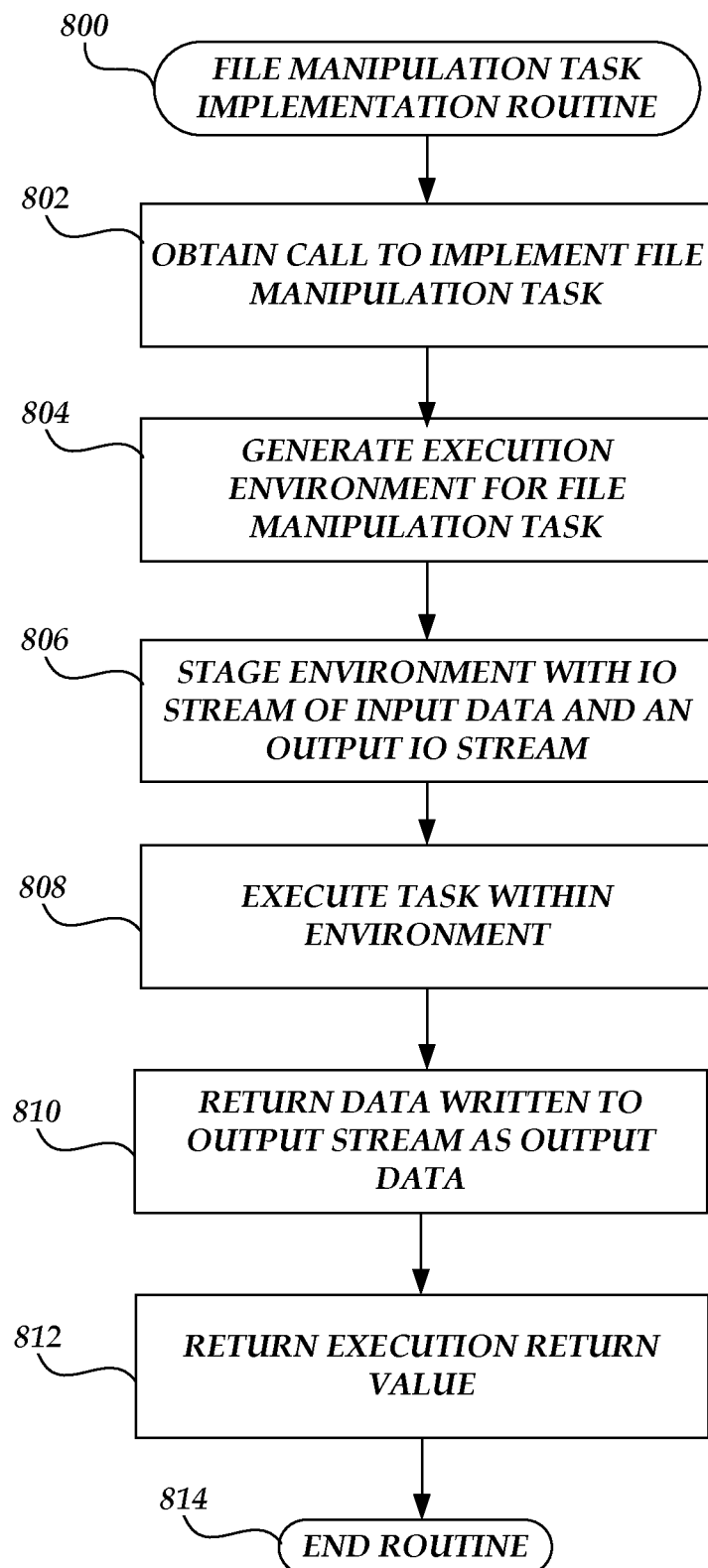
FIG. 8 is a flow chart depicting an illustrative routine for executing a task on the on-demand code execution system of FIG. 1 to enable data manipulations during implementation of an owner-defined function.

With reference to FIG. 8, an illustrative routine 800 will be described for executing a task on the on-demand code execution system of FIG. 1 to enable data manipulations during implementation of an owner-defined function. The routine 800 is illustratively implemented by the on-demand code execution system 120 of FIG. 1.

The routine 800 begins at block 802, where the system 120 obtains a call to implement a stream manipulation task (e.g., a task that manipulations data provided as an input IO stream handle). The call may be obtained, for example, in conjunction with blocks 706 or 710 of the routine 700 of FIG. 7. The call may include input data for the task, as well as other metadata, such as metadata of a request that preceded the call, metadata of an object referenced within the call, or the like.

At block 804, the system 120 generates an execution environment for the task. Generation of an environment may include, for example, generation of a container or virtual machine instance in which the task may execute and provisioning of the environment with code of the task, as well as any dependencies of the code (e.g., runtimes, libraries, etc.). In one embodiment, the environment is generated with network permissions corresponding to permissions specified for the task. As discussed above, such permissions may be restrictively (as opposed to permissively) set, according to a whitelist for example. As such, absent specification of permissions by an owner of an I/O path, the environment may lack network access. Because the task operates to manipulate streams, rather than network data, this restrictive model can increase security without detrimental effect on functionality. In some embodiments, the environment may be generated at a logical network location providing access to otherwise restricted network resources. For example, the environment may be generated within a virtual private local area network (e.g., a virtual private cloud environment) associated with a calling device.

At block 806, the system 120 stages the environment with an IO stream representing to input data. Illustratively, the system 120 may configure the environment with a file system that includes the input data, and pass to the task code a handle enabling access of the input data as a file stream. For example, the system 120 may configure the environment with a network file system, providing network-based access to the input data (e.g., as stored on the object storage system). In another example, the system 120 may configure the environment with a "local" file system (e.g., from the point of view of an operating system providing the file system), and copy the input data to the local file system. The local file system may, for example, be a filesystem in user space (FUSE). In some instances, the local file system may be implemented on a virtualized disk drive, provided by the host device of the environment or by a network-based device (e.g., as a network-accessible block storage device). In other embodiments, the system 120 may provide the IO stream by "piping" the input data to the execution environment, by writing the input data to a network socket of the environment (which may not provide access to an external network), etc. The system 120 further configures the environment with stream-level access to an output stream, such as by creating a file on the file system for the output data, enabling an execution of the task to create such a file, piping a handle of the environment (e.g., stdout) to a location on another VM instance colocated with the environment or a hypervisor of the environment, etc. . . .

At block 808, the task is executed within the environment. Execution of the task may include executing code of the task, and passing to the execution handles or handles of the input stream and output stream. For example, the system 120 may pass to the execution a handle for the input data, as stored on the file system, as a "stdin" variable. The system may further pass to the execution a handle for the output data stream, e.g., as a "stdout" variable. In addition, the system 120 may pass other information, such as metadata of the request or an object or collection specified within the request, as parameters to the execution. The code of the task may thus execute to conduct stream manipulations on the input data according to functions of the code, and to write an output of the execution to the output stream using OS-level stream operations.

The routine 800 then proceeds to block 810, where the system 120 returns data written to the output stream as output data of the task (e.g., to the frontend 162 of the object storage system). In one embodiment, block 810 may occur subsequent to the execution of the task completing, and as such, the system 120 may return the data written as the complete output data of the task. In other instances, block 810 may occur during execution of the task. For example, the system 120 may detect new data written to the output stream and return that data immediately, without awaiting execution of the task. Illustratively, where the output stream is written to an output file, the system 120 may delete data of the output file after writing, such that sending of new data immediately obviates a need for the file system to maintain sufficient storage to store all output data of the task execution. Still further, in some embodiments, block 810 may occur on detecting a close of the output stream handle describing the output stream.

In addition, at block 812, subsequent to the execution completing, the system 120 returns a return value provided by the execution (e.g., to the frontend 162 of the object storage system). The return value may specify an outcome of the execution, such as success or failure. In some instances, the return value may specify a next action to be undertaken, such as implementation an additional data manipulation. Moreover, the return value may specify data to be provided to a calling device requesting an I/O operation on a data object, such as an HTTP code to be returned. As discussed above, the frontend 162 may obtain such return value and undertake appropriate action, such as returning an error or HTTP code to a calling device, implementing an additional data manipulation, performing an 110 operation on output data, etc. In some instances, a return value may be explicitly specified within code of the task. In other instances, such as where no return value is specified within the code, a default return value may be returned (e.g., a '1' indicating success). The routine 800 then ends at block 814.

Figure 9:
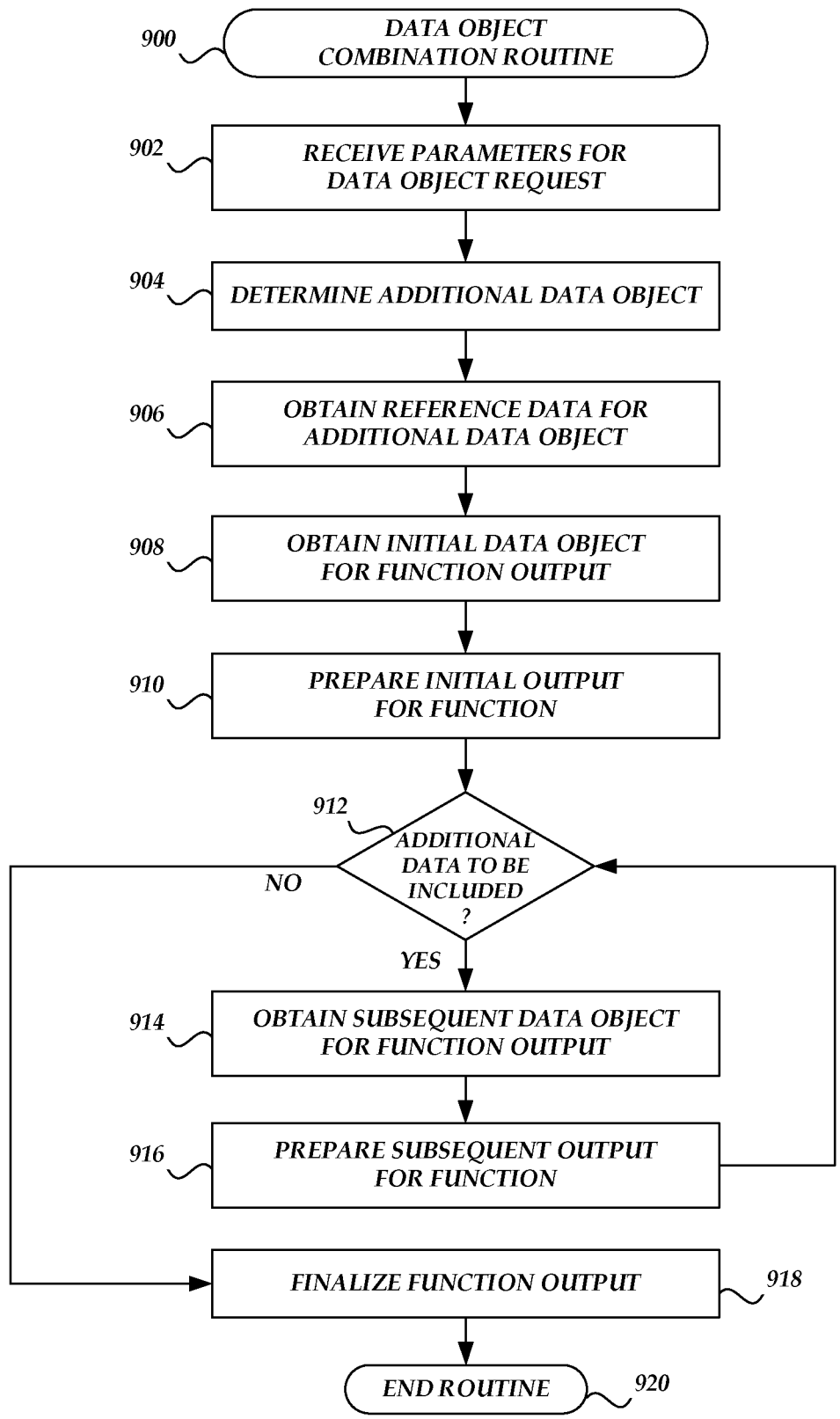
FIG. 9 is a flow chart depicting an illustrative routine for executing a task on the on-demand code execution system of FIG. 1 to respond to a data object request using a combination of multiple data objects.

FIG. 9 is a flow diagram of an illustrative routine 900 that may be executed by a code execution service, such as the on-demand code execution system 120. The routine 900 may be used to dynamically concatenate or otherwise combine multiple data objects or portions thereof at run time ("on-the-fly") in response to a request for a data object. In some embodiments, the routine 900 may be used to generate a response that includes a composite of multiple data objects, portions thereof, or data derived therefrom, even if the request does not reference any or all of the multiple data objects. Aspects of the routine 900 will be described with additional reference to FIG. 10, which is a system diagram of illustrative data flows and interactions between various components of the service provider system 110.

The routine 900 may begin in response to an event, such as when the routine illustrated in FIG. 8 reaches block 808. The routine 900 may be automatically performed in response to a request from a requestor (e.g., a request for data stored in the object storage service 160), without the request specifying that the routine 900 is to be performed prior to or during generation of a response to the request. The routine 900 may be a user-defined task, owner-defined function, or the like (referred to herein simply as a "function" for convenience), in the form of task code 504 that is performed by a VM instance 150 or other execution environment 502 generated during the routine illustrated in FIG. 8. In some embodiments, the routine 900 or portions thereof may be implemented on multiple processors, serially or in parallel. Although portions of the routine 900 are described as generating a response to a request for a data object, in some embodiments the output of the routine 900 may not be provided directly as the response to the request, but rather may be used by down-stream processes in preparing the response to the request. For example, the output of the routine 900 (also referred to herein as "function output") may be further processed by another routine in a pipeline, or processed by the object storage service 160 prior to sending a response to the request. Accordingly, descriptions of generating a response may be interpreted as descriptions of generating function output, and vice versa.

Figure 10:
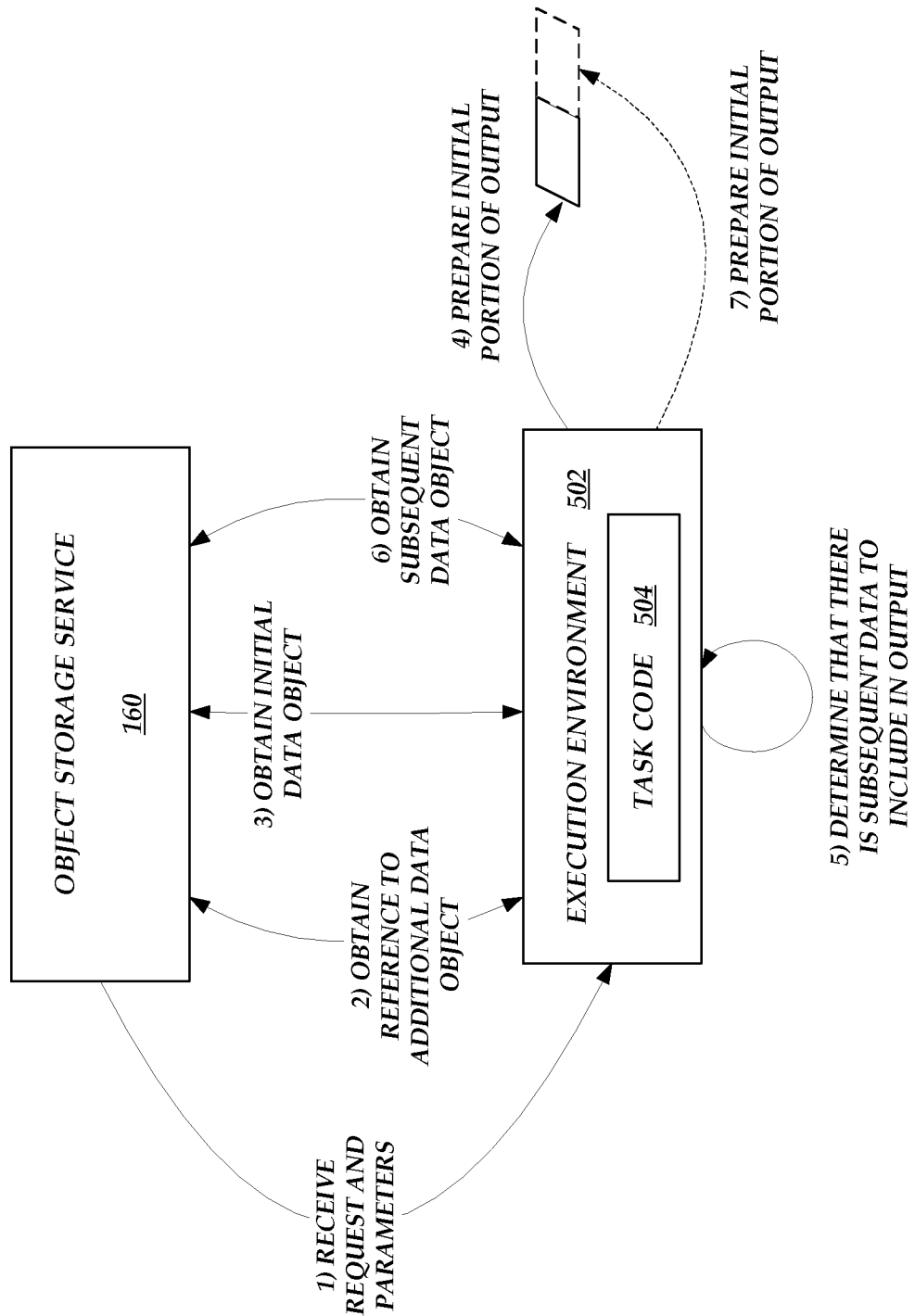
FIG. 10 is a system diagram of illustrative data flows and interactions between various components of the service provider system in connection with the routine illustrated in FIG. 9.

At block 902, task code 504 or other functional unit of the VM instance 150 or other execution environment 502 can receive parameters associated with a request for a data object. FIG. 10 illustrates the execution environment 502 receiving parameters associated with the request at (1). In some embodiments, the parameters may include: reference data comprising a reference to a requested data object; reference data comprising a reference to an output location at which output of the function is to be stored for use by the object storage service 160 in responding to the request; context data regarding the request; other data; or some combination thereof. For example, the request may be a resource request, such as a GET request, for a particular data object stored in the object storage service 160. The reference to the requested data object may be data that can be used by the execution environment 502 to access the requested data object, such as: a file descriptor; a file handle; a pointer; or some other data representing an address or identifier of the requested data object. The reference to the output location for responding to the request may be data that can be used by the execution environment 502 to write, store, or otherwise provide function output data, such as: a file descriptor; a file handle; a pointer; or some other data representing an address or identifier of a location for providing output of the function. The context data may include data regarding the context of the request, such as: an identifier of a user, account or other source of the request; an identifier of an access or security profile under which the request is being make; data representing the access or security rights under which the request is to be processed; an identifier of a location associated with the request; an identifier of a language associated with the request; or data representing preferences or tendencies of a source of the request.

At block 904, task code 504 or other functional unit of the VM instance 150 or other execution environment 502 can determine that a response (or function output, if the current instance of the routine 900 is part of a pipeline) is to be generated using one or more additional data objects stored in the object storage service 160. In some embodiments, the determination may be based on context data and/or the requested data object. For example, data objects in a particular collection may be required to be concatenated with or otherwise combined with one or more additional data objects when requested. If the requested data object is in the particular collection, then one or more additional data objects may be combined with the requested data object to produce function output. As another example, configuration data such as a record stored in the object storage service 160 or some other data store may identify the additional data object(s) to be combined with the requested data object. The execution environment 502 may access the record during the routine 900 to determine whether to perform a combination and which additional data object(s) to combine with the requested data object. In this way, the identity of the additional data object(s) can easily be changed without requiring programming changes to the task code 504 executed by the execution environment 502. As a further example, the execution environment 502 may test one or more items of context data against one or more criteria to determine whether to perform a combination and which additional data object(s) to combine with the requested data object. If an item of context data satisfies one or more criteria (e.g., a source or language of the request has a particular identity, a location associated with the request is in a particular region, etc.), then the execution environment 502 can determine that the requested data object is to be combined with one or more additional data objects, and also determine the identity of the additional object(s).

In one specific, non-limiting embodiment, the requested data object may be a media file, such as a video file, audio file, or the like. The media file may belong to a collection of media files, such as a bucket owned or managed by an entity. The entity may specify that an additional media file, such as an introduction, preview, or advertisement, may be required to be combined with, or otherwise included in a response with, each media file in the collection. The execution environment 502 may determine that the requested data object is a media file in the collection and, based on this property of the media file, the execution environment 502 may determine that the additional media file is to be included in the response. The identity of the additional media file (or files) may be specified by the code used to perform the determination, or it may be determined dynamically at run time (e.g., by accessing configuration data in a data store).

In another specific, non-limiting embodiment, the requested data object may be a data file, such as a spreadsheet, delimited file, or other collection of data records. The data records may form a subset of the data records that are to be returned in response to a request for the data object. The execution environment 502 may determine that a response to the request is to be generated using one or more additional data objects, such as additional data files comprising additional subsets of data records. The specific additional data object(s) may be dynamically determined based on context associated with the request, a property of the requested data object (e.g., the bucket in which the requested data object is stored), etc. For example, a subset of regional data records from one or more additional data objects may be identified based on a location associated with the request, and may be combined with the requested data object when responding to the request.

The example combinations discussed herein may be performed even in cases where the request for the requested data object (e.g., the GET resource request) references the requested data object and does not reference the additional data object(s).

At block 906, task code 504 or other functional unit of the VM instance 150 or other execution environment 502 can obtain a reference to the additional data object(s). In some embodiments, the execution environment 502 may request, receive, or otherwise have access to a mechanism by which the execution environment 502 can communicate with the object storage service 160 to request data dynamically determined during execution of the routine 900 (e.g., after the execution environment 502 has been staged and provided with access to the requested data object). For example, the execution environment 502 may receive a reference to a network socket (e.g., a control plane handle) which the execution environment 502 can use to make additional requests to the object storage service 160. Using this mechanism, the execution environment 502 can request and receive a reference (e.g., file handle, pointer, etc.) for the additional data object(s). FIG. 10 illustrates the execution environment 502 obtaining the reference(s) to the additional data object(s) at (2).

At block 908, task code 504 or other functional unit of the VM instance 150 or other execution environment 502 can obtain an initial data object to be used in responding to the request. The initial data object is "initial" in the sense that it is obtained and/or used prior to one or more subsequent data objects. The initial data object may be the requested data object or an additional data object, depending upon how the response is to be structured. For example, if an additional data object such as an introduction or preview is to be provided before the requested data object, the execution environment 502 can use the reference to the additional data object to access the additional data object. As another example, if an additional data object is to be inserted into or provided after the requested data object, the execution environment 502 can use the reference to the requested data object to access the requested data object. FIG. 10 illustrates the execution environment 502 obtaining the initial data object at (3). In some embodiments, the initial data object may not be obtained from the object storage service 160 at block 908, but may be provided to the execution environment 502 previously. For example, during staging of the execution environment, the initial data object (e.g., the requested data object) may be obtained and stored on a computing device of the execution environment 502. As another example, when reference data for the additional data object is obtained, the additional data object may be obtained and stored on a computing device of the execution environment 502 at a location indicated by the reference data.

At block 910, task code 504 or other functional unit of the VM instance 150 or other execution environment 502 can prepare the initial part of the response using the initial data object obtained above. FIG. 10 illustrates the execution environment 502 preparing the initial part of the response at (4). Preparing the initial part of the response may involve writing a least a portion of the initial data object using the reference to the output location for responding to the request. For example, execution environment 502 can determine whether to include the entire initial data object, or a portion thereof, in the response. As another example, the execution environment 502 may determine whether to modify the initial data object or a portion thereof, such as by removing data, adding data, altering data, changing the format of the initial data object, changing metadata associated with the data object, or the like. Illustratively, the execution environment 502 may add or modify a header for the initial data object, adjust the formatting of the initial data object to be compatible with subsequent data objects, etc. These determinations may be based on parameters received above (e.g., a property of the requested data object, context data, etc.). The execution environment 502 can then place the determined data at the output location. In some embodiments, the execution environment 502 may first store the initial data in a temporary internal storage location for later placement in the output location.

At decision block 912, task code 504 or other functional unit of the VM instance 150 or other execution environment 502 can determine whether there is additional data to be included in the response. As discussed above, the response may be based on the requested data object and one or more additional data objects. The execution environment 502 can determine whether all data has been included. If not, the routine 900 may proceed to block 914. Otherwise, if all data to be included in the response has been included, the routine 900 may proceed to block 918. FIG. 10 illustrates the execution environment 502 determining that additional data is to be included in the response at (5).

At block 914, task code 504 or other functional unit of the VM instance 150 or other execution environment 502 can obtain a subsequent data object to be used in responding to the request. As with the initial data object discussed above, the subsequent data object may be the requested data object or an additional data object, depending upon how the response is to be structured. The subsequent data object is "subsequent" in the sense that it is obtained or used after the initial data object. For example, if an additional data object such as an introduction or preview was access and included in the initial part of the response as discussed above, the execution environment 502 can use the reference to the requested data object to access the requested data object for inclusion in a subsequent part of the response. FIG. 10 illustrates the execution environment 502 obtaining the subsequent data object at (6). In some embodiments, the subsequent data object may not be obtained from the object storage service 160 at block 914, but may be provided to the execution environment 502 previously. For example, during staging of the execution environment, the subsequent data object (e.g., the requested data object) may be obtained and stored on a computing device of the execution environment 502. As another example, when reference data for the additional data object is obtained, the additional data object may be obtained and stored on a computing device of the execution environment 502 at a location indicated by the reference data.

At block 916, task code 504 or other functional unit of the VM instance 150 or other execution environment 502 can prepare the subsequent part of the response using the subsequent data object obtained above. FIG. 10 illustrates the execution environment 502 preparing the subsequent part of the response at (7). Preparing the subsequent part of the response may involve writing a least a portion of the subsequent data object using the reference to the output location for responding to the request. For example, execution environment 502 can determine whether to include the entire subsequent data object, or a portion thereof, in the response. As another example, the execution environment 502 may determine whether to modify the subsequent data object or a portion thereof, such as by removing data, adding data, altering data, changing the format of the subsequent data object, changing metadata associated with the data object, or the like. Illustratively, the execution environment 502 may remove a header from subsequent data objects, adjust the formatting of subsequent data objects to be compatible with the initial data object, etc. These determinations may be based on parameters received above (e.g., a property of the requested data object, context data, etc.). The execution environment 502 can then place the determined data at the output location. In some embodiments, the execution environment 502 may first store the initial data in a temporary internal storage location for later placement in the output location. The routine 900 may return to decision block 912 to determine whether additional data is to be included in the response.

At block 918, task code 504 or other functional unit of the VM instance 150 or other execution environment 502 can finalize the output of the function. Finalizing output of the function may include closing an output stream or file identified by the reference to the output location and/or providing a return value (e.g., indicating success, failure, or some other characteristic of function execution) to the object storage service 160. In some embodiments, additional processing may be performed prior to closing the output stream. For example, the execution environment 502 may generate and write metadata describing properties of the output, such as the size of the output or header information for use by a device consuming the output. The routine may terminate at block 920.

In some embodiments, output of the function may be cached so that the function does not need to retrieve and process the requested data object(s) and/or additional data object(s) each time the objects are to be used. Instead, the function may determine whether the function output has been cached and, if so, whether the cached output has expired. If the cached output has not expired, the function may obtain the cached function output and provide it as the output of the function, or derive current function output from the cached function output. The function output may be cached locally within the execution environment (e.g., on the server machine on which the task code 504 or other functional unit of the VM instance 150 is running), or in a network-accessible data store (e.g., a high-speed dedicated cache server, a cache portion of the object storage service 160, etc.). In some embodiments, cached function output may be tagged or otherwise associated with the context data that was used to determine which data objects to combine to produce the output. In this way, the function may analyze the associated context data to determine which cached output, if any, is appropriate for use in responding to a subsequent request based on the context data associated with the subsequent request. In some embodiments, data objects provided as input to the function or otherwise accessed by the function during execution may be cached so that they do not need to be obtained from the object storage service 160 each time the function is executed.

In some embodiments, the data object that is requested and provided by the routine 900 may not be a data object (or portion thereof) stored as such in the object storage service 160. Instead, the routine 900 may dynamically generate a composite object definition, such as a manifest, that references one or more stored data objects or portions thereof, or that includes data derived from one or more stored data objects. For example, the requested data object may be media content that corresponds to a data object in the object storage service 160, and an additional data object such as an introduction may be required to be presented prior to the data object. The routine 900 may generate a manifest that can be used by a computing device to submit follow-up requests for individual data objects in the correct sequence as dynamically determined during execution of the routine 900. In this example, the initial data object is the additional data object, and preparation of the initial portion of the response includes referencing the additional data object in the manifest. The subsequent data object is the data object for the requested media content, and preparation of the subsequent portion of the response includes referencing the data object in the manifest. The requested data object, and the output produced by the function, is the manifest, which is dynamically generated using data regarding data objects stored in the object storage service 160. Thus, the requested data object may not be a data object that is actually stored in the object storage service 160.

In some embodiments, the request may include or reference a manifest of data objects (or portions thereof) stored in the object storage service 160. Instead of obtaining the referenced data objects or portions and returning them in combined form (either in a single data stream, or as a combination of multiple data steams), the routine 900 may determine to add and/or remove data objects or portions thereof to and/or from those listed in the manifest. For example, the routine 900 may use any of the methods described above for determining which additional data object or objects—not specifically requested—are to be included in a response to a request. The routine 900 may then provide output that is a combination of the dynamically determined set of data objects or portions, either in a single data stream or as a combination of multiple data streams.

Figure 11:
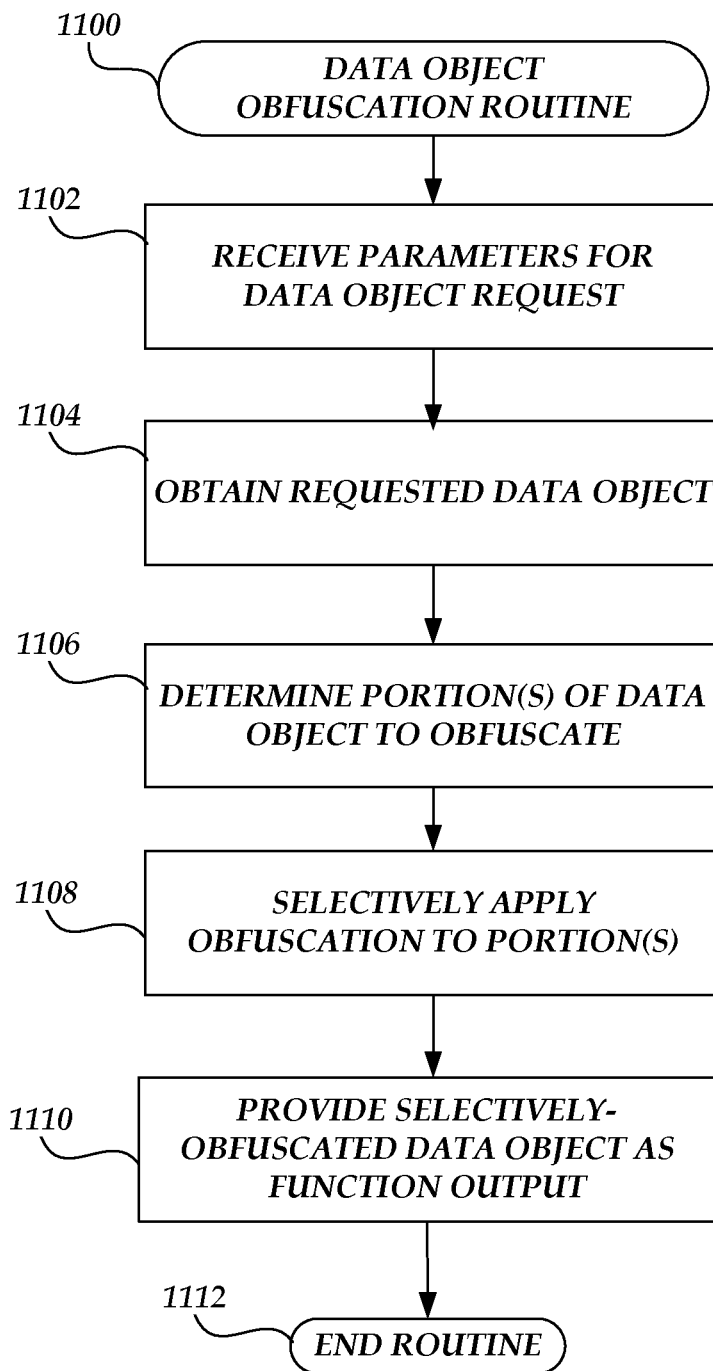
FIG. 11 is a flow chart depicting an illustrative routine for executing a task on the on-demand code execution system of FIG. 1 to respond to a data object request using selectively-obfuscated data.

FIG. 11 is a flow diagram of an illustrative routine 1100 that may be executed by a code execution service, such as the on-demand code execution system 120, to dynamically mask, scramble, obscure, or otherwise render unintelligible (collectively referred to herein as "obfuscate" for convenience) portions of a requested data object at run time in response to a request for the data object. Although portions of the routine 1100 are described as generating a response to a request for a data object, in some embodiments the output of the routine 1100 may not be provided directly as the response to the request, but rather may be used by downstream processes in preparing the response to the request. For example, the function output may be further processed by another routine in a pipeline, or processed by the object storage service 160 prior to sending a response to the request. Accordingly, descriptions of generating a response may be interpreted as descriptions of generating function output, and vice versa. Aspects of the routine 1100 will be described with reference to FIG. 12, which is a system diagram of illustrative data flows and interactions between various components of the service provider system 110.

The routine 1100 may begin in response to an event, such as when the routine illustrated in FIG. 8 reaches block 808. The routine 1100 may be automatically performed in response to a request from a requestor (e.g., a request for data stored in the object storage service 160), without the request specifying that the routine 1100 is to be performed prior to or during generation of a response to the request. For example, the routine 1100 may be an owner-defined function, also referred to as a user-defined task, that is performed by a VM instance 150 or other execution environment 502 generated during the routine illustrated in FIG. 8. In some embodiments, the routine 1100 or portions thereof may be implemented on multiple processors, serially or in parallel.

Figure 12:
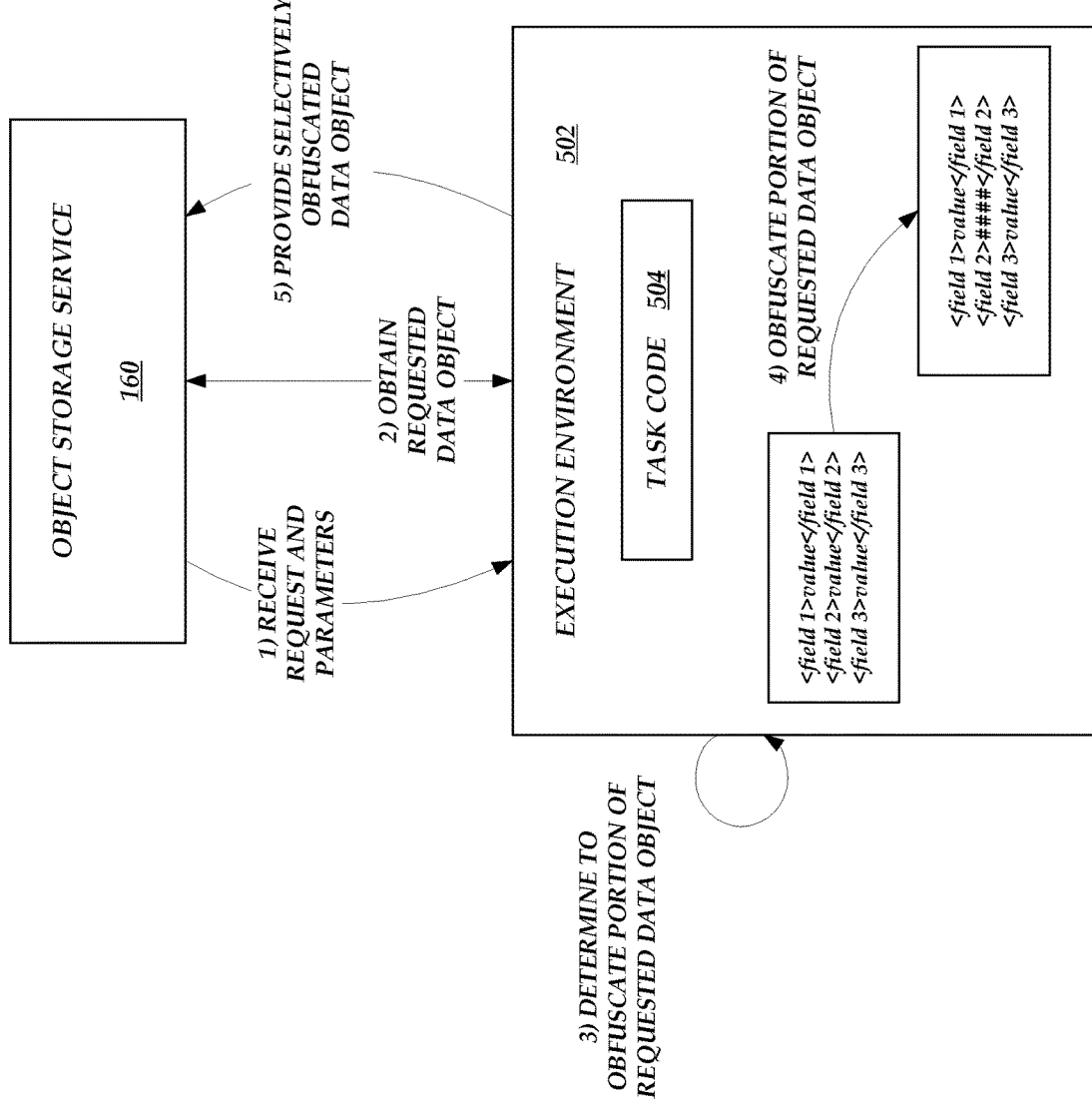
FIG. 12 is a system diagram of illustrative data flows and interactions between various components of the service provider system in connection with the routine illustrated in FIG. 11.

At block 1102, task code 504 or other functional unit of the VM instance 150 or other execution environment 502 can receive parameters associated with a request for a data object. FIG. 12 illustrates the execution environment 502 receiving the parameters associated with the request at (1). In some embodiments, the parameters may include: reference data comprising a reference to a requested data object; a reference to an output location at which output of the function is to be stored for use by the object storage service 160 in responding to the request; context data regarding the request; other data; or some combination thereof. For example, the request may be a resource request, such as a GET or SELECT request, for a particular dataset or other data object stored in the object storage service 160. The reference to the requested data object may be data that can be used by the execution environment 502 to access the requested data object, such as: a file descriptor; a file handle; a pointer; or some other data representing an address or identifier of the requested data object. The reference to the output location for responding to the request may be data that can be used by the execution environment 502 to write, store, or otherwise provide output data, such as: a file descriptor; a file handle; a pointer; or some other data representing an address or identifier of a location for providing output of the function. The context data may include data regarding the context of the request, such as: an identifier of a user, account or other source of the request; an identifier of an access or security profile under which the request is being make; data representing the access or security rights under which the request is to be processed; an identifier of a location associated with the request; an identifier of a language associated with the request; or data representing preferences or tendencies of a source of the request.

At block 1104, task code 504 or other functional unit of the VM instance 150 or other execution environment 502 can obtain the requested data object using the reference data. The requested data object may be obtained in un-obfuscated or substantially un-obfuscated form. FIG. 12 illustrates the execution environment 502 obtaining the requested data object at (2). In some embodiments, the requested data object may not be obtained from the object storage service 160 at block 1104, but may be provided to the execution environment 502 previously. For example, during staging of the execution environment, the requested data object may be obtained and stored on a computing device of the execution environment 502 at a location indicated by the reference data.

At block 1106, task code 504 or other functional unit of the VM instance 150 or other execution environment 502 can determine that one or more portions of the requested data object are to be obfuscated. In some embodiments, the determination may be based on context data and/or the requested data object. The execution environment 502 may test one or more items of context data against one or more criteria to determine whether to perform an obfuscation and which portion(s) of the requested data object to obfuscate. If an item of context data satisfies one or more criteria, then the execution environment 502 can determine that one or more portions of the requested data object are to be obfuscated such that a recipient of the response to the request is unable to understand the obfuscated portion(s). A different request for the same data object, but associated with different context data or other properties, may lead to a different result when testing the criteria and determining whether to obfuscate portions of the data object. In some embodiments, different portions of a requested data object may be associated with different criteria for un-obfuscated access. In such cases, the execution environment 502 may test the criteria for each of the associated portions. FIG. 12 illustrates the execution environment 502 determining to obfuscate portions of the requested data object at (3).

Testing the context data against the criteria may include: determining that a source of the request is prohibited from accessing the portion in un-obfuscated form, determining that a location associated with the request is prohibited from accessing the portion in un-obfuscated form, or determining than an access right or security profile associated with the request is prohibited from accessing the portion in un-obfuscated form. In some embodiments, the testing of context data against the criteria may be performed to determine that a portion of the requested data object is permitted to accessed in un-obfuscated form, rather than determining that the portion is prohibited from being accessed in un-obfuscated form. For example, testing the context data against the criteria may include: determining that a source of the request is permitted to access the portion in un-obfuscated form, determining that a location associated with the request is permitted to access the portion in un-obfuscated form, or determining than an access right or security profile associated with the request is permitted to access the portion in un-obfuscated form.

In one specific, non-limiting embodiment, the requested data object may be a data file, such as a spreadsheet, delimited file, or other collection of data records. Some portions of the data file, such as collections of records, collections of columns or data fields, or the like may only be permitted to be accessed in un-obfuscated form if the request satisfies one or more criteria. The execution environment 502 may determine that properties of the request indicated by the context data or otherwise associated with the request fail to satisfy the criteria for particular records, columns, and/or fields of the requested data object. The execution environment 502 may determine, based on this failure to satisfy the criteria, that the particular records, columns, and/or fields of the requested data object are to be obfuscated prior to being provided as output of the function.

At block 1108, task code 504 or other functional unit of the VM instance 150 or other execution environment 502 can selectively apply obfuscation to portions of the requested data object determined above. FIG. 12 illustrates the execution environment 502 obfuscating portions of the requested data object at (4). Obfuscating the content of a portion of the requested data object may involve the use of one or more obfuscation methods, such as scrambling the content in a pseudo random method, generating a hash of the content, replacing the content with a token, or the like. For example, when replacing the content with a token, the task code 504 may identify a token mapped to the content in a data store such as a key-value database, a relational database, the object storage service 160, or another network-accessible data store. In some embodiments, different obfuscation methods may be used for different portions of a data object, different data objects, different context data criteria, or the like.

In some embodiments, the obfuscation method may be specified by an entity that owns or is responsible for the data object. For example, an entity may specify that particular type of obfuscation (e.g., an industry standard obfuscation method in the medical field) is to be used for a data object or bucket of data objects, while another entity may specify that a different type of obfuscation (e.g., tokenization using a mapping of tokens to data) is to be used for a different data object or bucket of data objects. If no obfuscation method is specified, the execution environment 502 may apply a default obfuscation method.

At block 1110, task code 504 or other functional unit of the VM instance 150 or other execution environment 502 can provide the selectively-obfuscated requested data object as output of the function. For example, the execution environment 502 can place the selectively-obfuscated requested data object at the output location indicated by the reference data, and finalize the output. Finalizing output of the function may include closing the output stream or file identified by the reference to the output location and/or providing a return value (e.g., indicating success, failure, or some other characteristics of function execution) to the object storage service 160. FIG. 12 illustrates the execution environment 502 providing the selectively-obfuscated requested data object as output at (5). The routine 1100 may terminate at block 1112.

In some embodiments, output of the function may be cached so that the function does not need to retrieve and process requested data objects to generate selectively-obfuscated data objects each time the objects are to be used. Instead, the function may determine whether the function output has been cached and, if so, whether the cached output has expired. If the cached output has not expired, the function may obtain the cached function output and provide it as the output of the function, or derive current function output from the cached function output. The function output may be cached locally within the execution environment (e.g., on the server machine on which the task code 504 or other functional unit of the VM instance 150 is running), or in a network-accessible data store (e.g., a high-speed dedicated cache server, a cache portion of the object storage service 160, etc.). In some embodiments, cached function output may be tagged or otherwise associated with the context data that was used to determine which portions of the requested data object to selectively obfuscate. In this way, the function may analyze the associated context data to determine which cached output, if any, is appropriate for use in responding to a subsequent request based on the context data associated with the subsequent request. In some embodiments, data objects provided as input to the function or otherwise accessed by the function during execution may be cached so that they do not need to be obtained from the object storage service 160 each time the function is executed.

Figure 13:
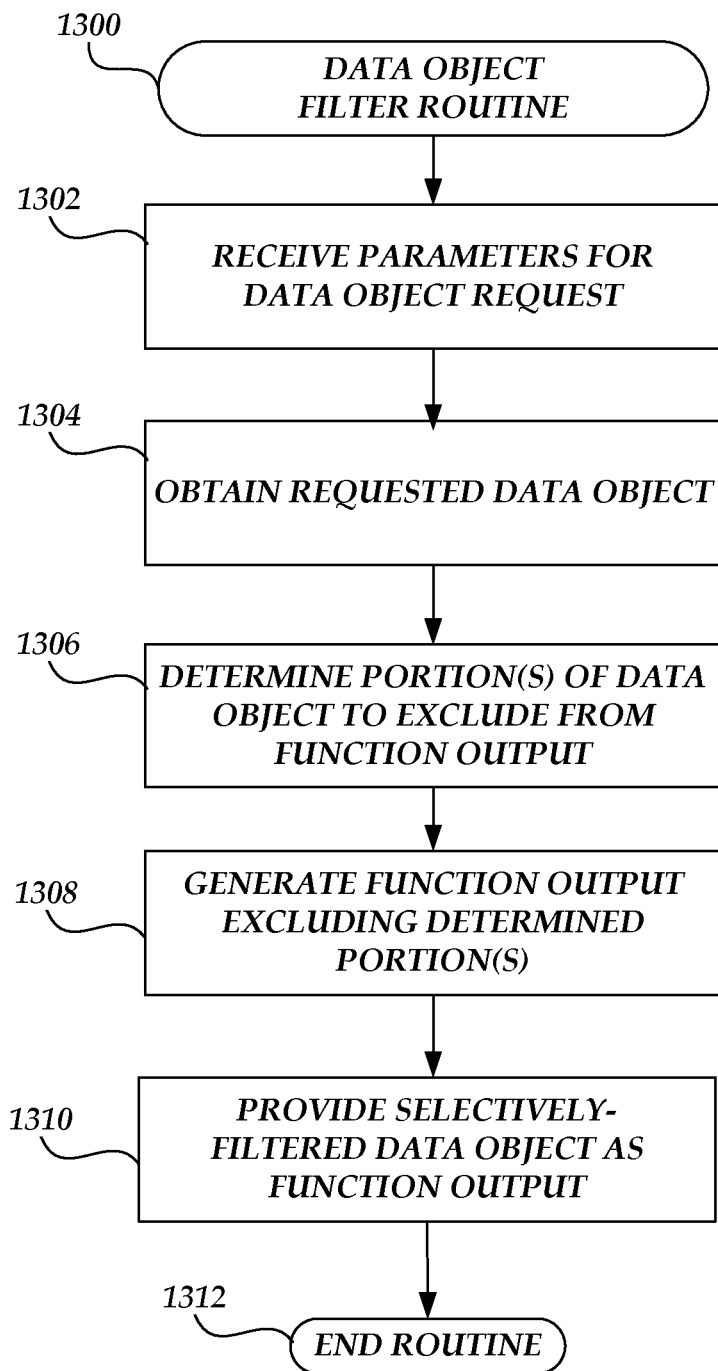
FIG. 13 is a flow chart depicting an illustrative routine for executing a task on the on-demand code execution system of FIG. 1 to respond to a data object request using a dynamically-determined subset of requested data.

FIG. 13 is a flow diagram of an illustrative routine 1300 that may be executed by a code execution service, such as the on-demand code execution system 120, to dynamically determine at run time a filtered subset of a requested data object to provide in response to a request for the data object. Although portions of the routine 1300 are described as generating a response to a request for a data object, in some embodiments the output of the routine 1300 may not be provided directly as the response to the request, but rather may be used by down-stream processes in preparing the response to the request. For example, the function output may be further processed by another routine in a pipeline, or processed by the object storage service 160 prior to sending a response to the request. Accordingly, descriptions of generating a response may be interpreted as descriptions of generating function output, and vice versa. Aspects of the routine 1300 will be described with reference to FIG. 14, which is a system diagram of illustrative data flows and interactions between various components of the service provider system 110.

The routine 1300 may begin in response to an event, such as when the routine illustrated in FIG. 8 reaches block 808. The routine 1300 may be automatically performed in response to a request from a requestor (e.g., a request for data stored in the object storage service 160), without the request specifying that the routine 1300 is to be performed prior to or during generation of a response to the request. For example, the routine 1300 may be an owner-defined function, also referred to as a user-defined task, that is performed by a VM instance 150 or other execution environment 502 generated during the routine illustrated in FIG. 8. In some embodiments, the routine 1300 or portions thereof may be implemented on multiple processors, serially or in parallel.

Figure 14:
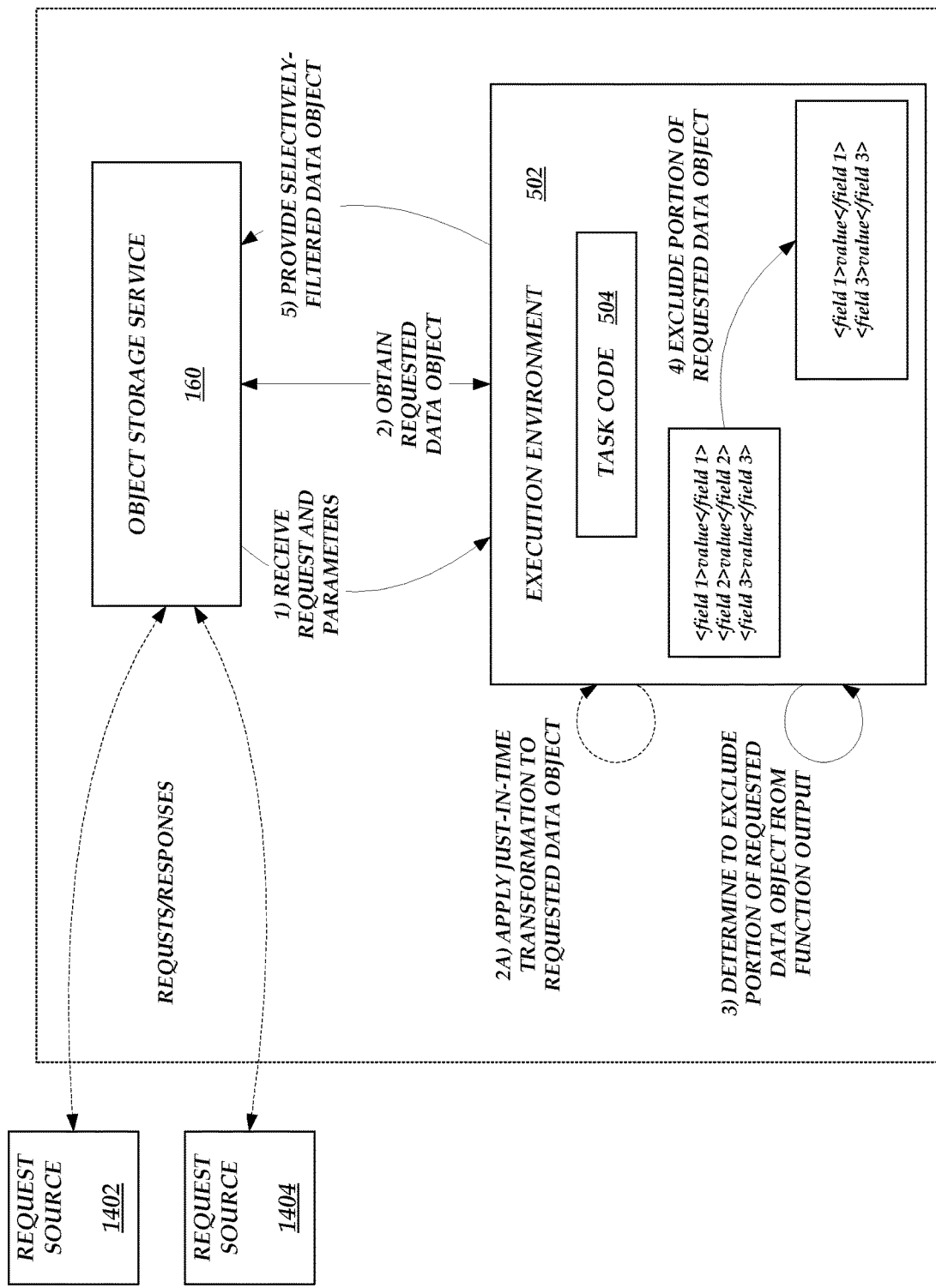
FIG. 14 is a system diagram of illustrative data flows and interactions between various components of the service provider system in connection with the routine illustrated in FIG. 13.

At block 1302, task code 504 or other functional unit of the VM instance 150 or other execution environment 502 can receive parameters associated with a request for a data object. FIG. 14 illustrates the execution environment 502 receiving the parameters associated with the request at (1). In some embodiments, the parameters may include: reference data comprising a reference to a requested data object; a reference to an output location at which output of the function is to be stored for use by the object storage service 160 in responding to the request; context data regarding the request; other data; or some combination thereof. For example, the request may be a resource request, such as a GET request, for a particular data object stored in the object storage service 160. The reference to the requested data object may be data that can be used by the execution environment 502 to access the requested data object, such as: a file descriptor; a file handle; a pointer; or some other data representing an address or identifier of the requested data object. The reference to the output location for responding to the request may be data that can be used by the execution environment 502 to write, store, or otherwise provide output data, such as: a file descriptor; a file handle; a pointer; or some other data representing an address or identifier of a location for providing output of the function. The context data may include data regarding the context of the request, such as: an identifier of a user, account or other source of the request; an identifier of an access or security profile under which the request is being make; data representing the access or security rights under which the request is to be processed; an identifier of a location associated with the request; an identifier of a language associated with the request; or data representing preferences or tendencies of a source of the request.

At block 1304, task code 504 or other functional unit of the VM instance 150 or other execution environment 502 can obtain the requested data object using the reference data. FIG. 14 illustrates the execution environment 502 obtaining the requested data object at (2). In some embodiments, the requested data object may not be obtained from the object storage service 160 at block 1104, but may be provided to the execution environment 502 previously. For example, during staging of the execution environment, the requested data object may be obtained and stored on a computing device of the execution environment 502 at a location indicated by the reference data.

At block 1306, task code 504 or other functional unit of the VM instance 150 or other execution environment 502 can determine that one or more portions of the requested data object are to be excluded from the output of the function and thus not provided to a requesting device in response to the request. In some embodiments, the determination may be based on context data and/or the requested data object. For example, the execution environment 502 may test one or more items of context data against one or more criteria to determine whether to exclude a portion or portions of the requested data object, and to determine which portion(s) of the requested data object to exclude. If an item of context data satisfies one or more criteria, then the execution environment 502 can determine that one or more portions of the requested data object are to be excluded from output of the function. A different request for the same data object, but associated with different context data or other properties, may lead to a different result when testing the criteria and determining whether to exclude portions of the data object. In some embodiments, different portions of a requested data object may be associated with different criteria for exclusion. In such cases, the execution environment 502 may test the criteria for each of the associated portions.

Testing the context data against the criteria may include: determining that a source of the request is prohibited from accessing the portion, determining that a location associated with the request is prohibited from accessing the portion, or determining than an access right or security profile associated with the request is prohibited from accessing the portion. In some embodiments, the testing of context data against the criteria may be performed to determine that a portion of the requested data object is permitted to accessed, rather than determining that the portion is prohibited from being accessed. For example, testing the context data against the criteria may include: determining that a source of the request is permitted to access the portion, determining that a location associated with the request is permitted to access the portion, or determining than an access right or security profile associated with the request is permitted to access the portion.

FIG. 14 illustrates the execution environment 502 determining to exclude portions of the requested data object at (3). In some embodiments, as shown, there may be multiple request sources 1402 and 1404. Requests from these request sources 1402 and 1404 may be handled differently by the execution environment 502 such that outputs of the function, and the responses ultimately returned to the respective request sources 1402 and 1404, may be different even if the same data object is requested by both request sources 1402 and 1404. The difference in the way the requests are handled may be based on different users using the different request sources 1402 and 1404, the different request sources 1402 and 1404 being in different geographic regions, or the different access permissions assigned to the request sources 1402 and 1404 themselves. For example, an owner of a bucket of data objects stored on the object storage service 160 may configure multiple distinct request sources or "portals" (e.g., servers providing interfaces to the object storage service 160) for accessing the data objects in the bucket. The owner may then assign different access permissions to the different portals. Thereafter, the owner may direct users to use different portals depending upon the access permissions desired for the users.

In one specific, non-limiting embodiment, the requested data object may be a data file, such as a spreadsheet, delimited file, tabular data file, structured data file, or other collection of data records. Some portions of the data file, such as subsets of records, subsets of columns, subsets of data fields or classes (e.g., those storing personally identifiable information or "PII") and the like may only be permitted to be accessed if the request satisfies one or more criteria. For example, portions may only be accessed if the request is associated with certain access rights. As another example, portions may only be accessed if a source of the request is associated with a particular location or region. As a further example, portions may only be accessed if the request is received from a particular source or subset of sources (e.g., portals, endpoints, etc.). The execution environment 502 may determine that properties of the request indicated by the context data or otherwise associated with the request satisfy criteria for particular portions of the requested data object to be excluded from the response (or, alternatively, fail to satisfy the criteria for particular portions of the requested data object to be included in the response). The execution environment 502 may determine, based on this test with respect to one or more criteria, that the particular portions of the requested data object are to be excluded from output of the function. In some embodiments, different portions of a requested data object may be associated with different criteria access. In such cases, the execution environment 502 may test the criteria for each of the associated portions.

In another specific, non-limiting embodiment, the requested data object may have metadata, such as data representing an author, editor, creation date, modification date, size, format, location, version, image capture or encoding properties, audio capture or encoding properties, video capture or encoding properties, camera properties, hardware capabilities, software capabilities, and the like. The metadata may be embedded within the data object (e.g., in a header or reserved portion of the data object), or externally associated with the data object (e.g., in a directory). Some portions of the metadata, such as individual items of metadata, predefined, groupings thereof, or dynamically determined groupings thereof, may only be permitted to be accessed if the request satisfies one or more criteria (or, alternatively, may be prohibited from being accessed if the request satisfies one or more criteria). For example, portions may only be accessed if the request is associated with certain access rights. As another example, portions may only be accessed if a source of the request is associated with a particular location or region. As a further example, portions may only be accessed if the request is received from a particular source or subset of sources (e.g., portals, endpoints, etc.). The execution environment 502 may determine that properties of the request indicated by the context data or otherwise associated with the request fail to satisfy the criteria for particular portions of the requested data object. The execution environment 502 may determine, based on this failure to satisfy the criteria, that the particular portions of the metadata of the requested data object are to be excluded from output of the function such that they are not accessible in the response to the request or by other downstream functions in a pipeline. In some embodiments, different portions of metadata for a requested data object may be associated with different criteria access. In such cases, the execution environment 502 may test the criteria for each of the associated portions.

In a further specific, non-limiting embodiment, the requested data objects that may be processed using this function are not limited to data objects stored as such on the object storage service 160. Alternatively, or in addition, a requested data object may be a dynamically-generated data object, such as a data object comprising data regarding other data objects stored on the object storage service 160. For example, a resource request such as the LIST request is not a request for a pre-existing data object stored on the object storage service 160, but rather a request for information regarding data objects stored the object storage server 160, such as a list of data objects in a particular data object group (e.g., a bucket or directory) of the object storage service 160, information regarding the data object groups of the object storage service 160, information regarding data objects used to represent users or groups of users of the object storage service 160, etc. The requested information may be identifiers, summaries, directory information, metadata, or the like. It may be desirable to limit the data objects identified in response to the LIST function, such as by limiting LIST to only those data objects that satisfy one or more criteria (or, alternatively, by excluding from LIST data regarding those objects that satisfy one or more criteria). For example, some data objects may only be identified if the request is associated with certain access rights. As another example, some data objects may only be identified if a source of the request is associated with a particular location or region. As a further example, some data objects may only be identified if the request is received from a particular source or subset of sources (e.g., portals, endpoints, etc.). The execution environment 502 may determine that properties of the request indicated by the context data or otherwise associated with the request fail to satisfy the criteria for particular data objects that would otherwise be identified. The execution environment 502 may determine, based on this failure to satisfy the criteria, that the particular data objects are not to be identified in output of the function such that they are not identified in the response to the request or by other downstream functions in a pipeline. In some embodiments, different data objects may be associated with different criteria access. In such cases, the execution environment 502 may test the criteria for each of the associated data objects.

In another specific, non-limiting embodiment, the requested data object that may be processed using this function may be transformed instead of, or in addition to, having portions of the data object excluded from output of the function. The transformations may include modifications to data, modifications to formatting, application of encryption, etc. For example, the execution environment 502 may determine, for a resource request such as a GET request for a media file, to modify the media file by applying a watermark, changing the resolution or bitrate, incorporating a copyright notice, and the like. As another example, the execution environment 502 may apply encryption to the data object. The application of these transformations may be dynamically determined based on criteria associated with context data, criteria associated with the requested data object itself, etc. The execution environment 502 may determine that properties of the request indicated by the context data or otherwise associated with the request satisfy or fail to satisfy particular criteria. For example, different levels of access rights for the source of the request may cause the execution environment 502 to apply a watermark, downscale resolution or bitrate, provide an alternate data object with a watermark or different resolution or bitrate, etc. As another example, different levels of encryption available to be decrypted by the source of the request (as indicated by context data) may cause the execution environment 502 to dynamically select an encryption method based on the encryption that the source is configured to decrypt.

At block 1308, task code 504 or other functional unit of the VM instance 150 or other execution environment 502 can selectively exclude portions of the requested data object and/or otherwise apply transformations to the requested data object as determined above. FIG. 14 illustrates the execution environment 502 selectively excluding portions of the requested data object at (4). Selectively excluding the content of a portion of the requested data object may involve generating an output version of the data object that does not include the portions determined to be excluded. For example, the execution environment 502 may read the content of the data object from an input file or stream (e.g., using reference data such as a file descriptor for the requested data object), and write the non-excluded portions to an output file or stream (e.g., using reference data such as a file descriptor for the function output), while not writing the portions to be excluded from the function output. Thus, to a recipient of a data object that has had portions selectively excluded, the data object may appear to have never included those portions. The execution environment 502 may also apply one or more transformations to ensure that the data object retains a valid format or configuration. For example, excluding certain data from the output of a LIST function, where the excluded data identifies a particular data object, may involve not only excluding the identifying data but also excluding or modifying structural or formatting data (e.g., markup tags, field definitions, etc.) that would otherwise appear in the function output as an empty object or null value.

At block 1310, task code 504 or other functional unit of the VM instance 150 or other execution environment 502 can provide the selectively-filtered requested data object—from which certain portions have been excluded—as output of the function. For example, the execution environment 502 can place the requested data object at the output location indicated by the reference data, and finalize the output. Finalizing output of the function may include closing the output stream or file identified by the reference to the output location and/or providing a return value (e.g., indicating success, failure, or some other characteristics of function execution) to the object storage service 160. FIG. 14 illustrates the execution environment 502 providing the selectively-filtered requested data object as output at (5). The routine may terminate at block 1312.

In some embodiments, output of the function may be cached so that the function does not need to retrieve and process requested data objects to generate selectively-filtered requested data objects each time the objects are to be used. Instead, the function may determine whether the function output has been cached and, if so, whether the cached output has expired. If the cached output has not expired, the function may obtain the cached function output and provide it as the output of the function, or derive current function output from the cached function output. The function output may be cached locally within the execution environment (e.g., on the server machine on which the task code 504 or other functional unit of the VM instance 150 is running), or in a network-accessible data store (e.g., a high-speed dedicated cache server, a cache portion of the object storage service 160, etc.). In some embodiments, cached function output may be tagged or otherwise associated with the context data that was used to determine which portions of the requested data object to selectively exclude. In this way, the function may analyze the associated context data to determine which cached output, if any, is appropriate for use in responding to a subsequent request based on the context data associated with the subsequent request. In some embodiments, data objects provided as input to the function or otherwise accessed by the function during execution may be cached so that they do not need to be obtained from the object storage service 160 each time the function is executed.

In some embodiments, the execution environment 502 may perform transformations on data stored in the object storage service 160 in response to a request for a data object. For example, requirements for content, formatting, and/or retention of data objects may change over time, or due dates for such changes may be reached. Rather than actively performing transformations to the data objects to reflect the current content, formatting, and/or retention requirements to the data objects when the requirements change or when the due dates are reached, the data objects may remain in the object storage service 160 unchanged or substantially unchanged until the next time they are to be accessed. When a subsequent request is received for a data object, the object storage service 160 and/or execution environment 502 may determine that a transformation is to be applied, and may apply the transformation prior to responding to the request for the data object. The transformation may be applied even if the request is a request only to receive the data object, and is not a request to modify or delete the data object. This "just-in-time" transformation may be desirable in certain cases to reduce the computational expense of applying the transformations to all data objects immediately upon changes to requirements. For example, if a large amount of data would need to be transformed, or when subsequent requests for affected data objects are expected to be rare, a bucket owner or other entity may prefer to postpone applying the transformations until the affected data objects are accessed.

FIG. 14 illustrates the execution environment 502 applying a just-in-time transformation at (2A) to a data object stored in the object storage service 160 in response to receiving a request to receive the data object. Although the just-in-time transformation is shown as occurring in connection with operations of routine 1300 for selective exclusion of data object portions, just-in-time transformations may be performed in connection with any of the other routines described herein, with any other owner-defined function or user-defined task, in a pipeline with multiple functions, etc.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without user input or prompting, whether these features, elements or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

The term "or" should generally be understood to be inclusive, rather than exclusive. Accordingly, a set containing "a, b, or c" should be construed to encompass a set including a combination of a, b, and c.

Any routine descriptions, elements or blocks in the flow diagrams described herein or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method comprising:
under control of a computing system comprising one or more computer processors configured to execute specific instructions,
receiving a request to obtain a data object stored in a data store;
determining, based at least partly on the request, to execute a function using the data object prior to providing a response to the request;
configuring a code execution system to execute the function, wherein the code execution system provides on-demand execution of functions in an input/output (I/O) pipeline of the data store;
executing the function using the code execution system prior to providing the response, wherein executing the function comprises:
obtaining the data object, wherein obtaining the data object comprises obtaining a collection of records, wherein a first portion of the data object comprises at least a portion of a record of the collection of records;
determining that the first portion is to be obfuscated in the response to the request;
generating a first obfuscated portion comprising the first portion in obfuscated form, wherein the first obfuscated portion comprises a masked version of the portion of the record; and
generating a function output comprising the first obfuscated portion, wherein the function output does not include the first portion in un-obfuscated form; and
providing the response to a computing device based at least partly on the function output.

2. The computer-implemented method of claim 1, wherein executing the function further comprises obtaining context data associated with the request, wherein determining to obfuscate the first portion is based at least partly on the context data.

3. The computer-implemented method of claim 2, wherein executing the function further comprises determining that the context data satisfies one or more criteria, wherein the context data represents one of: a source of the request, a location associated with the request, or an access right associated with the request, and wherein the one or more criteria relate to at least one of: a permitted source of the request, a prohibited source of the request, a permitted location of the request, a prohibited location of the request, a permitted access right associated with the request, or a prohibited access right associated with the request.

4. The computer-implemented method of claim 1, wherein executing the function further comprises:
obtaining context data associated with the request; and
determining an obfuscation type, of a plurality of obfuscation types, to apply to the first portion based at least partly on the context data.

5. The computer-implemented method of claim 4, wherein determining the obfuscation type comprises determining one of: a customized obfuscation associated with the data object, or a default obfuscation.

6. The computer-implemented method of claim 1, further comprising:
receiving a second request for the data object, wherein the request is associated with first context data and wherein the second request is associated with second context data different than the first content data; and
executing the function using the code execution system to generate a second function output based at least partly on the second context data, wherein the second function output is different than the function output.

7. The computer-implemented method of claim 1, further comprising:
storing the function output in a cache;
receiving a second request for the data object; and
providing a second response to the second request based at least partly on the function output stored in the cache.

8. The computer-implemented method of claim 1, wherein executing the function using the code execution system prior to providing the response comprises executing a serverless function on serverless code execution system.

9. A system comprising:
a data store storing plurality of data objects; and
one or more computing devices in communication with the data store and configured to at least:
receive a request to obtain a data object of the plurality of data objects;
determine, based at least partly on the request, to execute a function using the data object prior to providing a response to the request;
configure a code execution system to execute the function, wherein the code execution system provides on-demand execution of serverless functions in an input/output (I/O) pipeline of the data store;
wherein the code execution system is thereby configured to:
obtain the data object, wherein the data object comprises a collection of records, wherein a first portion of the data object comprises at least a portion of a record of the collection of records;
determine to transform at least the first portion, wherein the response is not to include the first portion in an un-transformed state;
transform the first portion of the data object to create a transformed first portion;
store the data object comprising the transformed first portion in the data store; and
generate function output comprising the transformed first portion; and
provide the response to a computing device based at least partly on the function output.

10. The system of claim 9, wherein the code execution system being configured to transform the first portion comprises the code execution system being configured to obfuscate the first portion.

11. The system of claim 9, wherein the code execution system being configured to transform the first portion comprises the code execution system being configured to apply a transformation comprising at least one of: addition of a watermark, alteration of a resolution, alteration of a bitrate, or application of encryption.

12. The system of claim 9, wherein the code execution system being configured to transform the first portion comprises the code execution system being configured to remove at least a portion of the first portion.

13. The system of claim 9, wherein the code execution system being configured to transform the first portion comprises the code execution system being configured to modify a format of the first portion.

14. The system of claim 9, wherein the code execution system is further configured to obtain context data associated with the request, wherein determining to transform the first portion is based at least partly on the context data satisfying one or more criteria.

15. The system of claim 14, wherein the code execution system is further configured to determine that the context data satisfies one or more criteria, wherein the context data represents one of: a source of the request, a location associated with the request, or an access right associated with the request, and wherein the one or more criteria relate to at least one of: a permitted source of the request, a prohibited source of the request, a permitted location of the request, a prohibited location of the request, a permitted access right associated with the request, or a prohibited access right associated with the request.

16. The system of claim 9, wherein at least a subset of the plurality of data objects are owned by an owner, and wherein the code execution system initiates execution of owner-defined code prior to providing responses to requests to perform input/output (I/O) operations on the subset of the plurality data objects.

17. The system of claim 9, wherein the request is a hypertext transport protocol (HTTP) GET request.

18. The system of claim 9, wherein the one or more computing devices are further configured to at least:

generate a requested file handle, wherein the data object is readable from the data store using the requested file handle; and send the request and the requested file handle to the code execution system, wherein the code execution system obtains the data object using the requested file handle.

\* \* \* \* \*

UNITED STATES PATENT AND TRADEMARK OFFICE
CERTIFICATE OF CORRECTION

PATENT NO. : 11,263,220 B2  
APPLICATION NO. : 16/586562  
DATED : March 1, 2022  
INVENTOR(S) : Harris et al.

It is certified that error appears in the above-identified patent and that said Letters Patent is hereby corrected as shown below:

On the Title Page

Page 2, Column 1 (item (56) U.S. Patent Documents), Line 19, delete "Scheitler et al." and insert --Scheifler et al.--.

Page 3, Column 2 (item (56) U.S. Patent Documents), Line 31, delete "2009/0005581" and insert --2009/0055810--.

Page 3, Column 2 (item (56) U.S. Patent Documents), Line 43, delete "Scheitler et al." and insert --Scheifler et al.--.

Page 6, Column 2 (item (56) Other Publications), Line 5, delete ""VMPIants:" and insert --"VMPlants:--.

In the Drawings

Sheet 16 of 16 (FIG. 14), Line 4 (approx.), delete "REQUSTS/RESPONSES" and insert --REQUESTS/RESPONSES--.

In the Specification

Column 8, Line 9, delete "110" and insert --I/O--.

Column 30, Line 18, delete "10" and insert --I/O--.

Column 32, Line 67, delete "etc...." and insert --etc..--.

Column 33, Line 48, delete "110" and insert --I/O--.

Signed and Sealed this  
Thirty-first Day of May, 2022

Katherine Kelly Vidal  
*Director of the United States Patent and Trademark Office*

In the Claims

Column 49, Line 22, Claim 1, delete "determining;" and insert --determining,--.